US007996143B2

(12) United States Patent
Okazaki

(10) Patent No.: US 7,996,143 B2
(45) Date of Patent: Aug. 9, 2011

(54) CONTROL APPARATUS FOR AN INTERNAL COMBUSTION ENGINE

(75) Inventor: Shuntaro Okazaki, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 406 days.

(21) Appl. No.: 12/304,160

(22) PCT Filed: Jun. 11, 2008

(86) PCT No.: PCT/JP2008/061074
§ 371 (c)(1),
(2), (4) Date: Dec. 10, 2008

(87) PCT Pub. No.: WO2008/153190
PCT Pub. Date: Dec. 18, 2008

(65) Prior Publication Data

US 2010/0235072 A1 Sep. 16, 2010

(30) Foreign Application Priority Data

Jun. 11, 2007 (JP) ................................ 2007-154172

(51) Int. Cl.
*G06F 7/00* (2006.01)
*F02M 35/02* (2006.01)

(52) U.S. Cl. ........ 701/103; 701/104; 701/105; 701/109; 123/516; 123/519; 123/520

(58) Field of Classification Search .................. 123/516, 123/518, 519, 520, 521, 698, 674; 701/102, 701/103, 104, 105, 106, 109, 115
See application file for complete search history.

(56) References Cited

U.S. PATENT DOCUMENTS

| | | | | |
|---|---|---|---|---|
| 6,230,699 | B1 * | 5/2001 | Mitsutani | 123/674 |
| 6,318,345 | B1 | 11/2001 | Weber et al. | |
| 2002/0129797 | A1 | 9/2002 | Hayashi et al. | |
| 2005/0274353 | A1 | 12/2005 | Okubo et al. | |
| 2008/0141983 | A1 * | 6/2008 | Takakura et al. | 123/520 |

FOREIGN PATENT DOCUMENTS

| | | | |
|---|---|---|---|
| JP | 5-202817 | A | 8/1993 |

* cited by examiner

*Primary Examiner* — Thomas N Moulis
*Assistant Examiner* — Raza Najmuddin
(74) *Attorney, Agent, or Firm* — Sughrue Mion, PLLC

(57) ABSTRACT

An evaporated fuel gas concentration learning section A8 renews an evaporated fuel gas concentration learning value based on a feedback correction amount FAF. An estimated purge rate calculating section A9 estimates, a flow of an evaporated fuel gas introduced into a combustion chamber based on a flow KP of an evaporated fuel gas passing through a purge control valve in consideration of a transportation delay time duration and a behavior of the evaporated fuel gas. An instructed injection amount determining section A10 calculates a purge correction amount based on the evaporated fuel gas concentration learning value and the estimated purge flow. An evaporated fuel gas purge stop timing adjusting section A11, at a purge control valve closing instruction timing, corrects the feedback correction amount to a base value and corrects the evaporated fuel gas concentration learning value so as to add, to the purge correction amount, an amount corresponding to an correction amount to correct the base injection amount provided by the feedback correction amount at a timing immediately before the feedback correction amount is corrected to the base value.

12 Claims, 18 Drawing Sheets

CONTROL APPARATUS FOR AN INTERNAL COMBUSTION ENGINE

BACKGROUND OF THE INVENTION

1. Technical Field

The present invention relates to a control apparatus for an internal combustion engine in which evaporated fuel is provided to a combustion chamber via a purge passage, a purge control valve, and an intake passage.

2. Background Art

A conventional control apparatus for an internal combustion engine is known, in which evaporated fuel generated in a fuel tank is provided to a combustion chamber through a purge passage with a purge control valve and an intake passage. Providing the evaporated fuel to the combustion chamber is referred to as "evaporated fuel gas purge (or, "evapo-purge" for short)".

One of such control apparatuses carries out the evaporated fuel gas purge while an air-fuel ratio feedback control is being performed. In the air-fuel ratio feedback control, an air-fuel ratio of a mixture provided to the engine (an air-fuel ratio of the engine) is detected by an air-fuel ratio sensor disposed in an exhaust passage, a feedback correction coefficient for a base (fuel) injection amount is calculated based on the detected air-fuel ratio. An instructed injection amount sent to a fuel-injector is determined through correcting the base injection amount by the feedback correction coefficient. A fuel whose amount corresponds to the instructed injection amount is injected from the injector. Typically, the base injection amount is a feedforward control amount determined based on a load of the engine and a revolution speed of the engine so as to make the air-fuel ratio of the engine become equal to a stoichiometric (theoretical) air-fuel ratio.

For performing the evaporated fuel gas purge, the fuel tank is communicated with the intake passage via the purge passage. A canister is disposed in the purge passage. The purge control valve is disposed downstream of the canister (at the side of the intake passage of the engine) in the purge passage. The evaporated fuel generated in the fuel tank is introduced into the canister through the purge passage, and is adsorbed in the canister tentatively. The evaporated fuel adsorbed in the canister is introduced into the intake passage as the evaporated fuel gas when the purge control valve is opened. In this manner, the evaporated fuel gas purge is carried out (refer to, for example, Japanese Patent Application Laid-Open (kokai) No. Hei 5-202817, FIG. 3).

Meanwhile, the mixture burnt in the combustion chamber includes the fuel injected from the injector and the evaporated fuel introduced via the purge passage, when the evaporated fuel gas purge is being carried out. Therefore, the feedback correction coefficient calculated based on the detected air-fuel ratio includes a correction amount for the evaporated fuel. Accordingly, the feedback correction coefficient excessively decreases the base injection amount, when the evaporated fuel gas purge is stopped. As a result, there may be a case where the air-fuel ratio of the engine becomes excessively large (lean). In view of the foregoing, the control apparatus disclosed in the above Japanese Patent Application performs the following control.

The control apparatus calculates a purge correction coefficient for compensating for a deviation of the air-fuel ratio from the stoichiometric air-fuel ratio due to the evaporated fuel gas purge. Specifically, the control apparatus gradually decreases the purge correction coefficient as an elapsed time from a start timing of the evaporated fuel gas purge increases, based on the perspective that a purge amount of the evaporated fuel gas increases as the elapsed time from the start timing of the evaporated fuel gas purge increases. Further, the control apparatus calculates the feedback correction coefficient based on the detected air-fuel ratio to make the air-fuel ratio of the engine becomes equal to the stoichiometric air-fuel ratio, even when the evaporated fuel gas purge is being carried out (during the purge). The control apparatus corrects the base injection amount based on the purge correction coefficient and the feedback correction coefficient during the purge.

In addition, the control apparatus resets the purge correction coefficient when it stops the evaporated fuel gas purge by completely closing the purge control valve. That is, the control apparatus corrects (sets) the purge correction coefficient to a base value "1", which neither increase nor decrease a fuel injection amount. At the same time, the control apparatus resets the feedback correction coefficient when it stops the evaporated fuel gas purge, if the feedback correction coefficient is a value which decreases the base injection amount. That is, the control apparatus corrects (sets) the feedback correction coefficient to a base value "1", which neither increase nor decrease the fuel injection amount.

As a result, it can be avoided that the air-fuel ratio of the engine becomes excessively large (lean) relative to the stoichiometric air-fuel ratio immediately after the evaporated fuel gas purge is stopped, because the feedback correction coefficient is set to be a value which has not been affected by the evaporated fuel gas purge. Consequently, harmful gases, such as NOx, can be reduced.

DISCLOSURE OF THE INVENTION

Even when the purge control valve is completely closed in order to stop the evaporated fuel gas purge, the flow of the evaporated fuel gas introduced into the combustion chamber does not become "0" immediately. This is because the evaporated fuel gas remains in the purge passage downstream of the purge control valve and in the intake passage such as a surge tank and intake manifolds. The evaporated fuel gas continues to be introduced into the combustion chamber until a gas transportation delay time (i.e., a time duration for which the evaporated fuel gas moves from the purge control valve to the combustion chamber) elapses from the timing at which the purge control valve is completely closed.

Therefore, the air-fuel ratio becomes overrich (too small) by an amount corresponding to an amount of the evaporated fuel gas introduced into the combustion chamber immediately after the purge control valve is completely closed, if the purge correction coefficient and the feedback correction coefficient are reset when the purge control valve is completely closed, as the control apparatus described above operates. This lengthens a time duration from the timing when the purge control valve is completely closed to a timing when the feedback correction coefficient converges. Accordingly, a time duration for which an actual air-fuel ratio deviates from the stoichiometric air-fuel ratio by a large amount becomes long. As a result, the emission becomes worse.

Accordingly, one of the objects of the present invention is to provide a control apparatus for an internal combustion engine which effectively avoid a large deviation of the air-fuel ratio of the engine from a target air-fuel ratio, by controlling the feedback correction coefficient and the purge correction coefficient to be appropriate values after a purge control valve closing instruction timing at which an instruction signal is provided to the purge control valve, the instruction signal being a signal to change a condition of the purge control valve from a condition in which the purge control valve is opened to a condition in which the purge control valve is completely closed.

An internal combustion engine to which the control apparatus according to the present invention is applied comprises:

fuel injection means for supplying fuel to a combustion chamber by injecting fuel stored in a fuel tank;

a purge passage connecting said fuel tank with an intake passage, the purge passage being for introducing evaporated fuel generated in said fuel tank in a form of evaporated fuel gas containing the evaporated fuel into the intake passage;

a purge control valve which is disposed in said purge passage and whose opening (opening amount) is adjusted in response to an instruction signal; and an air-fuel ratio sensor which is disposed in an exhaust passage of the engine and which detects an air-fuel ratio of a mixture supplied into said combustion chamber.

In this engine, the purge passage is completely closed when the purge control valve is completely closed.

The control apparatus according to the present invention comprises: purge control means; base (fuel) injection amount determining means; feedback correction amount calculating means; evaporated fuel gas concentration learning means; purge flow estimating means; purge correction amount calculating means; feedback correction amount correcting means; evaporated fuel gas concentration learning value correcting means; and fuel injection amount determining means.

The purge control means provides, to the purge control valve, an instruction signal for opening the purge control valve at a predetermined opening when a predetermined purge condition is satisfied to introduce the evaporated fuel gas into the intake passage, and an instruction signal for completely closing the purge control valve when the purge condition becomes unsatisfied to stop introducing the evaporated fuel gas into the intake passage. The predetermined purge condition is satisfied, for instance, when a feedback control condition described later is satisfied and the engine is being operated under a steady condition (i.e., the condition of the engine is neither an abrupt accelerating condition nor an abrupt decelerating condition), and so on.

The base injection amount determining means determines, based on an amount of an intake air of the engine, a base injection amount to make an air-fuel ratio of a mixture formed in the combustion chamber by the fuel injected from the fuel injection means equal to a predetermined target air-fuel ratio.

The feedback correction amount calculating means calculates a feedback correction amount for correcting the base injection amount such that the detected air-fuel ratio becomes equal to the target air-fuel ratio when a predetermined feedback control condition is satisfied. The feedback correction amount is renewed, for instance, every predetermined crank angle or every predetermined (constant) time period.

More specifically, the control apparatus obtains, based on the intake air amount and the target air-fuel ratio, the fuel injection amount for making the air-fuel ratio of the air-fuel mixture provided into the combustion chamber equal to the predetermined target air-fuel ratio (normally, the stoichiometric air-fuel ratio) when the evaporated fuel gas is not introduced into the intake passage, for instance. This fuel injection amount is a feedforward injection amount and is referred to as "a base injection amount". Thereafter, the feedback correction amount calculating means calculates the feedback correction amount using a difference between the base injection amount and an actual fuel injection amount calculated based on the detected air-fuel ratio and the like. It should be noted that a way to calculate the feedback correction amount is not limited to the way just described above. That is, the feedback correction amount may be renewed in such a manner that it decreases the base injection amount when the detected air-fuel ratio is smaller (richer) than the target air-fuel ratio and in such a manner that it increases the base injection amount when the detected air-fuel ratio is larger (leaner) than the target air-fuel ratio.

The evaporated fuel gas concentration learning means learns (or obtains, renews) a value relating to a concentration of the evaporated fuel contained in the evaporated fuel gas, as "an evaporated fuel gas concentration learning value", based on a value relating to the feedback correction amount, when an instruction signal is being sent to the purge control valve, the instruction signal being for opening the purge control valve at the predetermined opening.

For instance, "the value relating to the feedback correction amount" which is a base used for learning (or obtaining) the evaporated fuel gas concentration learning value may be the feedback correction amount itself, an average of the feedback correction amount over a predetermined period, or a value similar to the average (i.e., a filtered feedback correction amount which is obtained by filtering the feedback correction amount, the filtering functioning to pass only low-frequency components of the feedback correction amount, and the like).

For instance, the evaporated fuel gas concentration learning value is decreased when "the value relating to the feedback correction amount" indicates that the feedback correction amount is a value that decreases the base injection amount by a predetermined amount, and is increased when "the value relating to the feedback correction amount" indicates that the feedback correction amount is a value that increases the base injection amount by a predetermined amount. In other words, the evaporated fuel gas concentration learning value is a value obtained in such a manner that it decreases as the evaporated fuel gas concentration becomes higher and increases as the evaporated fuel gas concentration becomes lower. Alternatively, the evaporated fuel gas concentration learning value may be a value obtained in such a manner that it increases as the evaporated fuel gas concentration becomes higher and decreases as the evaporated fuel gas concentration becomes lower.

The purge flow estimating means estimates, as an estimated purge flow, a flow of the evaporated fuel gas introduced into the combustion chamber based on a value relating to the opening of the purge control valve, by considering "a transportation delay time duration" which is a time that the evaporated fuel gas takes to transport from the purge control valve to the combustion chamber and "a behavior of the evaporated fuel gas" which passes through the purge control valve with respect to a value relating to the opening of the purge control valve.

For instance, "the value relating to the opening of the purge control valve" which is a base used for estimating the estimated purge flow may be a target purge rate used when the opening of the purge control valve is determined, an instruction signal sent to the purge control valve, a target opening of the purge control valve, an actual opening of the purge control valve, and so on.

For instance, the purge flow estimating means may be configured in such a manner that it obtains the estimated purge flow to which "the transportation delay time duration" and "the behavior of the evaporated fuel gas" is reflected by obtaining a flow of the evaporated fuel gas passing through the purge control valve based on the value relating to the opening of the purge control valve, such as the target purge rate, and the intake air amount, and then implements first order lag operation (or first order lag treatment) for an amount obtained through delaying the flow of the evaporated fuel gas passing through the purge control valve by the transportation delay time duration The purge correction amount calculating means calculates a purge correction amount for correcting the base injection amount based on the evaporated fuel gas concentration learning value and the estimated purge flow so as to decrease the base injection amount by an amount corresponding to the evaporated fuel contained in said evaporated fuel gas introduced into the combustion chamber.

The feedback correction amount correcting means corrects (sets or resets) the feedback correction amount to a base value which neither increase nor decrease the base injection amount, at a purge control closing instruction timing when an instruction signal is sent to the purge control valve, the instruction signal causing the purge control valve to change its state from opening state to completely closing state.

The evaporated fuel gas concentration learning value correcting means corrects the evaporated fuel gas concentration learning value in such a manner that an amount corresponding to "an correction amount to correct the base injection amount" provided by the feedback correction amount at the timing immediately before the feedback correction amount is corrected to the base value is added to the purge correction amount, at the purge control valve closing instruction timing.

The fuel injection amount determining means determines the fuel injection amount injected from the fuel injection means by correcting the base injection amount using the feedback correction amount and the purge correction amount.

According to the control apparatus described above, it can be avoided that the air-fuel ratio of the engine deviates from the target air-fuel ratio by a large amount after the purge control valve closing instruction timing. This will be described with reference to FIG. 3 which is a timing chart showing various control parameters (values) with respect to an elapsed time. In the example shown in FIG. 3, an instruction signal to open the purge control valve at the predetermined opening other than 0 has been sent to the purge control valve up to the time tpc. Further, an instruction signal to completely close the purge control valve (i.e., to set the opening at 0) is sent to the purge control valve at the time tpc. That is, the time tpc is the purge control valve closing instruction timing. The feedback correction amount (the feedback correction coefficient) continues to be renewed (altered).

In this example, if a purge correction coefficient (hereinafter sometimes referred to as "a purge correction amount") shown in (C) of FIG. 3 is equal to a value which can completely exclude an effect on the air-fuel ratio of the engine caused by the evaporated fuel gas, then the feedback correction amount must be a value almost equal to the base value "1". However, as shown in (D) of FIG. 3, the feedback correction amount at the purge control valve closing instruction timing tpc is a value FAF0 which is smaller than the base value "1" of the feedback correction amount by a value $\epsilon$. Thus, it can be said that the value $\epsilon$ is a value corresponding to an amount of the evaporated fuel, the amount being an amount which can not be compensated by the purge correction amount.

As described above, the conventional control apparatus corrects (sets) the feedback correction coefficient to the base value "1" and corrects (sets) the purge correction coefficient to the base value "1" at the purge control valve closing instruction timing tpc, as shown by dashed lines in (D) and (C) of FIG. 3. However, the evaporated fuel gas continues to be introduced into the combustion chamber even after a timing when the evaporated fuel gas transportation delay time (the timing tpc−the timing te in FIG. 3) elapses from the purge control valve closing instruction timing tpc. In addition, the flow of the evaporated fuel gas passing through the purge control valve does not become "0" at the purge control valve closing instruction timing tpc, but reaches "0" when a short time period elapses from the purge control valve closing instruction timing tpc. Therefore, the evaporated fuel gas is further introduced into the combustion chamber for a short time duration (the timing te−the timing tc) after the evaporated fuel gas transportation delay time elapses from the purge control valve closing instruction timing tpc. Consequently, as shown by a dashed line in (D) of FIG. 3, the feedback correction amount decreases by a large amount from the base value "1" for a period immediately after the purge control valve closing instruction timing tpc. As a result, the air-fuel ratio of the engine also fluctuates excessively, as shown by a dashed line in (E) of FIG. 3.

To the contrary, the present control apparatus, at the purge control valve closing instruction timing tpc, corrects (sets) the feedback control amount to the base value and corrects the evaporated fuel gas concentration learning value so as to add, to the purge correction amount, an amount corresponding to a correction amount (the difference $\epsilon$ between the value FAF0 and the base value "1" shown in (D) of FIG. 3) for the base injection amount, the correction amount being provided by the feedback correction amount at a timing immediately before the feedback correction amount is corrected to the base value. More specifically, the present control apparatus decreases the evaporated fuel gas concentration learning value by ΔFGPG shown in (B) of FIG. 3 to thereby decrease the purge correction amount shown in (C) of FIG. 3 by ΔFPG.

Meanwhile, the evaporated fuel gas concentration learning value is renewed while an instruction signal to open the purge control valve at a predetermined opening is being sent, and is not renewed while an instruction signal to completely close the purge control valve is being sent. Accordingly, the evaporated fuel gas concentration learning value is kept at the same value (the value resulted from the aforesaid correction) after the purge control valve closing instruction timing tpc. On the other hand, the estimated purge flow (an estimated value for the flow of the evaporated fuel gas introduced into the combustion chamber) is estimated based on the value relating the opening of the purge control valve, by taking account of the transportation delay time duration which is a time that the evaporated fuel gas takes to transport from the purge control valve to the combustion chamber and the behavior of the evaporated fuel gas passing through the purge control valve with respect to the value relating to the opening of the purge control valve.

Therefore, the purge correction amount (see a solid line shown in (C) of FIG. 3) calculated based on the evaporated fuel gas concentration learning value and the estimated purge flow becomes a value which compensates for the evaporated fuel introduced into the combustion chamber precisely after the purge control valve closing instruction timing tpc. Thus, as shown by a solid line in (D) of FIG. 3, the feedback correction amount hardly deviates from the base value "1" for a period immediately after the purge control valve closing instruction timing tpc. As a result, as shown by a solid line in (E) of FIG. 3, the fluctuation of the air-fuel ratio after the purge control valve closing instruction timing tpc is suppressed very effectively. Consequently, it is possible to reduce a NOx emission after the purge control valve closing instruction timing tpc.

One aspect of the present control apparatus further comprises:

base air-fuel ratio learning means for performing base air-fuel ratio learning by renewing a base air-fuel ratio learning value based on a feedback value for learning which varies depending on the feedback correction amount so as to make the feedback correction amount closer to the base value during a purge control valve closing instruction period for which an instruction signal is sent to the purge control valve, the instruction signal being a signal to keep the purge control valve in a state in which the purge control valve is completely closed;

base air-fuel ratio learning completion determining means for determining whether or not the base air-fuel ratio learning is completed based on the feedback value for learning during the purge control valve closing instruction period; and correction prohibiting means for prohibiting the feedback correction amount correcting means from correcting the feedback correction amount and prohibiting the evaporated fuel gas concentration learning value correcting means from correcting the evaporated fuel gas concentration learning value, if it is determined that the base air-fuel ratio learning is not completed when the purge control valve closing instruction timing arrives;

wherein the fuel injection amount determining means is configured so as to further use the base air-fuel ratio learning value to correct the base injection amount.

In this case, for instance, "the feedback value for learning which varies depending on the feedback correction amount" used for renewing the base air-fuel ratio learning value is the feedback correction amount itself, the average of the feedback correction amount over a predetermined period, or the value similar to the average (i.e., the filtered feedback correction, and the like). The base air-fuel ratio learning value is renewed based on the feedback value for learning so as to make the feedback correction amount approach the base value during the purge control valve closing instruction period.

Specifically, for instance, the base air-fuel ratio learning value is increased if the feedback value for learning indicates that "the average of the feedback correction amount is a value which increases the base-injection amount", and the base air-fuel ratio learning value is decreased if the feedback value for learning indicates that "the average of the feedback correction amount is a value which decreases the base-injection amount". As a result, an excess-and-deficiency of the base injection amount due to a deviation in characteristics of the fuel injection means or the like is reflected on the base air-fuel ratio learning value. It should be noted that a deviation of the air-fuel ratio from the target air-fuel ratio is referred to as "a deviation amount of the air-fuel ratio". Further, the learning of the deviation amount of the base of the air-fuel ratio is referred to as "a base air-fuel ratio learning".

If the base air-fuel ratio learning has been completed, the feedback correction amount becomes a value that represents a shortage (deficiency) in the purge correction amount with accuracy, because the feedback correction amount while the evaporated fuel gas is being introduced into the combustion chamber does not depend on the deviation amount of the base of the air-fuel ratio. Therefore, the present control apparatus corrects the feedback correction amount and the evaporated fuel gas concentration learning value, if it is determined that the base air-fuel ratio learning is (has been) completed when the purge control valve closing instruction timing arrives.

On the other hand, assuming that the base air-fuel ratio learning has not been completed when the purge control valve closing instruction timing arrives, the feedback correction amount is a value which reflects not only the shortage (deficiency) in the purge correction amount but also the deviation amount of the base of the air-fuel ratio. Here, if the correction on the feedback correction amount and the correction on the evaporated fuel gas concentration learning value are carried out when a whole part or an almost all part of the deviation of the feedback correction amount from the base value stems from the deviation amount of the base of the air-fuel ratio, the feedback correction amount varies from the base value by an large amount after the purge control valve closing instruction timing. As a result, the air-fuel ratio may deviates from the target air-fuel ratio by a large amount after the purge control valve closing instruction timing.

In view of above, the present control apparatus adopts the correction prohibiting means to prohibit the feedback correction amount correcting means from correcting the feedback correction amount and to prohibit the evaporated fuel gas concentration learning value correcting means from correcting the evaporated fuel gas concentration learning value, if it is determined that the base air-fuel ratio learning is not completed when the purge control valve closing instruction timing arrives. Thus, it can be avoided that the air-fuel ratio deviates from the target air-fuel ratio by a large amount, especially when the base air-fuel ratio learning is not completed and the deviation amount of the base of the air-fuel ratio is large.

Meanwhile, the intake air amount is relatively small when the engine is operated at a low revolution speed. Therefore, even if the deviation amount of the base of the air-fuel ratio is relatively large at the purge control valve closing instruction timing, the air-fuel ratio can sufficiently be corrected by varying the feedback correction amount after the purge control valve closing instruction timing. Thus, it is unlikely that the actual air-fuel ratio largely deviates from the target air-fuel ratio. To the contrary, the intake air amount is relatively large when the engine is operated at a high revolution speed. Therefore, it is likely that the actual air-fuel ratio largely deviates from the target air-fuel ratio when the deviation amount of the base of the air-fuel ratio is relatively large at the purge control valve closing instruction timing, even if the feedback correction amount is varied after the purge control valve closing instruction timing.

Therefore, it is preferable that the control apparatus described above further comprise revolution speed detecting means for detecting a revolution speed of the engine, and the correction prohibiting means be configured in such a manner that it prohibits the feedback correction amount correcting means from correcting the feedback correction amount and prohibits the evaporated fuel gas concentration learning value correcting means from correcting the evaporated fuel gas concentration learning value, only when the detected revolution speed is higher than a predetermined threshold.

That is, the present control apparatus carries out the correction on the feedback correction amount and the correction on the evaporated fuel gas concentration learning value when the engine is operated at the low revolution speed, even if the base air-fuel ratio learning is not completed when the purge control valve closing instruction timing arrives. Thus, if the deviation amount of the base of the air-fuel ratio is relatively small, an amount of variation of the feedback correction amount becomes smaller when the engine is operated at the low revolution speed after the purge control valve closing instruction timing, compared to the case where the correction on the feedback correction amount and the correction on the evaporated fuel gas concentration learning value are prohibited. As a result, it is possible to further suppress the deviation of the air-fuel ratio, compared to the case where the correction on the feedback correction amount and the correction on the evaporated fuel gas concentration learning value are prohibited. In addition, at the low revolution speed, the actual air-fuel ratio does not vary largely due to the correction on the feedback correction amount after the purge control valve closing instruction timing, even if the deviation amount of the base of the air-fuel ratio is relatively large.

On the other hand, the present control apparatus prohibits the correction on the feedback correction amount and the correction on the evaporated fuel gas concentration learning value if the engine is operated at the high revolution speed, when it is determined that the base air-fuel ratio learning is not completed when the purge control valve closing instruction timing arrives. As a result, it can be avoided that the deviation of the air-fuel ratio becomes very large after the purge control valve closing instruction timing, when the engine is operated at the high revolution speed.

Another aspect of the present control apparatus further comprises:

base air-fuel ratio learning means for performing base air-fuel ratio learning by renewing a base air-fuel ratio learning value based on a feedback value for learning which varies depending on the feedback correction amount so as to make the feedback correction amount closer to the base value during a purge control valve closing instruction period for which an instruction signal is sent to the purge control valve, the instruction signal being a signal to keep the purge control valve in a state in which the purge control valve is completely closed; and base air-fuel ratio learning completion determining means for determining whether or not the base air-fuel ratio learning is completed based on the feedback value for learning during the purge control valve closing instruction period.

In addition, the evaporated fuel gas concentration learning value correcting means performs the correction on the feedback correction amount by the feedback correction amount correcting means and the correction on the evaporated fuel gas concentration learning value by the evaporated fuel gas concentration learning value correcting means, if it is determined that the base air-fuel ratio learning is completed when the purge control valve closing instruction timing arrives. The evaporated fuel gas concentration learning means determines a partition ratio based on an operation state parameter of the engine, if it is determined that the base air-fuel ratio learning is not completed when the purge control valve closing instruction timing arrives, and corrects the evaporated fuel gas concentration learning value in such a manner that a partition amount is added to the purge correction amount, the partition amount being corresponding to the partition ratio of an amount corresponding to the correction amount to correct the base injection amount provided by the feedback correction amount that was calculated at the purge control valve closing instruction timing, and corrects the feedback correction amount in such a manner that the partition amount is subtracted from the feedback correction amount.

According to this aspect, the correction on the feedback correction amount and the correction on the evaporated fuel gas concentration learning value are carried out if it is determined that the base air-fuel ratio learning is completed when the purge control valve closing instruction timing arrives, as the control apparatus described above.

To the contrary, "a partition ratio" is determined based on an operation state parameter of the engine, if it is determined that the base air-fuel ratio learning is not completed when the purge control valve closing instruction timing arrives. In other words, it can be said that the evaporated fuel gas concentration learning means includes partition ratio determining means for determining the partition ratio. Further, the evaporated fuel gas concentration learning value is corrected in such a manner that "a partition amount" is added to the purge correction amount. In addition, "the partition amount" is "an amount corresponding to the partition ratio of an amount corresponding to the correction amount to correct the base injection amount provided by the feedback correction amount that was calculated at the purge control valve closing instruction timing", which is simply referred to as "the correction corresponding amount at the valve closing instruction timing". Simultaneously, the feedback correction amount is corrected in such a manner that the partition amount is subtracted from the feedback correction amount.

More specifically, the partition ratio determining means sets (or determines) the partition ratio (i.e., taking-in-ratio) based on the operation state parameter of the engine, detected by the engine operation parameter detecting means. The partition ratio indicates what percentage of "the correction corresponding amount at the valve closing instruction timing" should be taken into the purge correction amount. The partition ratio is predetermined according to experiments or the like in such a manner that the partition ratio is a ratio that can minimize a fluctuation of the air-fuel ratio after the purge control valve closing instruction timing with respect to various engine operating parameters (e.g., the revolution speed of the engine and the load of the engine). The predetermined relationship between the partition ratio and the operation state parameter of the engine is stored in the control apparatus in the form of a look-up table (a map for determining the ratio) or a function, for instance. The partition ratio determining means determines the actual partition ratio by using the operation state parameter(s) of the engine detected by the engine operation parameter detecting means and one of the look-up table and the function.

For instance, the intake-air flow and the fuel injection amount per a unit time increase as the load of the engine increases. Thus, if the feedback correction amount is decreased by the correction corresponding amount at the valve closing instruction timing when the deviation amount of the base of the air-fuel ratio is relatively large at the purge control valve closing instruction timing, it is difficult to suppress a large fluctuation of the air-fuel ratio by varying the feedback correction amount after the purge control valve closing instruction timing. Accordingly, the partition ratio is determined in such a manner that the partition ratio becomes smaller as the load of the engine becomes larger, for instance.

Likewise, the intake-air flow increases as the revolution speed of the engine increases. Thus, if the feedback correction amount is decreased by the correction corresponding amount at the valve closing instruction timing when the deviation amount of the base of the air-fuel ratio is relatively large at the purge control valve closing instruction timing, it is difficult to suppress a large fluctuation of the air-fuel ratio by varying the feedback correction amount after the purge control valve closing instruction timing. Accordingly, the partition ratio is determined in such a manner that the partition ratio becomes smaller as the revolution speed of the engine becomes larger, for instance.

As described above, the partition ratio is determined based on the operation state parameter of the engine. As a result, it is possible to avoid the large fluctuation of the actual air-fuel ratio after the purge control valve closing instruction timing in a case where the base air-fuel ratio learning is not completed.

It is preferable that the control apparatuses described above further comprise filtering means for obtaining filtered feedback correction amount by performing filtering processing on the feedback correction amount calculated by the feedback correction amount calculating means, the filtering processing is for passing only low frequency components in the feedback correction amount, and that the evaporated fuel gas concentration learning value correcting means be configured so as to use, as the amount corresponding to the correction amount to correct the base injection amount at the timing immediately before the feedback correction amount is corrected to the base value, an amount corresponding to a correction amount to correct the base injection amount, the correction amount being indicated by the filtered feedback correction amount at the purge control valve closing instruction timing.

The air-fuel ratio of the internal combustion engine fluctuates transiently due to various reasons when the engine is transiently operated. Therefore, the feedback correction amount has high frequency components under the influence of the transient fluctuations of the air-fuel ratio. On the other hand, the purge amount of the evaporated fuel gas does not vary rapidly, and therefore, it is unlikely that the evaporated fuel gas purge superimposes high frequency components on the feedback correction amount. Accordingly, the filtered feedback correction amount at the purge control valve closing instruction timing is an amount equal to the feedback correction amount from which the disturbance due to the transient operation of the engine is eliminated, and thus represents the deficiency of the purge correction amount with accuracy. Further, by the configuration described above, the evaporated fuel gas concentration learning value is corrected in such a manner that “the amount corresponding to a correction amount to correct the base injection amount” indicated by the filtered feedback correction amount at the purge control valve closing instruction timing is added to the purge correction amount.

As a result, since the purge correction amount after the purge control valve closing instruction timing becomes closer to an appropriate value, it is possible to suppress the fluctuation of the air-fuel ratio after the purge control valve closing instruction timing more effectively.

Further, it is preferable that the filtering means adjust a time constant of the filtering processing based on the operation state parameter(s) of the engine (the operating parameter(s) of the engine).

It should be noted that “the operation state parameter(s) of the engine” is a load of the engine, a revolution speed of the engine, and the like. The load of the engine can be obtained based on one of an intake-air flow, an intake-air amount introduced into a cylinder of the engine, a filling rate of an intake-air amount, an intake pressure, a throttle valve opening, an operation amount of the accelerator pedal, a fuel injection amount, or the like. Thus, the filtering means may detect one of these.

For instance, frequency of the high frequency components contained in the feedback correction amount becomes lower, as the load of the engine becomes lower or as the revolution speed of the engine becomes lower. Thus, the time constant of the filtering processing should be increased, as the load of the engine becomes lower or as the revolution speed of the engine becomes lower. On the other hand, if the time constant of the filtering processing is excessively large, a change of the deficiency of the purge correction amount (i.e., deviation with respect to an amount of the evaporated fuel) emerges in the filtered feedback correction amount with long delay. Therefore, if the time constant of the filtering processing is set to be excessively large, the filtered feedback correction amount at the purge control valve closing instruction timing does not represent the deficiency of the purge correction amount with sufficient accuracy. Accordingly, in view of these facts, the filtering means described above adjusts the time constant of the filtering processing based on the operation state parameter (s) of the engine. As a result, the purge correction amount after the purge control valve closing instruction timing becomes closer to an appropriate value, and therefore, it is possible to suppress the fluctuation of the air-fuel ratio after the purge control valve closing instruction timing more effectively.

BEST MODE FOR CARRYING OUT THE INVENTION

Embodiments of a control apparatus of an internal combustion engine according to the present invention will next be described with reference to the drawings.

a. First Embodiment

Figure 1:
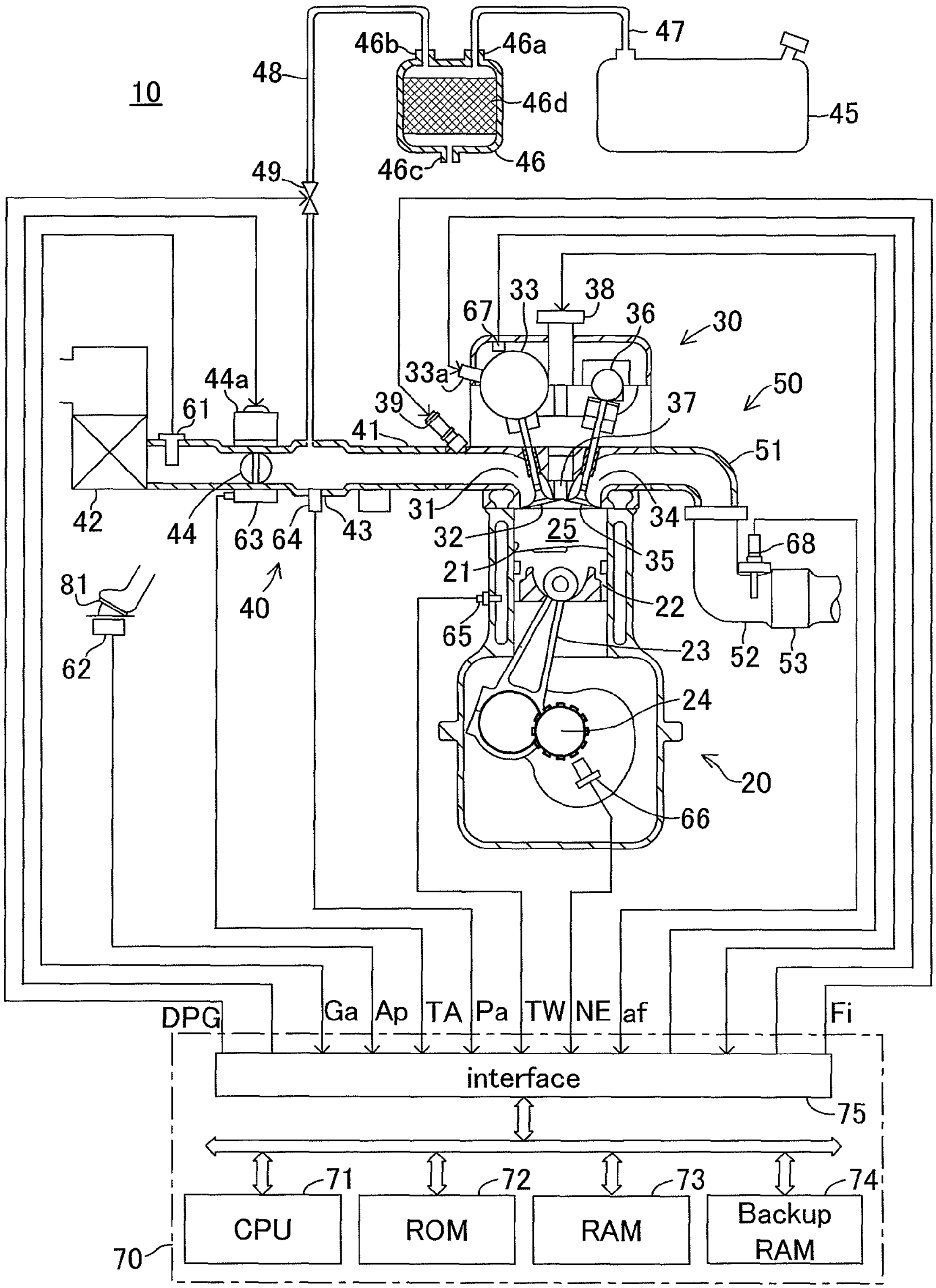
FIG. 1 is a schematic configurational view of an internal combustion engine to which a control apparatus according to a first embodiment of the present invention is applied.

FIG. 1 shows a schematic configuration of a system in which a control apparatus according to a first embodiment of the present invention is applied to an internal combustion engine 10. The engine 10 is a four-stroke, in-line four cylinder engine. FIG. 1 shows a section of a specific cylinder only, but other cylinders also have a similar configuration.

The engine 10 includes a cylinder block section 20 including a cylinder block, a cylinder block lower-case, and an oil pan; a cylinder head section 30 fixed on the cylinder block section 20; an intake system 40 for supplying air (fresh air) to the cylinder block section 20; and an exhaust system 50 for discharging exhaust gas from the cylinder block section 20 to the exterior of the engine.

The cylinder block section 20 includes a cylindrical cylinder 21, a piston 22, a connecting rod 23, and a crankshaft 24. The piston 22 reciprocates within the cylinder 21. The reciprocating motion of the piston 22 is transmitted to the crankshaft 24 via the connecting rod 23, thereby rotating the crankshaft 24. The bore wall surface of the cylinder 21, the top surface of the piston 22, and the bottom surface of a cylinder head section 30 form a combustion chamber 25.

The cylinder head section 30 includes an intake port 31 communicating with the combustion chamber 25; an intake valve 32 for opening and closing the intake port 31; a variable intake timing unit 33 including an intake cam shaft to drive the intake valve 32 for continuously change the phase angle of the intake cam shaft; an actuator 33*a* of the variable intake timing unit 33; an exhaust port 34 communicating with the combustion chamber 25; an exhaust valve 35 for opening and closing the exhaust port 34; an exhaust cam shaft 36 for driving the exhaust valve 35; a spark plug 37 for ignite a mixture by a spark discharge at a sparking electrode exposed at an upper portion of the combustion chamber 25; an igniter 38 including an ignition coil for generating a high voltage to be applied to the spark plug 37; and an injector (fuel injection means) 39 for injecting into the intake port 31 fuel whose amount is based on a signal representing an instructed injection amount Fi.

The intake system 40 includes an intake pipe 41 including a plurality of intake manifolds each of which communicates with the intake port 31 of each of the cylinders; an air filter 42 disposed at an upstream end of the intake pipe 41; a surge tank 43 formed at an aggregated portion of the intake manifolds in the intake pile 41; a throttle valve 44 rotatably supported in the intake pipe 41; and a throttle motor 44*a* for rotatably drive the throttle valve 44 to vary the cross-sectional area of the opening of an intake pipe 41. It should be noted that the intake ports 31, the intake pipe 41, and the surge tank 43 constitute an intake passage.

Further, the internal combustion engine 10 includes a fuel tank 45 for storing liquid fuel; a canister 46 which is capable of adsorbing and storing evaporated fuel generated in the fuel tank 45; a vapor collection pipe 47 for introducing gas containing the evaporated fuel from the fuel tank 45 into the canister 46; a purge pipe 48 for introducing, as an evaporated fuel gas, an evaporated fuel which is desorbed from the canister 46 into the surge tank 43, the intake pipe 41, and the intake ports 31; and a purge control valve 49 disposed in the purge passage.

In the present embodiment, the vapor correction pipe 47 and the purge pipe 48 constitute purge passage. The purge control valve 49 is configured so as to vary the cross-sectional area of a passage formed by the purge pipe 48 by adjusting an opening (opening period) of the valve 49 based on a drive signal representing a duty ratio DPG which is an instruction signal. The purge control valve 48 fully (completely) closes the purge pipe 48 when the duty ratio DPG is “0”. That is, the purge control valve 49 is configured in such a manner that it is disposed in the purge passage and its opening is varied in response to the instruction signal.

The canister 46 is a well-known charcoal canister. The canister 46 includes a housing which has a tank port 46*a* connected to the vapor collection pipe 47, a purge port 46*b* connected to the purge pipe 48, an atmosphere port 46*c* exposed to atmosphere. The canister 46 accommodates, in the housing, adsorbents 46*d* for adsorbing the evaporated fuel. The canister 46 adsorbs and stores the evaporated fuel generated in the fuel tank 45 while (or during a period for which) the purge control valve 49 is completely closed. The canister 46 discharges the adsorbed/stored evaporated fuel as the evaporated fuel gas into the purge pipe 48 while (or during a period for which) the purge control valve 49 is opened.

The exhaust system 50 includes a plurality of exhaust manifolds 51 each of which communicates with the exhaust port 37 of each of the cylinders; an exhaust pipe 52 communicating with an aggregated portion of the plurality of exhaust manifolds 51; and a 3-way catalytic unit 53 disposed in the exhaust pipe 52. An exhaust gas formed from a mixture gas which is introduced into the combustion chamber 25 and burnt in the combustion chamber 25 is discharged into an exhaust passage constituted by the exhaust manifolds 51, the exhaust pipe 52 an the like.

The engine 10 includes an air flowmeter 61, an accelerator opening sensor 62, a throttle position sensor 63; an intake pressure sensor 64; a water temperature sensor 65; a crank position sensor 66, a cam position sensor 67, and an air-fuel ratio sensor 68.

The air flowmeter 61 outputs a signal indicative of a flow rate Ga of intake air introduced into the intake pipe 41. The accelerator opening sensor 62 outputs a signal indicative of a travel Ap of an accelerator pedal 81 operated by a driver. The throttle position sensor 63 detects an opening of the throttle valve 44 to output a signal indicative of a throttle valve opening TA. The intake pressure sensor 64 detects a pressure in the surge tank 43 which is an intake air pressure to output a signal indicative of the intake air pressure Pa. The water temperature sensor 65 detects a temperature of the cooling water of the engine 10 to output a signal indicative of a cooling-water temperature TW.

The crank position sensor 66 outputs a signal which has a narrow pulse every 10° rotation of the crank shaft 24 and a wide pulse every 360° rotation of the crank shaft 24. The pulse signal represents a revolution speed NE of the engine 10. The cam position sensor 67 generates a signal (G2 signal) having a single pulse every time the intake cam shaft rotates by 90 degrees (i.e., every time the crankshaft 24 rotates by 180 degrees). The air-fuel ratio sensor 68 is disposed in the exhaust pipe 52 and detects an air-fuel ratio based on an oxygen concentration in the burnt gas (exhaust gas) which flows through the position at which the air-fuel ratio sensor 68 is disposed and flows into the catalytic unit 53 to thereby output a signal indicative of an air-fuel ratio af (detected air-fuel ratio af) of the mixture which was supplied to the engine 10.

An electric control device 70 is a microcomputer, which includes a CPU 71; a ROM 72 in which programs to be executed by the CPU 71, tables (look-up tables, maps), constants, and the like are stored in advance; a RAM 73 in which the CPU 71 stores data temporarily as needed; a backup RAM 74, which stores data while power is held on and which retains the stored data even while the power is held off; an interface 75 including an AD converter; and so on. The interface 75 is connected to the sensors 61 to 68 and is configured in such a manner that the interface 75 supplies signals from the sensors 61 to 68 to the CPU 71. The interface 75 is connected to the actuator 33*a*, the igniter(s) 38, the injector(s) 39, the throttle motor 44*a*, and the purge control valve 49 and is configured in such a manner that the interface 75 sends drive signals (instruction signals) from the CPU 71 to these devices.

(General Outline of the Fuel Injection Control Under a Normal Operating State)

Figure 2:
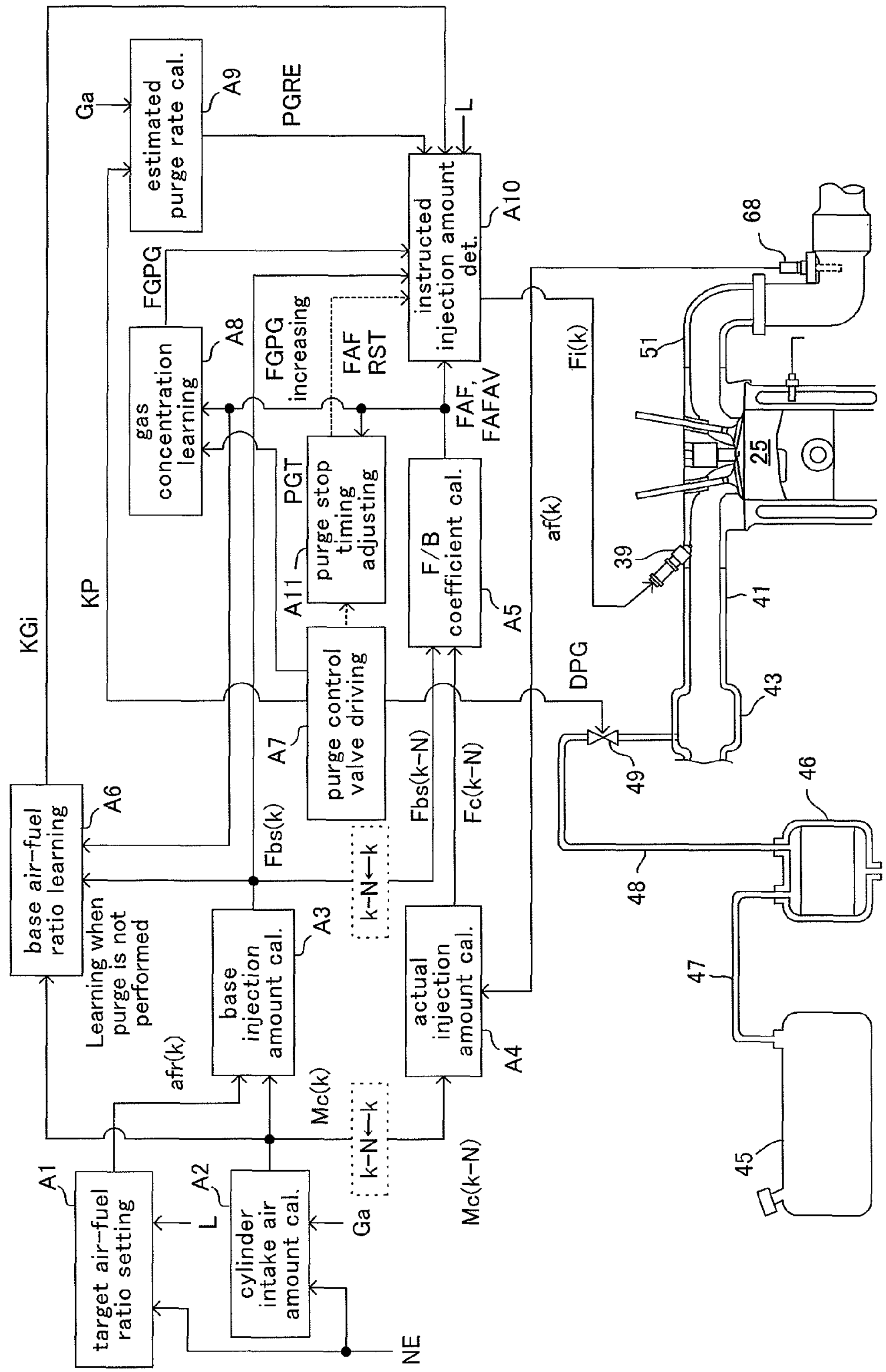
FIG. 2 is a block diagram showing functions to describe a control of a fuel injection amount by the control apparatus shown in FIG. 1.

Next will be described an outline on how the thus-configured control apparatus determines a fuel injection amount Fi and carries out the fuel injection under a normal operating state. FIG. 2 shows a block diagram for explaining the outline of fuel injection control by the present apparatus. Each of sections shown in FIG. 2 corresponds to a part of programs executed by the CPU 71. The CPU 71 performs air-fuel ratio feedback control, base air-fuel ratio learning, evaporated fuel gas purge, and evaporated fuel gas concentration learning (vapor concentration learning) by executing these programs. It should be noted that feedback is sometimes abbreviated to "F/B" in the following descriptions and drawings.

<Air-fuel Ratio Feedback Control>

The present apparatus calculates (obtains) a feedback correction coefficient FAF for correcting the instructed injection amount Fi in such a manner that an actual air-fuel ratio of the engine becomes equal to a predetermined target air-fuel ratio afr during the air-fuel feedback control. The feedback correction coefficient FAF is a coefficient by which a base injection amount Fbs is multiplied in order to correct the base injection amount Fbs. Therefore, the feedback correction coefficient FAF neither increase nor decrease the base injection amount Fbs (i.e., the feedback correction coefficient FAF does not correct the base injection amount Fbs), when the feedback correction coefficient FAF is "1". In other words, a base value of the feedback correction coefficient FAF is "1". The feedback correction coefficient FAF is also referred to as "a feedback correction amount".

As shown in FIG. 2, the present apparatus includes a target air-fuel ratio setting section A1, a cylinder intake air amount calculation section A2, a base injection calculation section A3, an actual injection amount calculation section A4, and a feedback correction coefficient calculation section A5, in order to perform the air-fuel ratio feedback control. Hereinafter, each of the sections is described by focusing on one specific cylinder. However, it should be noted that the same air-fuel ratio feedback control is performed for the other cylinders.

—The Target Air-fuel Ratio Setting Section A1—

The target air-fuel ratio setting section A1 set the target air-fuel ratio afr(k) at (or to) a stoichiometric (theoretical) air-fuel ratio af0 except for particular states such as warming-up operating state of the engine 10 or the like. Notably, the target air-fuel ratio setting section A1 may be configured so as to set the target air-fuel ratio afr(k) based on a revolution speed NE, a load L, a cooling water temperature TW, and a map (look-up table) Mapafr, as shown in the equation (1) below. The map Mapafr defines a relationship among the revolution speed NE, the load L, the water temperature TW, and the target air-fuel ratio afr(k). The load L is represented by the flow rate Ga of intake air, the filling rate KL, the intake pressure Pa, the throttle valve opening TA, the operation amount Ap of the accelerator pedal, or the like. A value with a parameter k indicates that the value is for the current combustion cycle of the specific cylinder. Thus, the target air-fuel ratio afr(k) is a target air-fuel ratio for the current combustion cycle of the specific cylinder. The target air-fuel ratio afr(k−N) is a target air-fuel ratio for a combustion cycle N cycles before the current combustion cycle of the specific cylinder.

$$afr(k)=\mathrm{Map}afr(NE,L,TW) \tag{1}$$

—The Cylinder Intake Air Amount Calculation Section A2—

The cylinder intake air amount calculation section A2 obtains a cylinder intake air amount Mc(k) based on the flow rate Ga of intake air, the revolution speed NE, and a Map MapMC, as shown in the equation (2) below. The Map MapMC defines a relationship among the flow rate Ga of intake air, the revolution speed NE, and the cylinder intake air amount Mc. The cylinder intake air amount Mc(k) is an amount of air (fresh air) to be introduced into the specific cylinder during the current combustion cycle (i.e., the current intake stroke). The cylinder intake air amount calculation section A2 stores the cylinder intake air amount Mc(k) with information indicating the cycle of the specific cylinder. It should be noted that the cylinder intake air amount Mc(k) may be obtained by using a well-known intake air amount estimating model.

$$Mc(k)=\mathrm{Map}Mc(Ga,NE) \tag{2}$$

—The Base Injection Calculation Section A3—

The base injection calculation section A3 obtains the base injection amount Fbs(k) for making the air-fuel ratio of the engine 10 equal to the target air-fuel ratio afr(k) through dividing the cylinder intake air amount Mc (k) obtained by the cylinder intake air amount calculation section A2 by the target air-fuel ratio afr(k) set by the target air-fuel ratio setting section A1, as shown in the equation (3) below. The base injection amount Fbs(k) is a base injection amount for the current combustion cycle. The base injection amount Fbs(k) is a feedforward control amount determined based on the operating states (conditions) of the engine 10, the feedforward control amount being for making the air-fuel ratio of the mixture provided to the combustion chamber 25 equal to the target air-fuel ratio afr(k), the mixture being formed by the fuel injected from the injector 39. The base injection calculation section A3 stores the base injection amount Fbs(k) with information indicating the cycle of the specific cylinder. It should be noted that the base injection calculation section A3 may be configured so as to obtain the base injection amount Fbs(k) based on the cylinder intake air amount Mc(k), the target air-fuel ratio afr(k), and a Map MapFbs, for instance. In this case, the Map MapFbs defines a relationship among the cylinder intake air amount Mc(k), the target air-fuel ratio afr(k). and the base injection amount Fbs(k).

$$Fbs(k)=\frac{Mc(k)}{afr(k)} \tag{3}$$

—The Actual Injection Amount Calculation Section A4—

The actual injection amount calculation section A4, as shown in the equation (4) below, obtains an actual injection amount Fc(k−N) for the cycle N cycles before the current cycle through dividing the cylinder intake air amount Mc(k−N) by the current detected air-fuel ratio af(k) at the present time detected by the air-fuel ratio sensor 68. The value N is a value to be determined based on a displacement of the engine 10, a distance from the combustion chamber 25 to the air-fuel ratio sensor 68, and the like. The reason why the cylinder intake air amount Mc(k−N) for the cycle N cycles before the current cycle and the current detected air-fuel ratio af(k) are used in order to obtain the actual injection amount Fc(k−N) for the cycle N cycles before the current cycle is because the bunt gas generated in the combustion chamber 25 requires time corresponding to the N cycles of the engine 10 to reach the air-fuel ratio sensor 68 disposed in the exhaust pipe 52.

$$Fc(k-N)=\frac{Mc(k-N)}{af(k)} \tag{4}$$

—The Feedback Correction Coefficient Calculation Section A5—

The feedback (F/B) correction coefficient calculation section A5 calculates the feedback correction coefficient FAF using the base injection amount Fbs(k) for the cycle N cycles before the current cycle and the actual injection amount Fc(k−N) for the cycle N cycles before the current cycle. More specifically, as shown in the equation (5) below, the feedback correction coefficient calculation section A5 obtains a difference (deviation) DFc(k) of the injection amount by subtracting the actual injection amount Fc(k−N) from the base injection amount Fbs(k−N). The base injection amount Fbs(k−N) is a target injection amount for a cylinder of a cycle N cycles before the current cycle, because, as is clear from the equation (3) above, the base injection amount Fbs(k−N) is a value obtained through dividing the cylinder intake air amount Mc(k−N) for the cycle N cycles before the current cycle by the target air-fuel ratio afr(k−N) for the cycle N cycles before the current cycle. Therefore, the difference (deviation) DFc (k) represents an excess and deficiency amount of the fuel injected for the cycle N cycles before the current cycle. The difference (deviation) DFc(k) becomes a positive value if the amount of the fuel injected for the cycle N cycles before the current cycle is deficient, and becomes a negative value if the amount of the fuel injected for the cycle N cycles before the current cycle is excessive.

$$DFc(k)=Fbs(k-N)-Fc(k-N) \tag{5}$$

Thereafter, the feedback correction coefficient calculation section A5 performs a proportional-integral control processing (PI processing) with respect to the difference (deviation) DFc(k) to obtain the feedback correction amount DF(k) based on the equation (6) below. In equation (6), Gp is a predetermined proportional gain (proportional constant) and Gi is a predetermined integral gain (integral constant). SDFc(k) is a temporal integrated value of the difference (deviation) DFc (k).

$$DF(k)=Gp\cdot DFc(k)+Gi\cdot SDFc(k) \tag{6}$$

Further, the feedback correction coefficient calculation section A5 calculates the feedback correction coefficient FAF (k) by applying the feedback correction amount DF(k) and the base injection amount Fbs(k) to equation (7) below. That is, the feedback correction coefficient FAF(k) is obtained through dividing “a value obtained by adding the feedback correction amount DF(k) to the base injection amount Fbs (k)” by “the base injection amount Fbs(k)”. The feedback correction coefficient FAF(k) is multiplied by the base injection amount Fbs(k) in order to determine the instructed injection amount Fi(k) in an instructed injection amount determining section A10 described later. These are the outline of the air-fuel feedback control.

$$FAF(k)=\frac{Fbs(k)+DF(k)}{Fbs(k)}=1+\frac{DF(k)}{Fbs(k)}=1+\varepsilon \tag{7}$$

It should be noted that the feedback correction coefficient calculation section A5 obtains a weighted average of the current feedback correction coefficient FAF(k) and a previously calculated value FAFAV(k−1) as shown in equation (8) below, with respect to the thus calculated feedback correction coefficient FAF(k), and stores the weighted average as a correction coefficient average FAFAV(k). The correction coefficient average FAFAV(k) is used for obtaining a base air-fuel ratio learning coefficient KGi and an evaporated fuel gas concentration learning value FGPG, both described later. Therefore, the correction coefficient average FAFAV(k) is referred to as “a feedback value for learning” which varies in accordance with the feedback correction amount. Notably, m in equation (8) is a constant larger than 0 and smaller than 1.

$$FAFAV(k)=m\cdot FAF(k)+(1-m)\cdot FAFAV(k-1) \tag{8}$$

<Base Air-fuel Ratio Learning>

The present apparatus renews (obtains) a base correction coefficient KG based on the feedback value for learning (correction coefficient average FAFAV(k)) so as to make the feedback correction coefficient FAF closer to the base value “1” during “a purge control valve closing instruction period (during which the duty ratio DPG is “0”)” for which an instruction signal is sent to the purge control valve 49, the instruction signal being a signal to keep the purge control valve 49 in a state in which the purge control valve 49 is completely closed. This renewal of the base correction coefficient KG is also referred to as a base air-fuel ratio learning. Thus, “the base correction coefficient KG” is referred to as “a base air-fuel ratio learning value”.

Further, an air-fuel ratio realized by the above-described base injection amount Fbs is referred to as a base air-fuel ratio during the purge control valve closing instruction period. The base air-fuel ratio may deviate from the target air-fuel ratio afr(k) due to a characteristic variation of the injector 39 and the like. This deviation of the base air-fuel ratio from the target air-fuel ratio afr(k) (deviation of the base air-fuel ratio) is reflected to or emerges on the feedback correction coefficient FAF and thus the correction coefficient average FAFAV. Accordingly, the base correction coefficient KG is learned (renewed) based on the correction coefficient average FAFAV in the base air-fuel ratio learning. The base correction coefficient KG is a coefficient to correct the base injection amount Fbs through multiplying the base correction coefficient KG by the base injection amount Fbs. Thus, the base correction coefficient KG neither increase nor decrease the base injection amount Fbs (the KG does not correct the base injection amount Fbs) when the base correction coefficient KG is equal to “1”. That is, a base value for the base correction coefficient KG is “1”. A base air-fuel ratio learning section A6 shown in FIG. 2 is provided for performing the base air-fuel ratio learning.

—The Base Air-fuel Ratio Learning Section A6—

The base air-fuel ratio learning section A6 renews the base air-fuel ratio learning coefficient KGi by adding a renewal value X which is a predetermined minute positive value to the base air-fuel ratio learning coefficient KGi as shown in equation (9) below, if a deviation $\epsilon$ a of the correction coefficient average FAFAV from the base value “1” is larger than a predetermined value $\alpha(\alpha>0)$. To the contrary, the base air-fuel ratio learning section A6 renews the base air-fuel ratio learning coefficient KGi by subtracting the renewal value X from the base air-fuel ratio learning coefficient KGi as shown in equation (10) below, if the deviation $\epsilon$ a is smaller than the value $(-\alpha)$. In addition, the base air-fuel ratio learning section A6 does not renew the base air-fuel ratio learning coefficient KGi if the deviation $\epsilon$ a is between the value $(-\alpha)$ and the value ($\alpha$). The base air-fuel ratio learning coefficient KGi is renewed while the air-fuel ratio feedback control is performed and during the purge control valve closing instruction period.

$$KGi \leftarrow KGi+X \tag{9}$$

$$KGi \leftarrow KGi-X \tag{10}$$

Notably, the suffix i of the base air-fuel ratio learning coefficient KGi means that there are a plurality of learning areas different each other depending on a magnitude of the load L. That is, a plurality of areas i corresponding to the magnitude of the load L are set in advance as the learning areas i. The base air-fuel ratio learning section A6 renews the base air-fuel ratio learning coefficient KGi corresponding to the learning area i to which the load L belongs when the base air-fuel ratio learning coefficient KGi is renewed. The instructed injection amount determining section A10, which will be described later, selects the base air-fuel ratio learning coefficient KGi in accordance with the load L, and use the selected base air-fuel ratio learning coefficient KGi as the base correction coefficient KG.

<Evaporated Fuel Gas Purge and Purge Concentration Learning>

The present apparatus opens the purge control valve 49 in order to perform the evaporated fuel gas purge (or in order to purge the evaporated fuel gas). This allows the evaporated fuel adsorbed in the canister 46 to pass through the purge pipe 48 as the evaporated fuel gas and to be supplied into the surge tank 43 (the intake passage). A purge control valve driving section A7 shown in FIG. 2 is provided to control an amount of the evaporated fuel gas purge by varying the opening of the purge control valve 49.

Meanwhile, greatness of an impact on the air-fuel ratio of the engine 10 exerted by the evaporated fuel gas which is purged varies in response to a flow of the evaporated fuel gas and a concentration of the evaporated fuel contained in the evaporated fuel gas. In view of this, the present apparatus learns, as an evaporated fuel gas concentration learning value FGPG, a value relating to the concentration of the evaporated fuel contained in the evaporated fuel gas. The apparatus obtains an estimated purge base flow KPE which is a base value to obtain the flow of the evaporated fuel gas introduced into the combustion chamber 25. Further, the present apparatus estimates (or calculates) an estimated purge flow KPEM based on the estimated purge base flow KPE. The estimated purge flow KPEM is an estimated amount of the evaporated fuel gas introduced into the combustion chamber 25. The apparatus calculates an estimated purge rate PGRE based on the estimated purge flow KPEM and the flow rate Ga of intake air. The estimated purge rate PGRE is an estimated purge flow per a unit flow rate Ga of intake air.

Thereafter, the apparatus calculates a purge correction coefficient FPG using the evaporated fuel gas concentration learning value FGPG and the estimated purge rate PGRE. The base injection amount Fbs is multiplied by the purge correction coefficient FPG, and thus, the purge correction coefficient FPG is a coefficient to correct the instructed injection amount Fi in such a manner that the instructed injection amount Fi is decreased by an amount equal to an amount of the evaporated fuel contained the evaporated fuel gas. A base value of the purge correction coefficient FPG is "1". An evaporated fuel gas concentration learning section A8 shown in FIG. 2 is provided to calculate the evaporated fuel gas concentration learning value FGPG. An estimated purge rate calculating section A9 shown in FIG. 2 is provided to calculate the estimated purge rate PGRE. The purge control valve driving section A7, the evaporated fuel gas concentration learning section A8, and the estimated purge rate calculating section A9 are described below.

—The Purge Control Valve Driving Section A7—

The purge control valve driving section A7 opens the purge control valve 49 at (or to) a predetermined opening (which is not equal to zero) while a predetermined purge condition is satisfied. The purge condition is satisfied when the engine 10 is being operated under a steady condition (e.g., a change amount per a unit time of the load L is smaller than a predetermined value) and the air-fuel ratio feedback control condition is satisfied (i.e., the feedback control is being performed). The purge condition may include the other conditions, such as a condition that an amount of fuel remaining in the fuel tank 45 is larger than a predetermined amount.

More specifically, the purge control valve driving section A7 set a target purge rate PGT based on the operating parameters of the engine, when the purge condition is satisfied. The target purge rate PGT is a value defined as a ratio of a purge flow KP (which is a flow of the evaporated fuel gas passing through the purge control valve 49, and is hereinafter simply referred to as "a control valve position purge flow KP") to the flow rate Ga of intake air.

The purge control valve driving section A7 increases the target purge rate PGT when the correction coefficient average FAFAV is within a predetermined range and the operating condition of the engine is stable. The purge control valve driving section A7 decreases the target purge rate PGT when the correction coefficient average FAFAV is not within the predetermined range. It should be noted that the purge control valve driving section A7 sets an upper limit for the target purge rate PGT as appropriately. For instance, Japanese laid open patent application H9-303219 discloses the way to set the target purge rate PGT in detail.

Thereafter, the purge control valve driving section A7 obtains the control valve position purge flow KP, as shown in equation (11) below, through multiplying the set target purge rate PGT by the flow rate Ga of intake air. The control valve position purge flow KP is a target value for the flow of the evaporated fuel gas passing through the purge control valve 49.

$$KP=Ga\cdot PGT \tag{11}$$

Next, the purge control valve driving section A7 obtains, as shown in equation (12) below, a full open purge rate PGRMX based on the revolution speed NE, the load L, and a map MapPGRMX. The full open purge rate PGRMX represents a purge rate when the purge control valve 49 is fully opened (i.e., a ratio of the control valve position purge flow KP to the flow rate Ga of intake air when the purge control valve 49 is fully opened). The map MapPGRMX is formed based on experiments or simulation results. According to the map MapPGRMX, the full open purge rate PGRMX becomes smaller as the revolution speed NE becomes higher or the load L becomes higher.

$$PGRMX=\mathrm{Map}PGRMX(NE,L) \tag{12}$$

Meanwhile, the purge control valve 49 is completely (fully) opened when it is driven by the duty ratio of 100%. The duty ratio of the purge control valve 49 is a ratio (Topen/T) of a time duration for which the purge control valve is kept opened to a predetermined constant period T, wherein the purge control valve 49 is closed once and is opened once for the period T. Accordingly, the purge control valve driving section A7, as shown in equation (13) below, obtains the duty ratio DPG through multiplying "a value obtained by dividing the target purge rate PGT by the full open purge rate PGRMX" by "100". The purge control valve driving section A7 drives the purge control valve 49 based on the duty ratio DPG.

$$DPG = \frac{PGT}{PGRMX} \times 100 \quad (13)$$

—The Evaporated Fuel Gas Concentration Learning Section A8—

The evaporated fuel gas concentration learning section A8 learns (or obtains, renews) a value relating to a concentration of the evaporated fuel contained in the evaporated fuel gas as "an evaporated fuel gas concentration learning value", based on a value relating to the feedback correction amount (the correction coefficient average FAFAV) during "an purge control valve opening instruction period" for which an instruction signal (the duty ratio DPG) is being sent to the purge control valve 49, the instruction signal being for opening the purge control valve at (or to) the predetermined opening (which is an opening obtained when the valve 49 is not completely closed).

More specifically, the evaporated fuel gas concentration learning section A8, as shown in equation (14) below, renews the evaporated fuel gas concentration learning value FGPG by a renewal value tFG which will be described later, only when an absolute value of the deviation $\epsilon$ a of the correction coefficient average FAFAV obtained by the feedback correction coefficient calculation section A5 from the base value "1" is larger than a predetermined positive value β (β>0). In the present embodiment, the evaporated fuel gas concentration learning section A8 obtains the current evaporated fuel gas concentration learning value FGPG by adding the renewal value tFG to the previously calculated evaporated fuel gas concentration learning value FGPG, when the correction coefficient average FAFAV becomes a value which increases or decreases the base injection amount Fbs by more than 2%, for instance.

$$FGPG \leftarrow FGPG + tFG \quad (14)$$

An initial value of the evaporated fuel gas concentration learning value FGPG is "1". The renewal value tFG is obtained by dividing the deviation $\epsilon$ a of the correction coefficient average FAFAV from the base value "1" by the target purge rate PGT, as shown in equation (15) below. That is, the renewal value tFG corresponds to the deviation $\epsilon$ a per the target purge rate of 1%. Thus, the renewal value tFG becomes larger as the deviation $\epsilon$ a becomes larger, and an absolute value of the renewal value tFG becomes larger as the target purge rate PGT becomes smaller. On the other hand, the renewal of the evaporated fuel gas concentration learning value FGPG is stopped during the purge control valve closing instruction period. As a result, the evaporated fuel gas concentration learning value FGPG becomes a value corresponding to the evaporated fuel gas concentration (i.e., a value which becomes smaller as the evaporated fuel gas concentration becomes larger). The evaporated fuel gas concentration learning value FGPG is stored in the backup RAM 74.

$$tFG = \frac{\varepsilon\alpha}{PGT} \quad (15)$$

—The Estimated Purge Rate Calculating Section A9—

The estimated purge rate calculating section A9 calculates the estimated purge base flow KPE which is used to obtain the flow of the evaporated fuel gas being introduced into the combustion chamber 25. Further, the estimated purge rate calculating section A9 calculates the estimated purge flow KPEM based on the estimated purge base flow KPE, and then calculates the estimated purge rate PGRE based on the estimated purge flow KPEM.

The estimated purge rate calculating section A9 is based on the premise that the evaporated fuel gas whose flow is the above-described control valve position purge flow KP actually passes through the purge control valve 49. In addition, the estimated purge rate calculating section A9 is based on the premise that the evaporated fuel gas which passes through the purge control valve 49 will be introduced into the combustion chamber 25 a certain delay time TD later. The delay time corresponds to the evaporated fuel gas transportation delay time.

Under these premises, the estimated purge rate calculating section A9 firstly determines the delay time TD based on the revolution speed NE (e.g., the delay time may be a time for 10 strokes of the engine 10). The delay time TD is determined based on a delay time setting map which defines a relationship between the revolution speed NE and the delay time TD, for instance. According to the delay time setting map, the delay time TD is obtained in such a manner that the delay time TD becomes shorter as the revolution speed NE becomes larger.

Subsequently, the estimated purge rate calculating section A9 substitutes the control valve position purge flow KP which was obtained by the purge control valve driving section A7 the delay time TD before the present time into the estimated purge base flow KPE. Meanwhile, a flow of the gas passing through the purge control valve 49 varies roughly with first order lag with respect to open-close operation of the purge control valve 49. Accordingly, the estimated purge rate calculating section A9 obtains the estimated purge base flow KPE by implementing "dulling operation (first order lag operation)" for the estimated purge base flow KPE, as shown in equation (16) below. In equation (16), κ is a constant which is larger than 0 and smaller than 1. κ is adjusted in advance based on experiments or simulation results in such a manner that an actual change of the flow of the evaporated fuel gas caused by the open-close operation of the purge control valve 49 is reflected on the value KPEM.

$$KPEM \leftarrow \kappa \cdot KPEM + (1-\kappa) \cdot KPE \quad (16)$$

As described above, the estimated purge rate calculating section A9 obtains the control valve position purge flow KP based on the value relating to the opening of the purge control valve 49 (i.e., the target purge rate PGT). The estimated purge rate calculating section A9 estimates, based on the control valve position purge flow KP, the flow of the evaporated fuel gas being introduced into the combustion chamber 25 as the estimated purge flow KPEM, in consideration of the transport delay period TD for the evaporated fuel gas to move from the purge control valve 49 to the combustion chamber 25 and in consideration of a behavior (the first order lag characteristic) of the evaporated fuel gas passing through the purge control valve 49 with respect to the value relating to the opening of the purge control valve 49.

Further, the estimated purge rate calculating section A9 obtains the estimated purge rate PGRE through dividing the estimated purge flow KPEM by the flow rate Ga of intake air, as shown in equation (17) below.

$$PGRE = \frac{KPEM}{Ga} \quad (17)$$

<Determining the Instructed Injection Amount>

The present apparatus determines the instructed injection amount Fi by using the base injection amount Fbs, the feedback correction coefficient FAF, the base air-fuel ratio learning coefficient KGi, the evaporated fuel gas concentration learning value FGPG, and the estimated purge rate PGRE. The instructed injection amount determining section A10 shown in FIG. 2 is provided in order to determine the instructed injection amount Fi (a final fuel injection amount).

—The Instructed Injection Amount Determining Section A10—

The instructed injection amount determining section A10 firstly calculates the purge correction coefficient (purge correction amount) FPG based on the estimated purge rate PGRE obtained by the estimated purge rate calculating section A9 and the evaporated fuel gas concentration learning value FGPG obtained by the evaporated fuel gas concentration learning section A8, as shown in equation (18) below. That is, the instructed injection amount determining section A10 obtains the purge correction coefficient FPG by adding "1" to a product of a deviation of the evaporated fuel gas concentration learning value FGPG from "1" and the estimated purge rate PGRE. As described above, the base value of the evaporated fuel gas concentration learning value FGPG is "1". The evaporated fuel gas concentration learning value FGPG becomes smaller as the evaporated fuel gas concentration becomes higher. Therefore, according to equation (18), the purge correction coefficient FPG becomes smaller as the evaporated fuel gas concentration becomes higher or as the estimated purge rate PGRE becomes larger.

$$FPG = 1 + PGRE \cdot (FGPG - 1) \quad (18)$$

Thereafter, the instructed injection amount determining section A10 selects, as the base correction coefficient KG, a coefficient corresponding to the learning area i in accordance with the load L among the base air-fuel ratio learning coefficients KGi. Next, the instructed injection amount determining section A10 determines the instructed injection amount Fi(k) through multiplying he base injection amount Fbs(k) by a product of the feedback correction coefficient FAF(k), the base correction coefficient KG, and the purge correction coefficient FPG, as shown in equation (19) below. The instructed injection amount determining section A10 instructs the injector 39 to inject the fuel of the instructed injection amount Fi(k).

$$Fi(k) = KG \cdot FPG \cdot FAF(k) \cdot Fbs(k) \quad (19)$$

(Correcting Both the Feedback Correction Amount at the Purge Control Valve Closing Instruction Timing and the Evaporated Fuel Gas Concentration Learning Value at the Purge Control Valve Closing Instruction Timing)

The present apparatus resets the feedback correction coefficient FAF (or corrects the FAF to be the base value "1") at the purge control valve closing instruction timing at which the instruction signal is sent to the purge control valve 49, the instruction signal being for changing a state of the purge control valve 49 from an opening state of the purge control valve 49 (i.e., a state in which the DPG is not equal to 0) to a completely closing state of the purge control valve 49 (i.e., a state in which the DPG is equal to 0). In addition, the apparatus corrects the evaporated fuel gas concentration learning value FGPG at the purge control valve closing instruction timing in such a manner that an amount is added to the purge correction coefficient FPG, the amount corresponding to "an correction amount to correct the fuel injection amount" according to the feedback correction coefficient FAF which was calculated at the purge control valve closing instruction timing and which had a value immediately before the reset.

In order to perform the above described reset of the feedback correction coefficient FAF and the correction of the evaporated fuel gas concentration learning value FGPG (the correction of the purge correction coefficient FPG), the apparatus includes an evaporated fuel gas purge stop timing adjusting section A11.

—The Evaporated Fuel Gas Purge Stop Timing Adjusting Section A11—

The evaporated fuel gas purge stop timing adjusting section A11 determines whether or not the base air-fuel ratio learning is (or has been) completed in the learning area i corresponding to the present load L, when it detects the purge control valve closing instruction timing. More specifically, the evaporated fuel gas purge stop timing adjusting section A11 determines that the base air-fuel ratio learning is (or has been) completed in the learning area i corresponding to the present load L, when the absolute value of the deviation $\epsilon$ a of the correction coefficient average FAFAV from the base value "1" at that time is smaller than the predetermined value $\alpha(\alpha>0)$.

Thereafter, when the evaporated fuel gas purge stop timing adjusting section A11 determines that the base air-fuel ratio learning is completed in the learning area i corresponding to the present load L at the purge control valve closing instruction timing, it corrects the feedback correction coefficient FAF to be the base value (or resets the FAF) and corrects the evaporated fuel gas concentration learning value FGPG in such a manner that an amount is added to the purge correction coefficient FPG, the amount corresponding to an correction amount to correct the base injection amount Fbs by the feedback correction coefficient FAF at a timing immediately before the feedback correction coefficient FAF is corrected to be the base value.

More specifically, the evaporated fuel gas purge stop timing adjusting section A11 performs such correction for the evaporated fuel gas concentration learning value FGPG (thus, the purge correction coefficient FPG) in such a manner that a product of the feedback correction coefficient FAF and the purge correction coefficient FPG remains the same (between) immediately before and immediately after the evaporated fuel gas purge is stopped. Hereinafter, the way of correcting the purge correction coefficient FPG is described.

Figure 3:
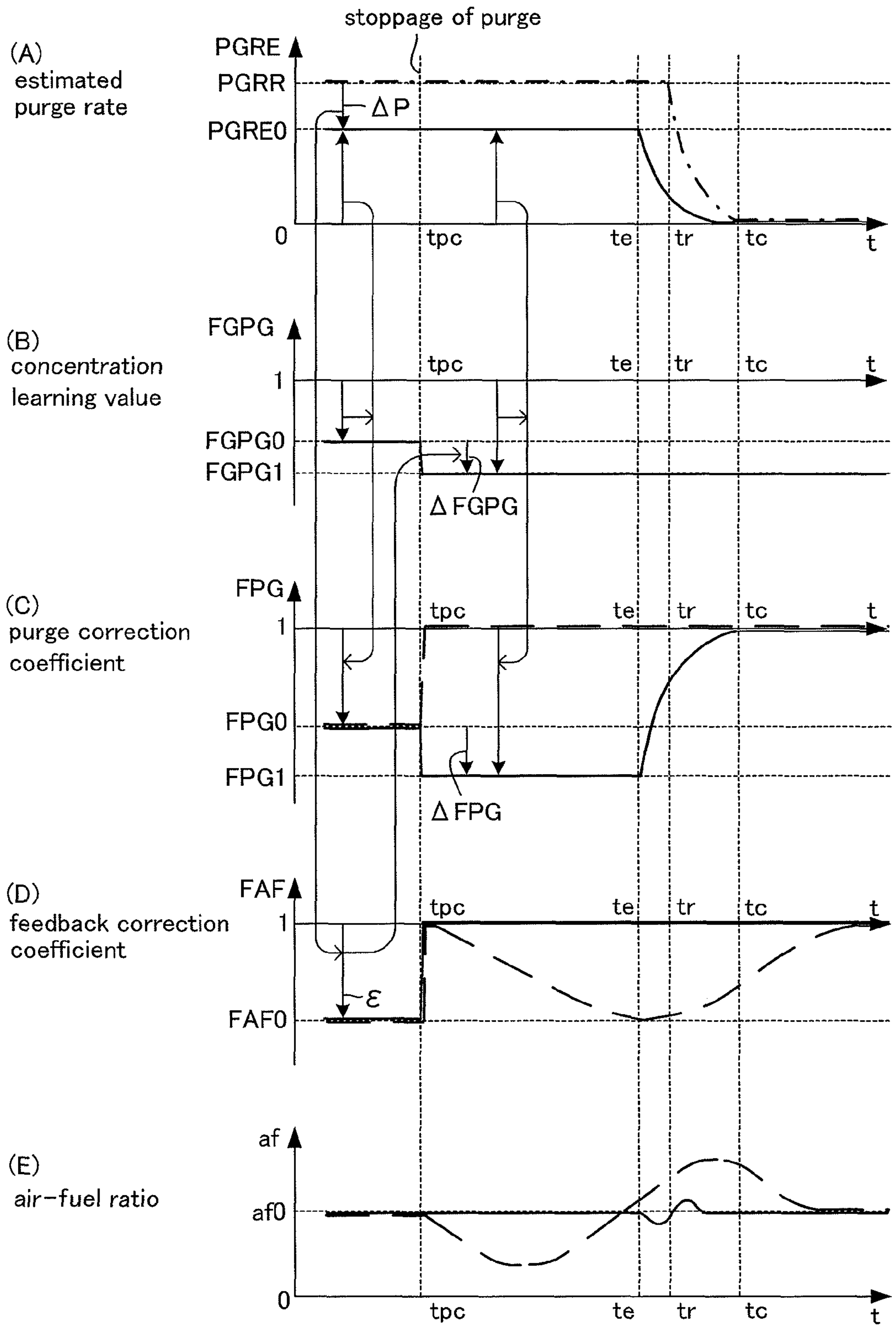
FIG. 3 is a timing chart to describe operations at a purge control valve closing instruction timing when a base air-fuel ratio learning has been completed.

Now, it is assumed that the feedback correction coefficient immediately before the stoppage of the evaporated fuel gas purge is FAF0 (refer to (D) of FIG. 3). The value FAF0 is designated as $(1+\epsilon)$. The $\epsilon$ is a deviation of the FAF0 from "1" and a negative value in this case. Further, it is assumed that the purge correction coefficient immediately before the stoppage of the evaporated fuel gas purge is FPG0 (refer to (C) of FIG. 3). The evaporated fuel gas purge stop timing adjusting section A11 resets the feedback correction coefficient FAF to "1" at the purge control valve closing instruction timing, as described. Therefore, a following equation (20) is satisfied, when the corrected purge correction coefficient immediately after the stoppage of the evaporated fuel gas purge is FPG1.

$$FPG1 = FPG0 \cdot (1+\epsilon) \quad (20)$$

A corresponding concentration learning value ΔFGPG (refer to (B) of FIG. 3), which is an amount corresponding to a correction amount to correct the base injection amount Fbs, the correction amount being in accordance with the deviation ϵ of the feedback correction coefficient FAF0 immediately before the reset. It can be assumed that the estimated purge rate PGRE0 is continuous and remains the same at the timing of the stoppage of the evaporated fuel gas purge (i.e., between a timing immediately before the stoppage of the evaporated fuel gas purge and a timing immediately after the stoppage of the evaporated fuel gas purge). In addition, when the evaporated fuel gas concentration learning value which is corrected immediately after the stoppage of the evaporated fuel gas purge is FGPG1, the above equation (18) (FPG=1+PGRE (FGPG−1)) is satisfied between the purge correction coefficient FPG1 and the estimated purge rate PGRE0. Therefore, equation (21) below is obtained.

$$FPG1=1+PGRE0\cdot(FGPG1-1) \tag{21}$$

Consequently, equation (22) below is obtained from equation (20) and equation (21).

$$FGPG1=\frac{FPG0\cdot(1+\varepsilon)-1}{PGRE0}+1 \tag{22}$$

That is, the evaporated fuel gas concentration learning value FGPG1 is expressed by the deviation ϵ, the purge correction coefficient FPG0, and the estimated purge rate PGRE0.

Accordingly, the corresponding concentration learning value Δ FGPG, which is an amount corresponding to a correction amount to correct the base injection amount Fbs, the correction amount being in accordance with the deviation ϵ of the feedback correction coefficient FAF0 immediately before the reset, is expressed by equation (23) below, in consideration of the relationship expressed by equation (18) described above among the purge correction coefficient FPG0, the estimated purge rate PGRE0, and the evaporated fuel gas concentration learning value FGPG0.

$$\Delta FGPG=FGPG1-FGPG0=\frac{\varepsilon\cdot FPG0}{PGRE0} \tag{23}$$

Accordingly, "the corresponding concentration learning value Δ FGPG", which is an amount corresponding to a correction amount to correct the base injection amount Fbs, the correction amount being in accordance with the deviation ϵ of the feedback correction coefficient FAF0 from "1" at the timing immediately before the reset, can be obtained through dividing "a product of the deviation ϵ of the feedback correction coefficient FAF from "1" and the purge correction coefficient FPG0" by the estimated purge rate PGRE0. The evaporated fuel gas purge stop timing adjusting section A11 corrects the evaporated fuel gas concentration learning value FGPG to be the value FGPG1 by substantially adding the corresponding concentration learning value ΔFGPG to the evaporated fuel gas concentration learning value FGPG0 at the timing immediately before the stoppage of the evaporated fuel gas purge.

Next, the taking the deviation ϵ of the feedback correction coefficient FAF into the evaporated fuel gas concentration learning value FGPG at the purge control valve closing instruction timing will be described in more detail in reference to FIGS. 3 and 4. FIG. 3 schematically shows one example of changes of the purge correction coefficient FPG and the feedback correction coefficient FAF before and after the purge control valve closing instruction timing. Here, it is assumed that the base air-fuel ratio learning (in the learning area i corresponding to the load L of the present time) has been completed before the purge control valve closing instruction timing tpc.

In this example, before the purge control valve closing instruction timing tpc, the estimated purge rate PGRE has reached PGRE0 as shown in (A) of FIG. 3, the evaporated fuel gas concentration learning value FGPG has reached FGPG0 as shown in (B) of FIG. 3. Thus, as shown in (C) of FIG. 3, the purge correction coefficient FPG has reached the purge correction coefficient FPG0(=1+PGRE0(FGPG0−1)) obtained by applying the estimated purge rate PGRE0 and the evaporated fuel gas concentration learning value FGPG0 to equation (18) described above.

In the meantime, it is unlikely that the estimated purge flow KPEM completely (perfectly) coincides with the actual purge flow of the evaporated fuel gas. Therefore, a difference ΔP(=PGRE0−PGRR) arises between the estimated purge rate PGRE0 and the actual purge rate PGRR (obtained through dividing the actual flow of the evaporated fuel gas by the flow rate Ga of intake air), as shown in (A) of FIG. 3. Thus, the purge correction coefficient FPG (=FPG0) can not eliminate influence of the evaporated fuel gas on the air-fuel ratio completely. As a result, as shown in (D) of FIG. 3, the feedback correction coefficient FAF becomes the value FAF0 which compensates for the deficiency of the correction by the purge correction coefficient FPG.

When the purge control valve closing instruction timing arrives, the evaporated fuel gas purge stop timing adjusting section A11 reset the feedback correction coefficient FAF0 (i.e., it set the feedback correction coefficient at the base value "1"). Simultaneously, the evaporated fuel gas purge stop timing adjusting section A11 changes the purge correction coefficient FPG from the value FPG0 to the value FPG1, as shown in (C) of FIG. 3. In other words, the evaporated fuel gas purge stop timing adjusting section A11 corrects the evaporated fuel gas concentration learning value FGPG by adding "the corresponding concentration learning value ΔFGPG" to the evaporated fuel gas concentration learning value FGPG0. The corresponding concentration learning value ΔFGPG is the amount corresponding to the correction amount to correct the base injection amount Fbs by the feedback correction coefficient FAF0 (smaller than the base value "1") at the timing immediately before the reset (the value ΔFGPG is negative, refer to equation (23) above). As a result, the purge correction coefficient FPG0 which was calculated based on the evaporated fuel gas concentration learning value FGPG0 immediately before the stoppage of the evaporated fuel gas purge is decreased to the value FPG1.

The evaporated fuel gas purge still continues even after the purge control valve closing instruction timing tpc virtually. To cope with this, the present apparatus calculates the purge correction coefficient FPG by applying the evaporated fuel gas concentration learning value FGPG1 and the estimated purge rate PGRE to equation (18) described above. The estimated purge rate PGRE is obtained based on equation (16) and equation (17) in consideration of "the transportation delay period (the delay time TD)" and "the change characteristic of the flow of the evaporated fuel gas (the first order lag characteristic)". Thus, instructed fuel injection amount Fi can be varied in response to the actual change in the flow of the evaporated fuel gas after "the purge control valve closing instruction timing tpc". As a result, it can be avoided that the air-fuel ratio af of the engine 10 fluctuates largely from an air-fuel ratio close to the stoichiometric air-fuel ratio af0, as shown by a solid line in (E) of the FIG. 3.

On the other hand, the conventional control apparatus resets the purge correction coefficient FPG (See a dashed line in (C) of FIG. 3) and resets the feedback correction coefficient FAF (See a dashed line in (D) of FIG. 3) at the purge control valve closing instruction timing tpc. This causes the air-fuel ratio af to be richer (smaller) than the stoichiometric air-fuel ratio af0 immediately after the stoppage of the evaporated fuel casu purge due to the evaporated fuel gas transportation delay. Thus, the feedback correction coefficient FAF varies rapidly in order to suppress the fluctuation of the air-fuel ratio af (See a dashed line in (D) of FIG. 3).

To the contrary, the evaporated fuel gas purge stop timing adjusting section A11 of the present control apparatus does not perform (or prohibits) the correction (reset) of the feedback correction coefficient FAF to "1" described above and the correction of the evaporated fuel gas concentration learning value FGPG (thus, the correction of the purge correction coefficient FPG) described above, if the base air-fuel ratio learning by the base air-fuel ratio learning section A6 has not been completed even when the evaporated fuel gas purge stop timing adjusting section A11 detects that the present time reaches the purge control valve closing instruction timing tpc. FIG. 4 is a timing chart for explaining advantages provided by the prohibition. FIG. 4 schematically shows changes of the purge correction coefficient FPG before and after the purge control valve closing instruction timing tpc and the feedback correction coefficient FAF before and after the purge control valve closing instruction timing tpc, in a case in which the base air-fuel ratio learning (for the learning area i corresponding to the load L) is not (or has not been) completed before the purge control valve closing instruction timing tpc.

Figure 4:
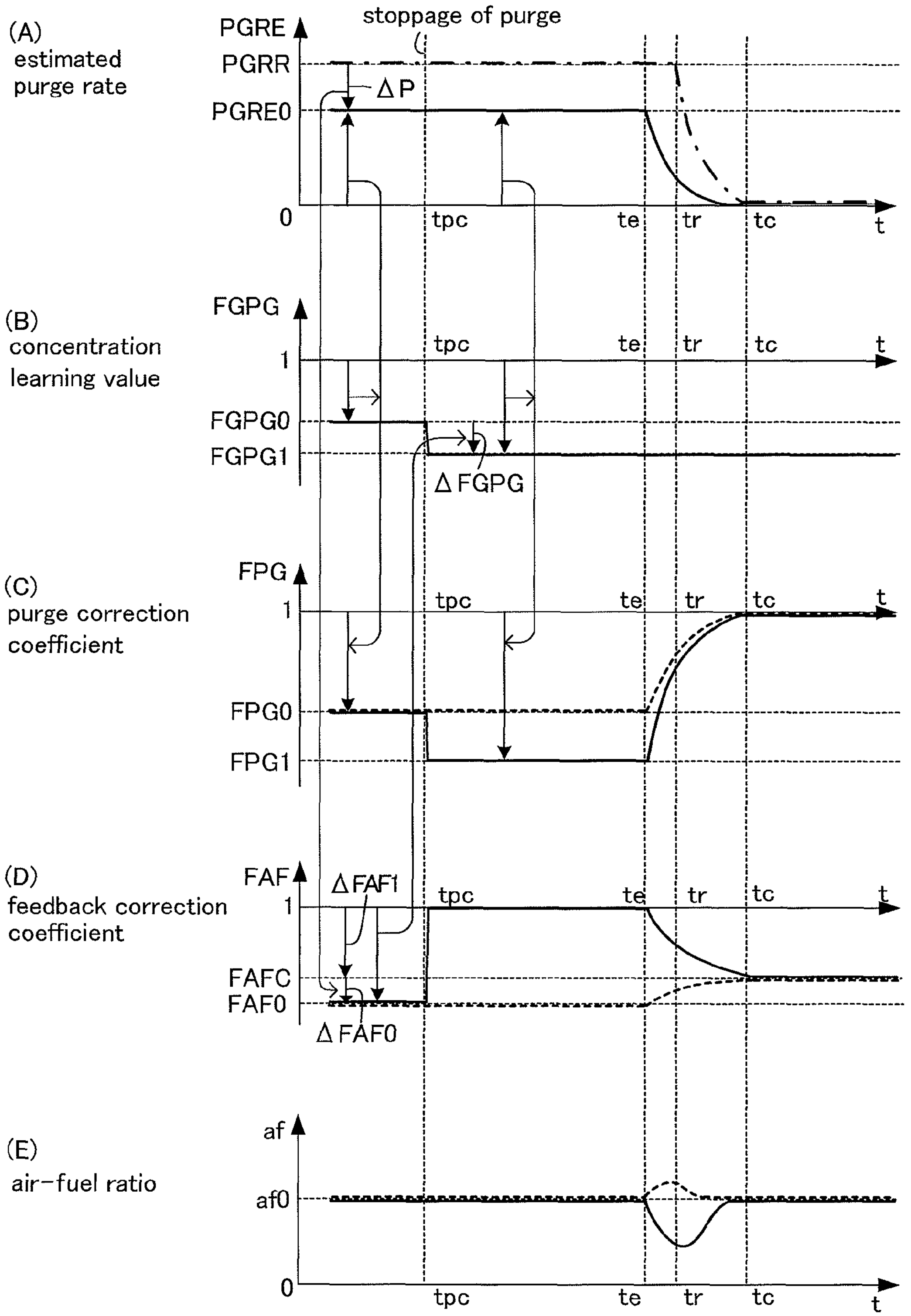
FIG. 4 is a timing chart to describe operations at a purge control valve closing instruction timing when a base air-fuel ratio learning has not been completed.

In this example, as in a case in which the base air-fuel ratio learning has been completed, the estimated purge rate PGRE is equal to PGRE0 as shown (A) of FIG. 4, and the evaporated fuel gas concentration learning value FGPG is equal to FGPG0 as shown (B) of FIG. 4, up to "the purge control valve closing instruction timing tpc". Therefore, as shown (C) of FIG. 4, the purge correction coefficient FPG is equal to the purge correction coefficient FPG0 (=1+PGRE0(FGPF0−1)) which is obtained by applying the estimated purge rate PGRE0 and the evaporated fuel gas concentration learning value FGPG0 to equation (18) described above.

Further, as in the case in which the base air-fuel ratio learning has been completed, a difference ΔP arises between the estimated purge rate PGRE0 and the actual purge rate PGRR (See (A) of FIG. 4). However, unlike the case in which the base air-fuel ratio has been completed, the feedback correction coefficient FAF which is equal to the value FAF0 includes a part ΔFAF0 (=FAF0−FAFC) and a part ΔFAF1 (=FAFC−1), the part ΔFAF0 being a part to correct the fuel injection amount due to the difference (error) ΔP between the estimated purge rate PGRE0 and the actual purge rate PGRR, and the part ΔFAF1 being a part to correct the fuel injection amount due to the deviation amount of the base of the air-fuel ratio.

Meanwhile, the value FAFC is a value on which the feedback correction coefficient FAF converges at a timing tc when a sufficient time elapses from a timing at which the evaporated fuel gas substantially stops being introduced into the combustion chamber 25 due to the stoppage of the evaporated fuel gas purge, on the assumption that the base air-fuel ratio learning is not completed and the base air-fuel ratio learning can not be performed for some reason after the stoppage of the evaporated fuel gas purge. Therefore, the convergent value FAFC of the feedback correction coefficient becomes closer to the value FAF0 than to the base value "1", if the part ΔFAF1 due to the deviation amount of the base of the air-fuel ratio is larger than the part ΔFAF0 due to the difference (error) in the flow of the evaporated fuel gas.

Therefore, an amount of change of the feedback correction coefficient FAF after the time te (See a solid line in (D) of FIG. 4), which is obtained when the feedback correction coefficient FAF is corrected (reset) to the base value at the purge control valve closing instruction timing tpc and the corresponding concentration learning value ΔFGPG which corresponds to the correction amount to correct the fuel injection amount by the feedback correction coefficient FAF (=FAF0) is taken into the evaporated fuel gas concentration learning value FGPG, becomes larger than an amount of change of the feedback correction coefficient FAF after the time te (See a dotted line in (D) of FIG. 4), which is obtained when the feedback correction coefficient FAF is not corrected (reset) to the base value at the purge control valve closing instruction timing tpc and the corresponding concentration learning value ΔFGPG is not taken into the evaporated fuel gas concentration learning value FGPG. As a result, the air-fuel ratio shown by a solid line in (E) of FIG. 4 fluctuates more largely than the air-fuel ratio shown by a dotted line in (E) of FIG. 4. Accordingly, the evaporated fuel gas purge stop timing adjusting section A11 prohibits the correction (reset) of the feedback correction coefficient FAF at the purge control valve closing instruction timing tpc and the correction of the evaporated fuel gas concentration learning value FGPG at the purge control valve closing instruction timing tpc.

As understood from the above description, it is possible to make "the fluctuation of the air-fuel ratio when prohibiting the correction (reset) of the feedback correction coefficient FAF and the correction of the evaporated fuel gas concentration learning value FGPG" smaller than "the air-fuel ratio when performing such corrections".

(1. Actual Operations Under Steady State)

As described above, one of features of the present control apparatus resides in the correction (reset) of the feedback correction coefficient FAF to the base value at the purge control valve closing instruction timing and the taking "the correction amount to correct the fuel injection amount by the feedback correction coefficient FAF at the timing before the correction (reset)" into the purge correction coefficient FPG (actually, into the evaporated fuel gas concentration learning value FGPG). Next will be described an actual operation with respect to this taking operation. At the outset, operations under the normal conditions will be described in reference to FIGS. 5-10, and then, the operations at the purge control valve closing instruction timing will be described in reference to FIG. 11.

<Calculation of the Feedback Correction Coefficient for Air-fuel Feedback Control>

Figure 5:
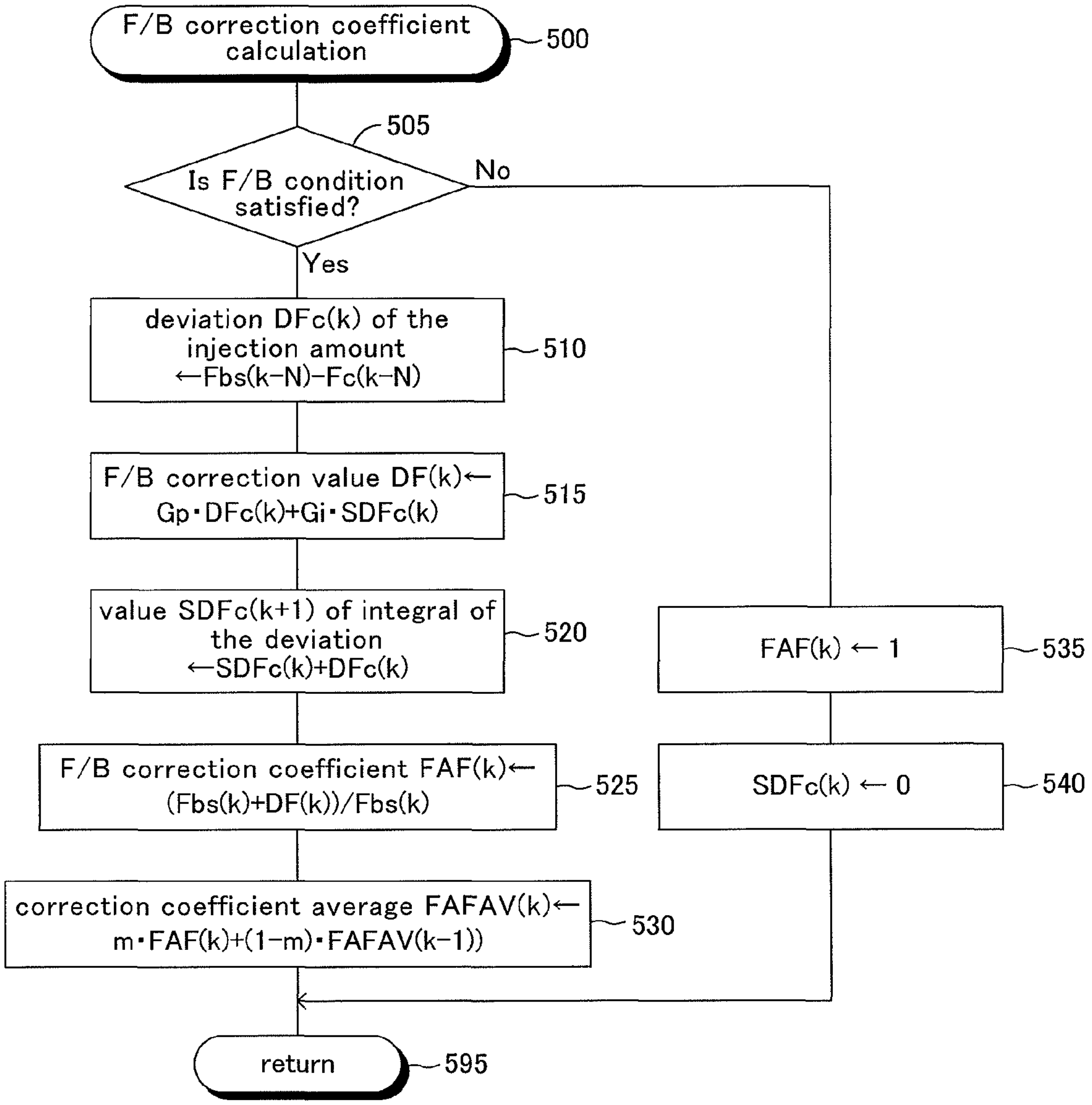
FIG. 5 is a flow chart showing a routine executed by the CPU shown in FIG. 1 to calculate a feedback correction coefficient.

The CPU 71 of the control unit 70 repeatedly executes a feedback correction coefficient calculation routine shown in FIG. 5 every time a crank angle of each cylinders reaches a predetermined crank angle (in the present example, a predetermined angle (e.g., 90° CA) before the exhaust top dead center). The CPU 71 executes the feedback correction coefficient calculation routine to realize the operations by the feedback correction coefficient calculation section A5. Notably, the cylinder intake air amount Mc(k), the base injection amount Fbs(k), and the actual injection amount Fc(k−N) are calculated in accordance with equations (1)-(4) described above, by routines which are not shown.

The CPU 71 starts a processing from Step 500 at a predetermined timing, and then, determines whether or not an air-fuel feedback condition (feedback condition) is satisfied at Step 505. This feedback condition is satisfied when (1) the present time is not a start timing of the engine 10, (2) a fuel cut operation is not being performed, (3) the cooling water temperature TW is equal to or higher than a predetermined temperature (i.e., a warming up of the engine is over), (4) the air-fuel ratio sensor 68 operates normally, and (5) the cylinder intake air amount Mc(k) (or the load L) of the engine 10 is equal to or smaller than a predetermined amount.

Here, a case is assumed where the feedback condition is satisfied, however, a purge condition which will be described later has not been satisfied for a sufficiently long period because the operating condition of the engine 10 has been in a transient condition (e.g., the engine 10 is being accelerated).

In this case, the CPU 71 makes a determination of "Yes" at Step 505 to proceed to Step 510 at which the CPU 71 set the deviation DFc(k) of the injection amount at a value obtained by subtracting the actual injection amount Fc(k−N) from the base injection amount Fbs(k−N) according to equation (5) described above. Subsequently, the CPU 71 proceeds to Step 515 to set the feedback correction amount DF(k) at a value obtained by PI processing the deviation DFc(k) of the injection amount according to equation (6) described above.

Subsequently, the CPU 71 obtains a new value of integral SDFc(k+1) of the deviation of the injection amount by adding the deviation DFc(k) of the injection amount newly calculated at Step 515 to the present value of integral SDFc(k) of the deviation of the injection amount at Step 520 as shown in equation (24) below. This new value of integral SDFc(k+1) of the deviation of the injection amount is used to calculate the feedback correction amount DF(k+1) at Step 515 when the present routine is called up next time.

$$SDFc(k+1)=SDFc(k)+DFc(k) \quad (24)$$

Further, the CPU 71 proceeds to Step 525 to convert the feedback correction amount DF(k) to the feedback correction coefficient FAF(k) in accordance with equation (7) described above. Thereafter, the CPU 71 proceeds to step 530 to obtain, in accordance with equation (8) described above, the average (the weighted average) of the feedback correction coefficient FAF(k) obtained at Step 525 and the previous average FAFAV (k−1) obtained at the present Step 530 which was executed when the present routine was called up one time before, and stores the resultant average as the correction coefficient average FAFAV(k). Subsequently, the CPU 71 proceeds to Step 595 to end the execution of the present routine tentatively. As a result, the feedback correction coefficient FAF(k) and the correction coefficient average FAFAV(k) are calculated.

<Base Air-fuel Ratio Learning when the Evaporated Fuel Gas is not Purged>

Figure 6:
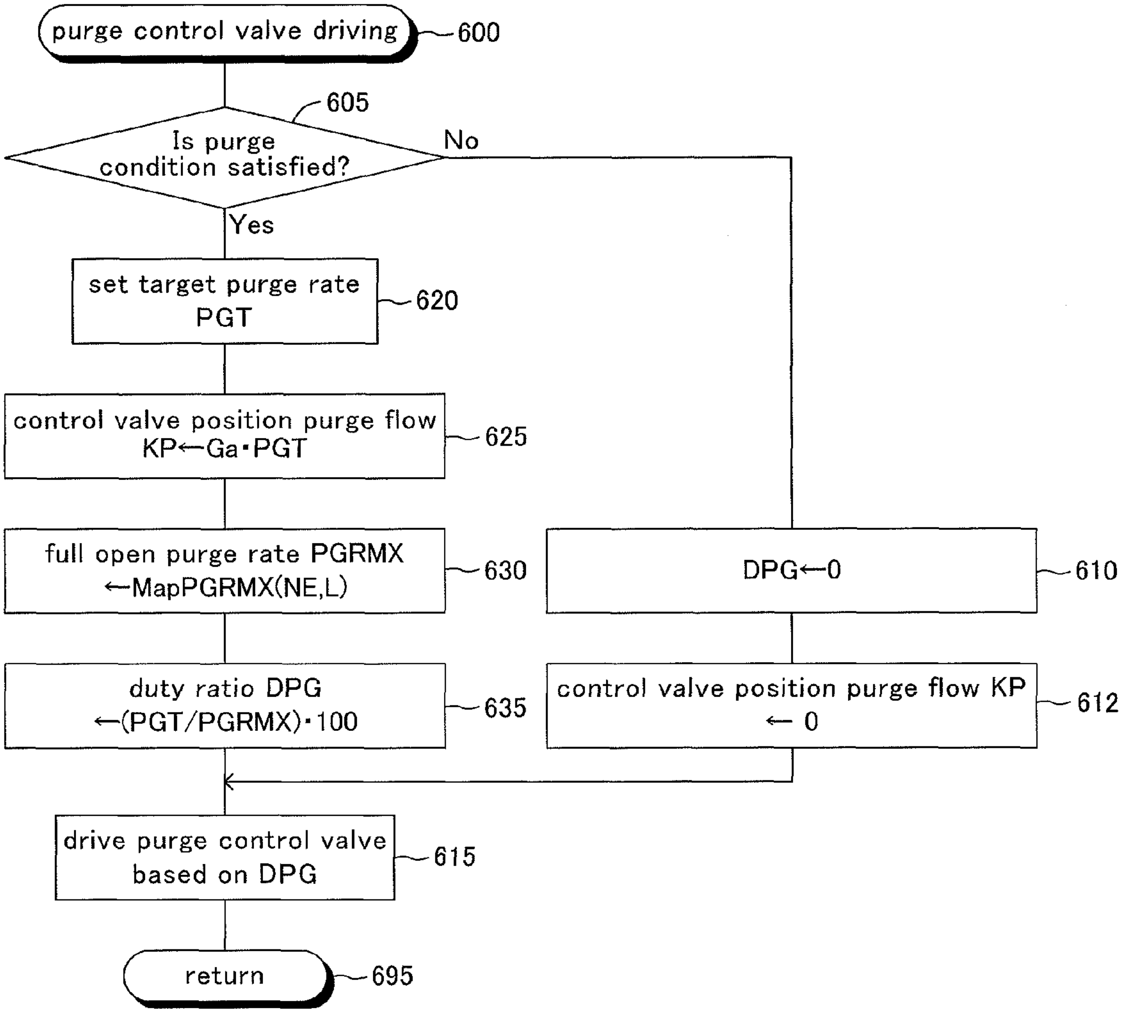
FIG. 6 is a flow chart showing a routine executed by the CPU shown in FIG. 1 to drive a purge control valve.

Meantime, the CPU 71 executes a purge control valve driving routine shown in FIG. 6 every time a predetermined time period elapses. The CPU 71 executes the purge control valve driving routine to realize the operations by the purge control valve driving section A7.

The CPU 71 starts a processing from Step 600 at a predetermined timing, and then, proceeds to Step 605 so as to determine whether or not a purge condition is satisfied. The purge condition is satisfied when the air-fuel ratio feedback control is being performed and the engine 10 is being operated under steady state (e.g., when a change of the load L per a unit time is equal to or smaller than a predetermined value).

According to the assumption described above, the purge condition is not satisfied. Thus, the CPU 71 makes a determination of "No" at Step 605 to proceed to Step 610 at which the CPU 71 set the duty ratio DPG at "0". Subsequently, the CPU 71 proceeds to Step 612 to set the control valve position purge flow KP at "0". Thereafter, the CPU 71 proceeds to Step 615 to open/close control the purge control valve 49 in response to the duty ratio DPG. At this time, the duty ratio DPG is set at "0". Therefore, the purge control valve 49 is completely closed. Subsequently, the CPU 71 proceeds to Step 695 to end the current execution of the present routine tentatively.

Figure 7:
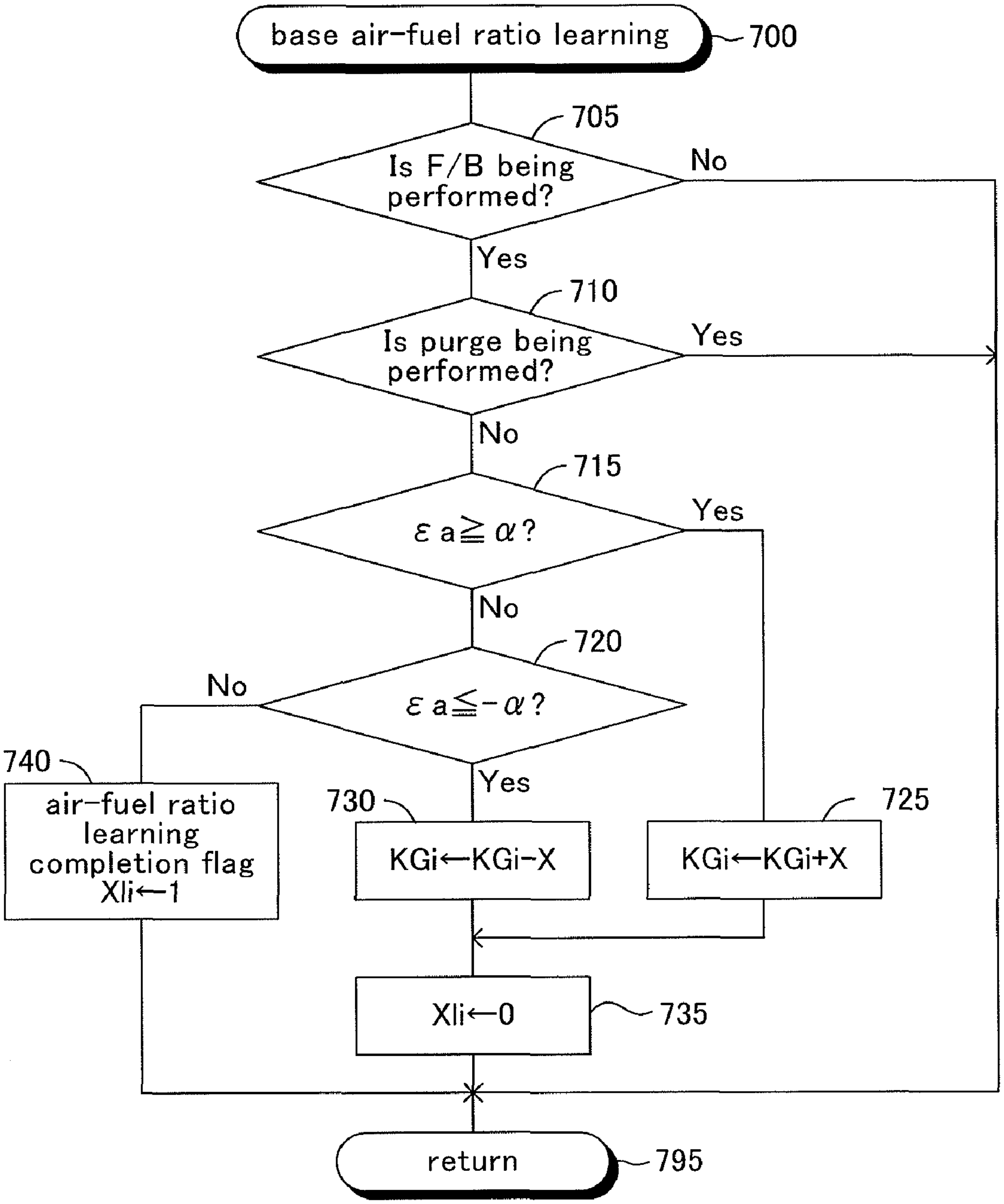
FIG. 7 is a flow chart showing a routine executed by the CPU shown in FIG. 1 to learn a deviation of a base air-fuel ratio.

Further, the CPU 71 executes a base air-fuel ratio learning routine shown in FIG. 7 every time a predetermined time period elapses. The CPU 71 executes the base air-fuel ratio learning routine to perform the base air-fuel ratio learning while the evaporated fuel gas purge is not carried out, and to realize the operations by the base air-fuel ratio learning section A6.

The CPU 71 starts a processing from Step 700 at a predetermined timing, and then, proceeds to Step 705 to determine whether or not the feedback control is being performed (i.e., whether or not the feedback condition is satisfied), and proceeds to Step 710 to determine whether or not the evaporated fuel gas purge is being performed. In the present example, the determination of whether or not the evaporated fuel gas purge is being performed (i.e., the evaporated fuel gas is being introduced in to the cylinders) is made in accordance with a determination of whether or not the estimated purge rata PGRE obtained by a routine shown in FIG. 9 described later is "0". That is, the CPU 71 determines that the evaporated fuel gas purge is being performed when the estimated purge rata PGRE is (set at) a value other than "0", and determines that the evaporated fuel gas purge is not being performed when the estimated purge rata PGRE is (set at) "0".

According to the assumption described above, the feedback condition is satisfied, however, the purge condition has not been satisfied for the sufficiently long period. Therefore, the evaporated fuel gas purge is not being performed. Accordingly, the CPU 71 makes a determination of "Yes" at Step 705 and makes a determination of "No" at Step 710 to proceed to Step 715.

The CPU 71 determines whether or not the deviation $\epsilon a$ ($\epsilon a$=FAFAV(k)−1) of the correction coefficient average FAFAV from the base value "1" is equal to or larger than the value $\alpha$ ($\alpha$>0) at Step 715. That is, the CPU 71 determines whether or not the correction coefficient average FAFAV is equal to or larger than the value 1+$\alpha$. If the deviation $\epsilon a$ is equal to or larger than the value $\alpha$, the CPU 71 makes a determination of "Yes" at Step 715 to proceed to Step 725 at which the CPU 71 increases the base air-fuel ratio learning coefficient KGi corresponding to the learning area i to which the load L at that time belongs by a predetermined amount X (X>0).

On the other hand, if the deviation $\epsilon a$ is neither equal to nor larger than the value $\alpha$, the CPU 71 makes a determination of "No" at Step 715 to proceed to Step 720 at which the CPU 71 determines whether or not the deviation $\epsilon a$ is smaller than the value ($-\alpha$). That is, the CPU 71 determines whether or not the correction coefficient average FAFAV is smaller than the value 1−$\alpha$. If the deviation $\epsilon a$ is smaller than the value ($-\alpha$), the CPU 71 makes a determination of "Yes" at Step 720 to proceed to Step 730 at which the CPU 71 decreases the base air-fuel ratio learning coefficient KGi by the predetermined amount X (X>0).

Further, following Step 725 or Step 730, the CPU 71 proceeds to Step 735 to set an air-fuel ratio learning completion flag Xli at "0". The air-fuel ratio learning completion flag Xli is provided for each learning areas i. The base air-fuel ratio learning for the learning area i has not been completed, if a value of the air-fuel ratio learning completion flag Xli is "0". Subsequently, the CPU 71 proceeds to Step 795 to end the current execution of the present routine tentatively.

On the other hand, if the deviation $\epsilon a$ is larger than the value ($-\alpha$) and smaller than the value $\alpha$ (i.e., $1-\alpha<FAFAV(K)<1+\alpha$ is satisfied), the CPU 71 makes determinations of "No" at both Step 715 and Step 720 to proceed to Step 740 at which the CPU 71 set the air-fuel ratio learning completion flag Xli at "1". The base air-fuel ratio learning for the learning area i has been completed, if the value of the air-fuel ratio learning completion flag Xli is "1". Subsequently, the CPU 71 proceeds to Step 795 to end the current execution of the present routine tentatively.

With the operations above, the base air-fuel ratio learning coefficient KGi is renewed while the air-fuel feedback control is being performed and the evaporated fuel gas purge is not being substantially carried out.

<Determination of the Instructed Injection Amount when the Evaporated Fuel Gas Purge is Not Being Performed>

Further, the CPU 71 executes an evaporated fuel gas concentration learning routine shown in FIG. 8 subsequently to the base air-fuel ratio learning routine. The CPU 71 executes the evaporated fuel gas concentration learning routine to perform the evaporated fuel gas concentration learning (i.e., renewing the evaporated fuel gas concentration learning value FGPG) while the evaporated fuel gas purge is being performed (i.e., during a period for which the estimated purge rate PGRE is set at a value other than "0"), and to realize the operations by the evaporated fuel gas concentration learning section A8. The CPU 71 starts a processing from Step 800 at a predetermined timing, and then, proceeds to Step 805 to determine whether or not the air-fuel ratio feedback control is being carried out. Further, the CPU 71 determines whether or not the duty ratio DPG is larger than "0" (i.e., whether or not the present time is within the purge control valve opening instruction period) at Step 810.

According to the assumption described above, the air-fuel ratio feedback control is being performed. However, the evaporated fuel gas purge is not being carried out because the duty ratio DPG is equal to "0". Thus, the CPU 71 makes a determination of "Yes" at Step 805 and makes a determination of "No" at Step 810 to proceed to Step 895 at which the CPU 71 end the current execution of the present routine tentatively. In this manner, when the air-fuel ratio feedback control is being carried out but the present time is not within the purge control valve opening instruction period (or is within the purge control valve closing instruction period), Step 830 which will be described later is not executed and thus the evaporated fuel gas concentration learning value FGPG is not renewed.

In addition, the CPU 71 executes the estimated purge rate calculating routine shown in FIG. 9 subsequently to the evaporated fuel gas concentration learning routine. The CPU 71 executes the estimated purge rate calculating routine to calculate the estimated purge rate PGRE and to realize the operations by the estimated purge rate calculating section A9. The CPU 71 starts a processing from Step 900 at a predetermined timing, and then, proceeds to Step 910 to Step 925 so as to execute the following processing.

Step 910: the CPU 71 obtains the delay time TD (the evaporated fuel gas transportation delay time) based on the revolution speed NE and the delay time setting map.

Step 915: the CPU 71 adopts the control valve position purge flow KP which was calculated the delay time TD ago and stored as the present estimated purge base flow KPE. It should be noted that the control valve position purge flow KP becomes "0" by Step 612 of FIG. 6 when the purge condition becomes unsatisfied. Therefore, the estimated purge base flow KPE becomes "0" when the delay time TD elapses after the timing at which the state changes from a state in which the purge condition is satisfied to a state in which the purge condition is unsatisfied (i.e., when the delay time TD elapses from the purge control valve closing instruction timing tpc).

Step 920: the CPU 71 calculates the estimated purge flow KPEM by implementing "first order lag operation" for the estimated purge base flow KPE in accordance with equation (16) above.

Step 925: the CPU 71 calculates the estimated purge rate PGRE based on the estimated purge flow KPEM and the flow rate Ga of intake air in accordance with equation (17) above.

Subsequently, the CPU 71 proceeds to Step 930 to determine whether or not the estimated purge rate PGRE is larger than a minute value δ. Thereafter, if the estimated purge rate PGRE is equal to or smaller than the value δ, the CPU 71 makes a determination of "No" at Step 930 to proceed to Step 935 at which the CPU 71 sets the estimated purge rate PGRE at "0". Then, the CPU 71 proceeds to Step 995 to end the current execution of the present routine tentatively. To the contrary, if the estimated purge rate PGRE is larger than the value δ, the CPU 71 makes a determination of "Yes" at Step 930 to directly proceed to Step 995 to end the current execution of the present routine tentatively.

It should be noted that the control valve position purge flow KP has been kept "0" up to the present state, because he purge condition has not been satisfied for the sufficiently long period, and thus the evaporated fuel gas purge has not been carried out for the sufficiently long period. Therefore, the estimated purge flow KPEM obtained by implementing the first order lag operation is almost "0". Consequently, the estimated purge rate PGRE calculated at Step 925 is equal to or smaller than the value δ. Thus, the CPU 71 proceeds to Step 935 from Step 930. Therefore, at the present time, the estimated purge rate PGRE becomes "0".

Figure 10:
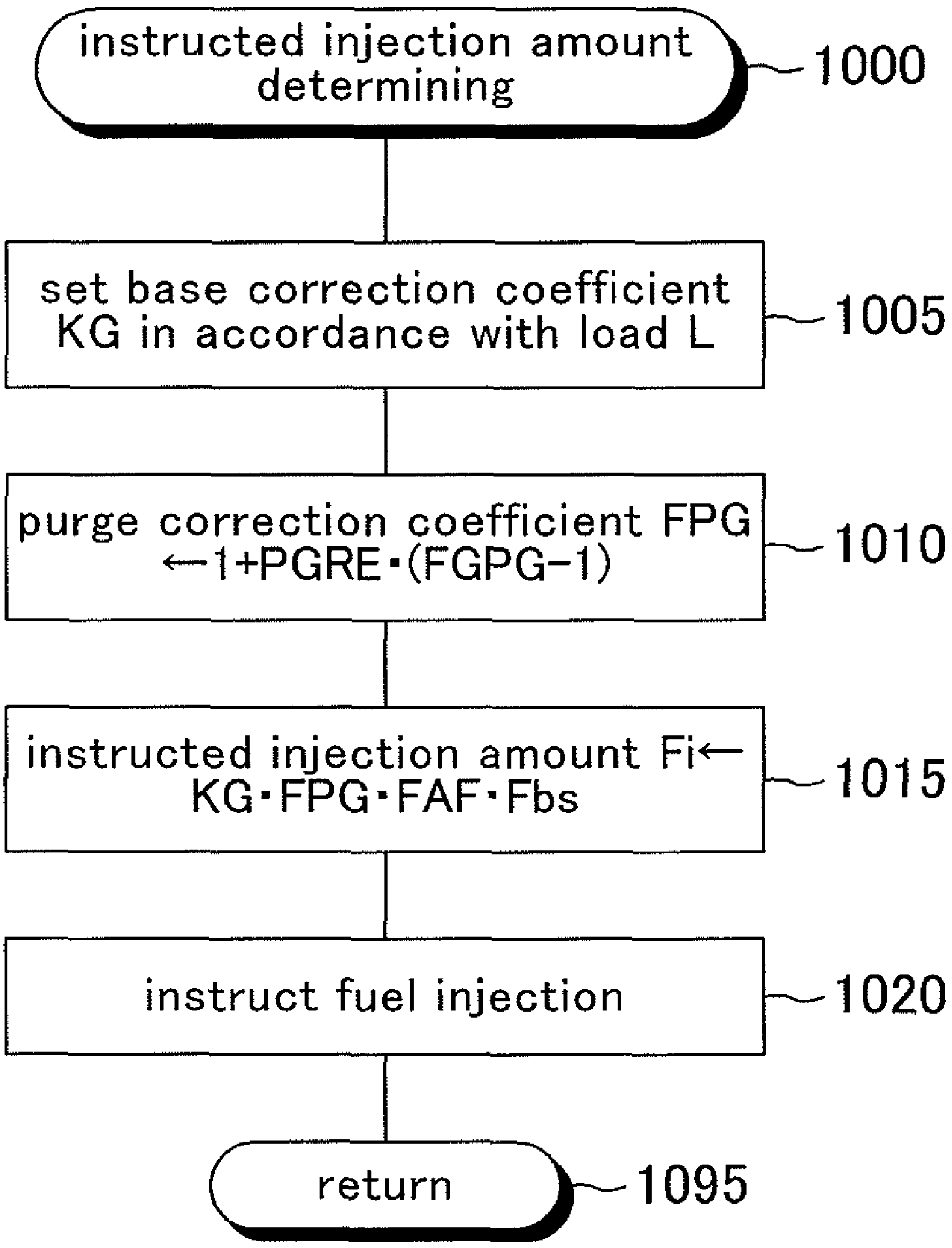
FIG. 10 is a flow chart showing a routine executed by the CPU shown in FIG. 1 to determine an instructed injection amount.

Further, the CPU 71 repeatedly executes an instructed injection amount determining routine shown in FIG. 10 every time a crank angle of each cylinders reaches a predetermined crank angle before the intake top dead center (e.g., 80° CA before the intake top dead center). The CPU 71 executes the instructed injection amount determining routine to realize the operations to determine the instructed injection amount Fi and to inject fuel of the instructed injection amount Fi by the instructed injection amount determining section A10.

The CPU 71 starts a processing from Step 1000 at a predetermined timing to proceed to Step 1005 at which the CPU 71 selects the base air-fuel ratio learning coefficient KGi which corresponds to the learning area i according to the present load L, and adopts the selected base air-fuel ratio learning coefficient KGi as the base correction coefficient KG. Subsequently, the CPU 71 obtains the purge correction coefficient FPG in accordance with equation (18) above at Step 1010. As described, the estimated purge rate PGRE is "0" at the present time. Consequently, the purge correction coefficient FPG which is obtained at Step 1010 becomes "1 (the base value)".

Subsequently, the CPU 71 proceeds to Step 1015 at which the CPU 71 calculates the instructed injection amount Fi of the fuel by correcting the base injection amount Fbs using the base correction coefficient KG set at Step 1005, the purge correction coefficient FPG calculated at Step 1010, and the feedback correction coefficient FAF (FAF(k) obtained at Step 525) calculated in the feedback correction coefficient calculation routine shown in FIG. 5 (See equation (19) above). The CPU 71 instructs the injector 39 for the cylinder which is approaching the intake top dead center to inject the fuel of the instructed injection amount Fi at Step 1020, and then proceeds to 1095 to end the current execution of the present routine tentatively.

<Performing the Evaporated Fuel Gas Purge by Driving the Purge Control Valve>

Next will be described a case in which the air-fuel ratio feedback control is being carried out and the purge condition is being satisfied because the engine 10 is being operated under the steady condition. In this case, the CPU 71 performs the air-fuel ratio feedback control by executing steps from Step 505 to Step 530. Further, the CPU 71 makes a determination of "Yes" at Step 605 since the purge condition is satisfied so as to proceed to Step 620 at which the CPU 71 sets the target purge rate PGT based on the operating conditions of the engine 10.

Subsequently, the CPU 71 proceeds to steps from Step 625 to Step 635 to carry out the following processes.

Step 625: the CPU 71 calculates the control valve position purge flow KP based on the target purge rate PGT and the flow rate Ga of intake air in accordance with equation (11) above.

Step 630: the CPU 71 obtains the full open purge rate PGRMX based on the revolution speed NE and the load L.

Step 635: the CPU 71 calculates the duty ratio DPG based on the full open purge rate PGRMX and the target purge rate PGT in accordance with equation (13) above.

Subsequently, the CPU 71 drives the purge control valve 49 with the set duty ratio DPG at Step 615, and then proceeds to Step 695 to end the current execution of the present routine tentatively. As described, the purge control valve 49 is driven with the duty ratio DPG when the purge condition is satisfied. As a result, the evaporated fuel gas of the control valve position purge flow KP passes through the control valve 49 to be introduced into the intake passage and thereafter the combustion chamber 25 of the engine 10.

<Evaporated Fuel Gas Concentration Learning and Calculation of the Estimated Purge Rate During the Evaporated Fuel Gas Purge>

According to the assumption described above, the evaporated fuel gas purge is being performed. Thus, the CPU 71 makes a determination of "Yes" at Step 710 of the base air-fuel ratio learning routine shown in FIG. 7 to proceed to Step 795 at which the CPU 71 ends the base air-fuel ratio learning routine. Consequently, the base air-fuel ratio learning coefficient KGi is not renewed. That is, the base air-fuel ratio learning is stopped.

Figure 8:
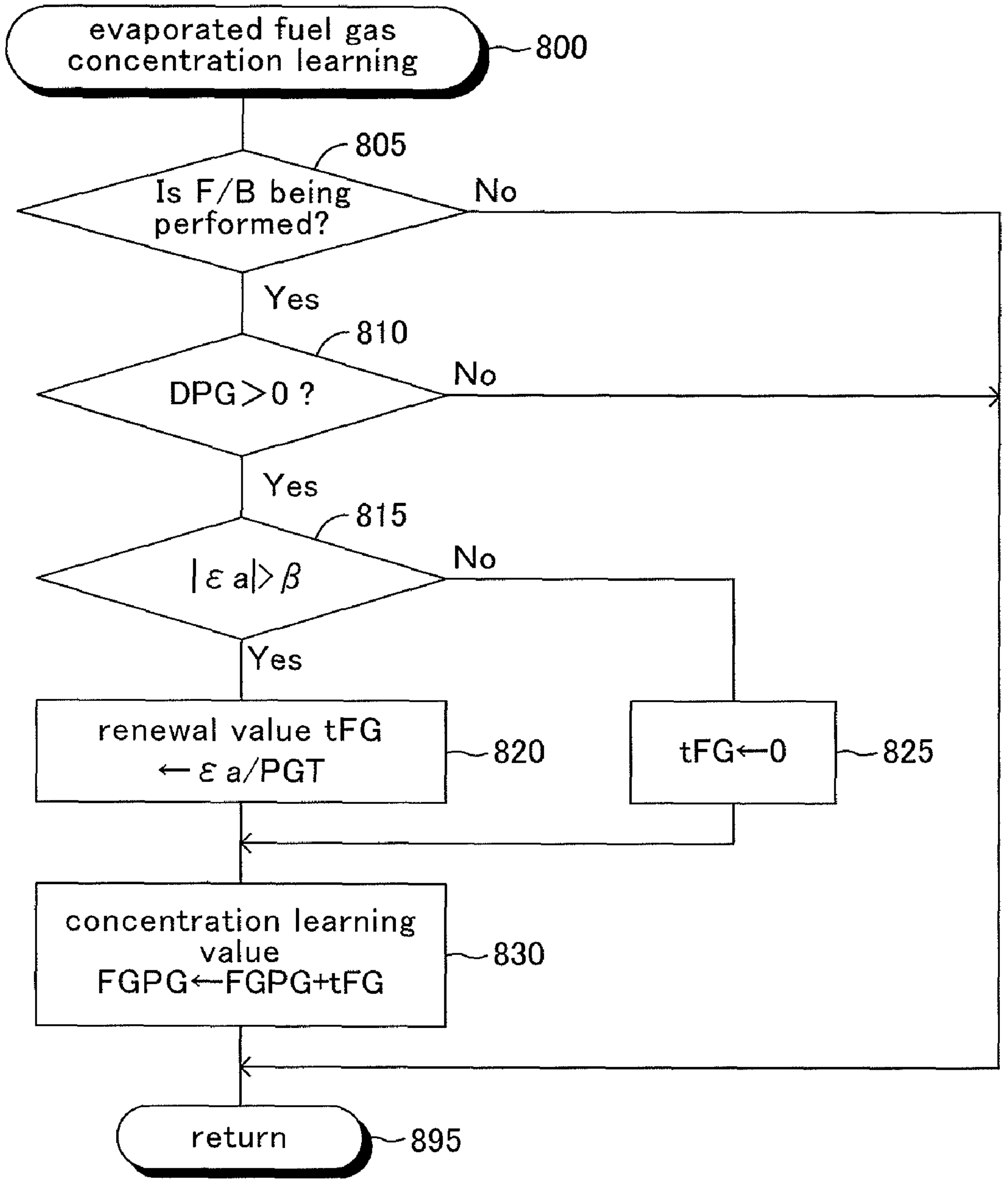
FIG. 8 is a flow chart showing a routine executed by the CPU shown in FIG. 1 to learn a value corresponding to an evaporated fuel gas concentration in an evaporated fuel gas.

In addition, the CPU 71 makes determinations of "Yes" at both Step 805 and Step 810 of the evaporated fuel gas concentration learning routine shown in FIG. 8 to proceed to Step 815 at which the CPU 71 determines whether or not the absolute value of the deviation $\epsilon$ a (=FAFAV−1) of the correction coefficient average FAFAV from the base value "1" is larger than the value $\beta$. If the absolute value of the deviation $\epsilon$ a is larger than the value $\beta$, then the CPU 71 makes a determination of "Yes" at Step 815 to proceed to Step 820, at which the CPU 71 obtains the renewal value tFG based on the deviation $\epsilon$ a and the target purge rate PGT in accordance with equation (15) above. The target purge rate PGT is set at 620 of FIG. 6. On the other hand, if the absolute value of the deviation $\epsilon$ a is equal to or smaller than the value $\beta$, then the CPU 71 makes a determination of "No" at Step 815 to proceed to Step 825, at which the CPU 71 sets the renewal value tFG at "0".

Thereafter, the CPU 71 proceeds to Step 830 from either Step 820 or Step 825, and renews the evaporated fuel gas concentration learning value FGPG in accordance with equation (14) above at Step 830. Then, the CPU 71 proceeds to Step 895 to end the current execution of the present routine tentatively. As described, the evaporated fuel gas concentration learning value FGPG is renewed if the absolute value of the deviation $\epsilon$ a of the correction coefficient average FAFAV from the base value "1" is larger than the value $\beta$ during the purge control valve opening instruction period (i.e., in the case in which the duty ratio is larger than 0).

Figure 9:
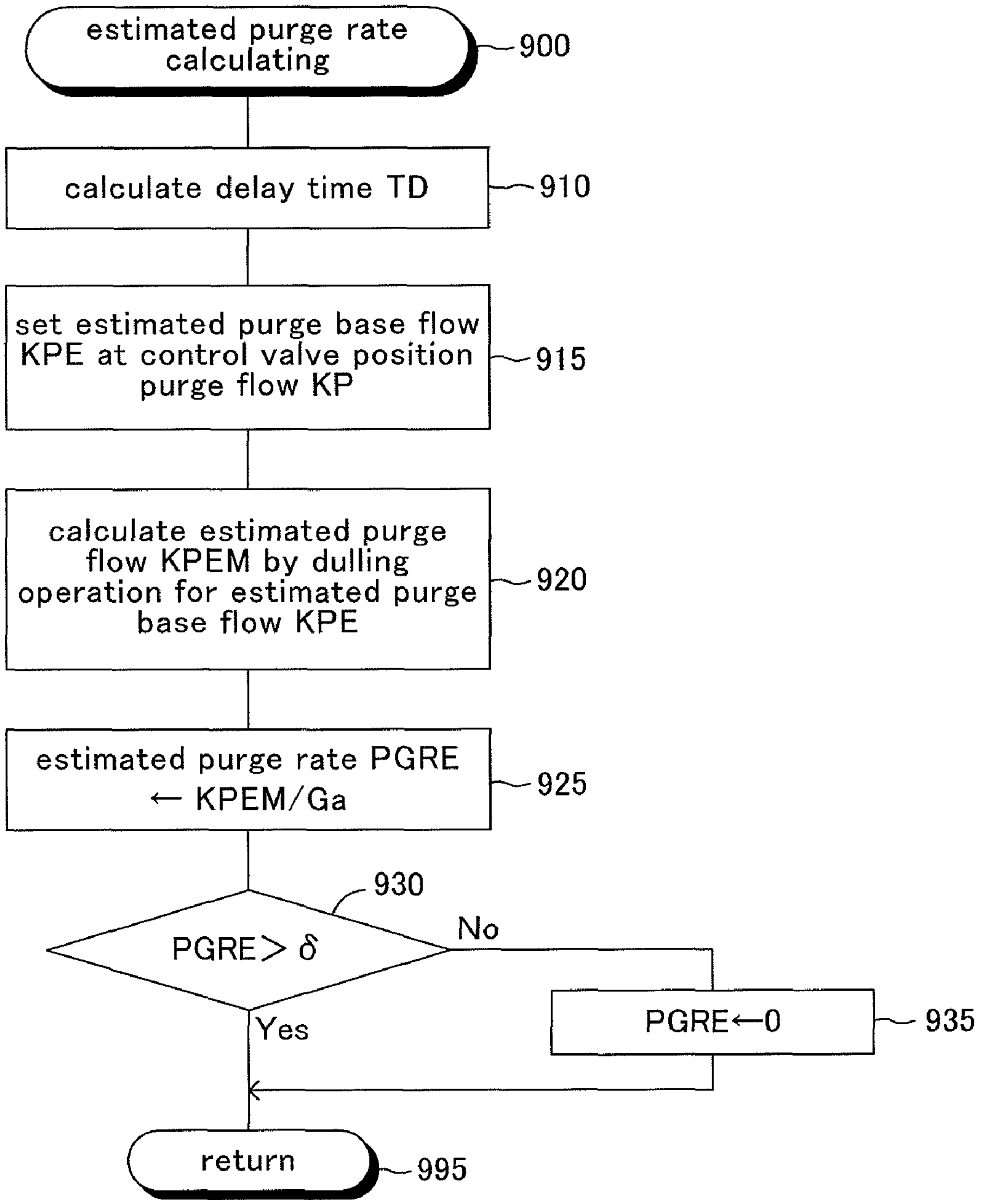
FIG. 9 is a flow chart showing a routine executed by the CPU shown in FIG. 1 to calculate an estimated purge rate.

Further, during the purge control valve opening instruction period, the CPU 71 executes the estimated purge rate calculating routine shown in FIG. 9. Consequently, the estimated purge flow KPEM is obtained by delaying with the delay time TD and implementing first lag order for the control valve position purge flow KP obtained at Step 625 of FIG. 6, and the estimated purge rate PGRE is calculated based on the estimated purge flow KPEM.

<Determining the Instructed Injection Amount while the Evaporated Fuel Gas Purge is Being Performed>

The CPU 71 executes the routine shown in FIG. 10 at the predetermined timing during the purge control valve opening instruction period, as it does during the purge control valve closing instruction period. Therefore, the base injection amount Fbs is corrected by the purge correction coefficient FPG in such a manner that the air-fuel ratio of the engine 10 is not affected by the evaporated fuel contained the evaporated fuel gas introduced into the combustion chamber 25, and thereby, the instructed injection amount Fi of the fuel is calculated. The fuel injection is carried out in accordance with the instructed injection amount Fi.

<Processes when the Feedback Condition is not Satisfied>

The operations described above are ones when the feedback condition is satisfied and thus the air-fuel ratio feedback control is carried out. To the contrary, if the feedback condition is not satisfied, the CPU 71 makes a determination of "No" at Step 505 shown in FIG. 5 to proceed to Step 535, at which the CPU 71 set the feedback correction coefficient FAF(k) at "1". Subsequently, the CPU 71 proceeds to Step 540 to set the value of integral SDFc(k) of the deviation of the injection amount at "0", and then proceeds to Step 595 to end the current execution of the present routine tentatively.

Further, in this case (i.e., when the feedback condition is not satisfied), the purge condition is not satisfied. Therefore, the CPU 71 makes a determination of "No" at Step 605 shown in FIG. 6 to proceed to Step 610, Step 612 and Step 615 to keep the purge control valve 49 closed. In addition, in this case (i.e., when the feedback condition is not satisfied), the CPU 71 makes a determination of "No" at Step 705 shown in FIG. 7 to directly proceed to Step 795. Similarly, the CPU 71 makes a determination of "No" at Step 805 shown in FIG. 8 to directly proceed to Step 895.

As described above, when the feedback condition is not satisfied, and thus the air-fuel ratio feedback control is not carried out, the evaporated fuel gas purge, the base air-fuel ratio learning (the renewal of the base air-fuel ratio learning coefficient KGi) and the evaporated fuel gas concentration learning (the renewal of the evaporated fuel gas concentration learning value FGPG) are not performed. Further, when a sufficiently long period elapses from the time at which the purge condition becomes unsatisfied because the feedback condition becomes unsatisfied, the control valve position purge flow KP becomes "0" and continues to be "0". Accordingly, the estimated purge flow KPEM obtained after the dulling operation (the first order lag treatment) is almost "0", and thus the estimated purge rate PGRE calculated at Step 925 becomes equal to or smaller than the value $\delta$. Consequently, the purge correction coefficient FPG calculated at Step 1010 shown in FIG. 10 becomes equal to "1 (the base value)", because the estimated purge rate PGRE becomes "0" by Step 935.

(2. Actual Operations at the Purge Control Valve Closing Instruction Timing)

Figure 11:
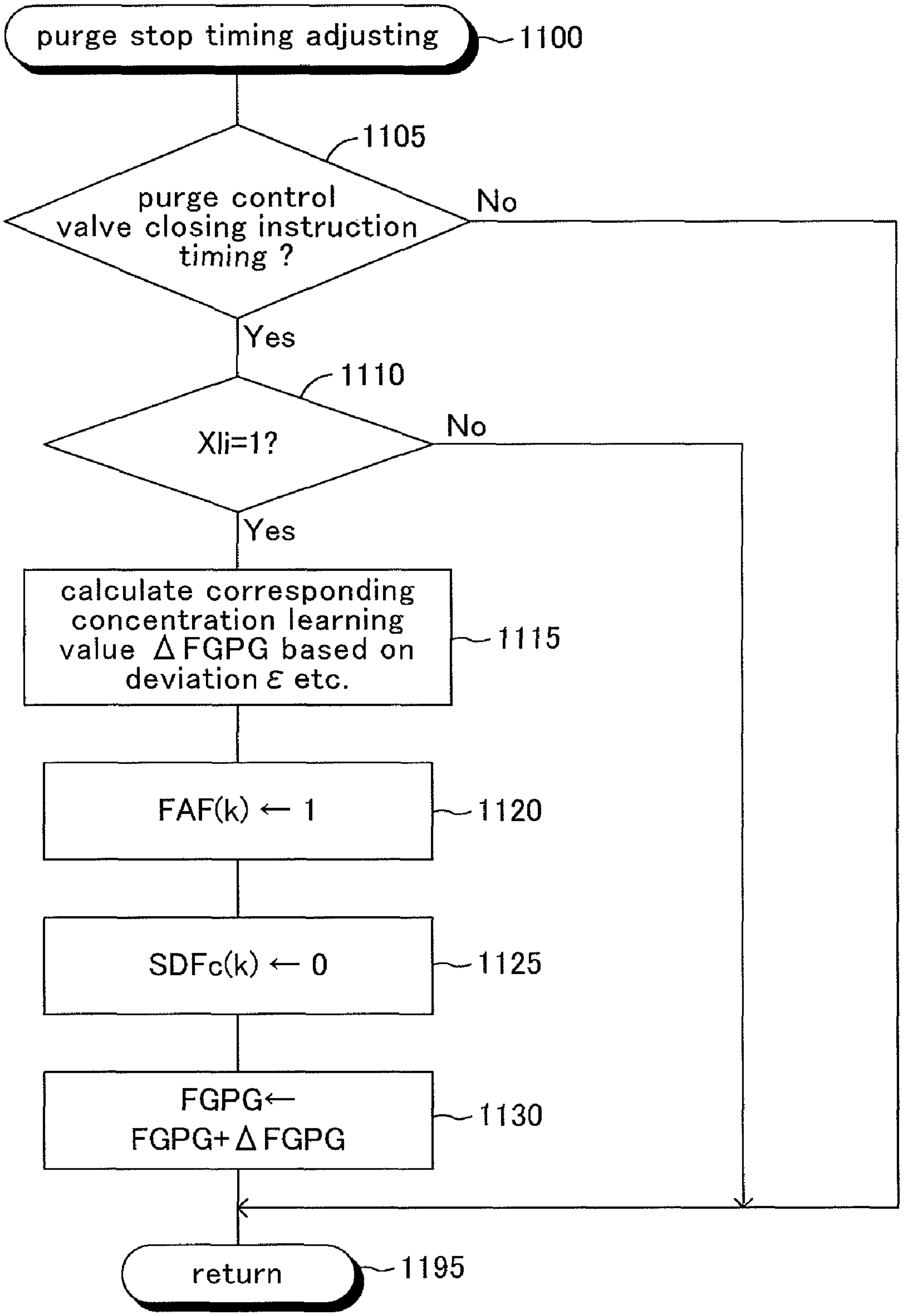
FIG. 11 is a flow chart showing a routine executed by the CPU shown in FIG. 1 to take the feedback correction coefficient into an evaporated fuel gas concentration learning value at the purge control valve closing instruction timing.

The CPU 71 executes a purge stop timing adjusting routine shown in FIG. 11 in addition to routines described above. The CPU 71 executes this routine immediately before it executes the instructed injection amount determining routine shown in FIG. 10. The CPU 71 executes the purge stop timing adjusting routine shown in FIG. 11 to realize the operations by the evaporated fuel gas purge stop timing adjusting section A11.

The CPU 71 starts a processing from Step 1100 at an appropriate timing described above, and then, proceeds to Step 1105 so as to determine whether or not the present time is at the purge control valve closing instruction timing (actually whether or not the present time is immediately after the purge control valve closing instruction timing). That is, the CPU 71 determines, at Step 1105, whether or not the present time is immediately after a timing at which the purge control valve 49 is closed because the duty ratio DPG is changed from a value other than "0" to "0". If the present time is not at the purge control valve closing instruction timing, the CPU 71 makes a determination of "No" at Step 1105 to directly proceed to Step 1195, at which the CPU 71 ends the current execution of the present routine tentatively.

Assuming that the present time is at the purge control valve closing instruction timing, the CPU 71 makes a determination of "Yes" at Step 1105 to proceed to Step 1110, at which the CPU 71 determines whether or not the value of the air-fuel ratio learning completion flag Xli is "1" which indicates that the base air-fuel ratio learning has been completed.

Here, descriptions continue on the assumption that the value of the air-fuel ratio learning completion flag Xli is "1", and thus, the base air-fuel ratio learning has been completed. In accordance with the assumption, the CPU 71 makes a determination of "Yes" at Step 1110 to proceed to Step 1115, at which the CPU 71 calculates the corresponding concentration learning value ΔFGPG by applying the deviation ϵ of the current feedback correction coefficient FAF (=FAF(k)) from the base value "1" (ϵ=FAF−1), the current purge correction coefficient FPG (=FPG0), and the current estimated purge rate PGRE (=PGRE0) to equation (23) described above.

Thereafter, the CPU 71 sets the feedback correction coefficient FAF (=FAF(k)) at the base value "1" (i.e., corrects the FAF to be "1" or resets the FAF) at Step 1120. Subsequently, the CPU 71 sets the value of integral SDFc(k) of the deviation of the injection amount at "0" (resets the SDFc(k)) at Step 1125. This timing corresponds to the timing tpc shown in (D) of FIG. 3.

Subsequently, at Step 1130, the CPU 71 renews the evaporated fuel gas concentration learning value FGPG by adding the corresponding concentration learning value ΔFGPG calculated at Step 1115 to the evaporated fuel gas concentration learning value FGPG at the purge control valve closing instruction timing, as shown by equation (25) below (See the timing tpc shown in (B) of FIG. 3). Thereafter, the CPU 71 proceeds to Step 1195 to end the current execution of the present routine tentatively.

In addition, the CPU 71 fetches the base air-fuel ratio learning coefficient KG in accordance with the load L (Step 1005), and calculates the purge correction coefficient FPG based on the renewed evaporated fuel gas concentration learning value FGPG (Step 1010), in the instructed injection amount determining routine shown in FIG. 10. Further, the CPU 71 calculates the instructed injection amount Fi of the fuel using the calculated purge correction coefficient FPG, the reset feedback correction coefficient FAF (=FAF(k)=1), and the base air-fuel ratio learning coefficient KG. These are the actual operations at the purge control valve closing instruction timing in the case where the base air-fuel ratio learning has been completed.

$$FGPG \leftarrow FGPG + \Delta FGPG \tag{25}$$

On the other hand, the CPU 71 directly proceeds to Step 1195 from Step 1110, when the value of the air-fuel ratio learning completion flag Xli is "0" (i.e., the base air-fuel ratio learning has not been completed) at the determination timing of Step 1110. As a result, when the base air-fuel ratio learning has not been completed, steps from Step 1115 to Step 1130 are not executed. Thus, the correction (reset) of the feedback correction coefficient FAF to the base value and the correction of the evaporated fuel gas concentration learning value FGPG are not carried out (or are prohibited).

As described above, the present apparatus, at the purge control valve closing instruction timing tpc, corrects the feedback correction amount to be the base value, and corrects the evaporated fuel gas concentration learning value FGPG in such a manner that an amount corresponding to "an correction amount ϵ to correct the base injection amount" caused by the feedback correction amount FAF at the timing immediately before the feedback correction amount is corrected to the base value is added to the purge correction amount.

On the one hand, the evaporated fuel gas concentration learning value FGPG is renewed while the instruction signal to open the purge control valve at the predetermined value is sent (i.e., during the purge control valve opening instruction period), and is not renewed while the instruction signal to completely close the purge control valve is sent (i.e., during the purge control valve closing instruction period). Thus, the evaporated fuel gas concentration learning value FGPG is remained the same (i.e., is kept be the value after the correction=FGPG0+ΔFPG) after the purge control valve closing instruction timing tpc. On the other hand, the estimated purge flow KPEM is estimated with high accuracy based on the value relating the opening of the purge control valve (the control valve position purge flow KP depending on the target purge rate PGT) in consideration of the transportation delay time duration TD which is a time that the evaporated fuel gas takes to transport from the purge control valve to the combustion chamber and the behavior (first order lag behavior) of the evaporated fuel gas passing through the purge control valve with respect to the value relating to the opening of the purge control valve.

Accordingly, the purge correction coefficient FPG calculated based on the evaporated fuel gas concentration learning value FGPG and the estimated purge flow KPEM (in actuality, the estimated purge rate PGRE which depends on the estimated purge flow KPEM) becomes a value which can accurately compensate for the influence on the air-fuel ratio by the evaporated fuel introduced into the combustion chamber after the purge control valve closing instruction timing tpc. Thus, the feedback correction amount hardly deviates from the base value "1" for a period immediately after the purge control valve closing instruction timing tpc. As a result, the fluctuation of the air-fuel ratio after the purge control valve closing instruction timing tpc is suppressed very effectively. Consequently, it is possible to reduce a NOx emission after the purge control valve closing instruction timing tpc.

In addition, the present control apparatus prohibits the feedback correction amount FAF from being corrected to the base value "1", and prohibits the evaporated fuel gas concentration learning value FGPG from being corrected, if it is determined that the base air-fuel ratio learning has not been completed (i.e., if the value of the air-fuel ratio learning completion flag Xli corresponding to the learning area i is "0"), when the purge control valve closing instruction timing tpc arrives (See a flow from Step 1110 directly to Step 1195). Consequently, it can be avoided that the air-fuel ratio deviates from the target air-fuel ratio by a large amount, especially when the base air-fuel ratio learning has not been completed and the deviation of the base air-fuel ratio is large.

The internal combustion engine to which the thus-configured control apparatus is applied comprises: fuel injection means (39) for supplying fuel to a combustion chamber (25) by injecting fuel stored in a fuel tank (45); a purge passage (47, 48) connecting the fuel tank (45) with an intake passage (41, 43, 31), the purge passage (47, 48) being for introducing evaporated fuel generated in said fuel tank (45) in a form of evaporated fuel gas containing the evaporated fuel into the intake passage (41, 43, 31); a purge control valve (49) which is disposed in said purge passage (47, 48) and whose opening is varied in response to an instruction signal; and an air-fuel ratio sensor (68) which is disposed in an exhaust passage (51, 52) and which detects an air-fuel ratio of a mixture supplied into said combustion chamber (25).

The purge control valve driving section A7 (the routine shown in FIG. 6) corresponds to the purge control means for sending the instruction signal to open the purge control valve to the predetermined opening (i.e., the driving signal with a duty ratio FPG of a value other than 0) to the purge control valve when the predetermined purge condition is satisfied so as to introduce the evaporated fuel gas into the intake passage, and for sending the instruction signal to completely close the purge control valve (i.e., the driving signal with a duty ratio FPG of a value 0) to the purge control valve when the predetermined purge condition becomes unsatisfied so as to prohibit the introduction of the evaporated fuel gas into the intake passage.

The base injection calculation section A3 corresponds to the base injection amount determining means for determining, based on an amount of an intake air of the engine, a base injection amount to make an air-fuel ratio of a mixture formed by fuel injected from the fuel injection means equal to a predetermined target air-fuel ratio.

The feedback correction coefficient calculation section A5 and the like (the routine shown in FIG. 5) correspond to the feedback correction amount calculating means for calculating a feedback correction amount to correct the base injection amount in such a manner that the detected air-fuel ratio becomes equal to the target air-fuel ratio when a predetermined feedback control condition is satisfied.

The evaporated fuel gas concentration learning section A8 (shown in FIG. 8) corresponds to the evaporated fuel gas concentration learning means for learning (or obtains, renews) a value relating to a concentration of the evaporated fuel contained in the evaporated fuel gas as "an evaporated fuel gas concentration learning value", based on a value relating to the feedback correction amount, when an instruction signal for opening the purge control valve at the predetermined opening is being sent to the purge control valve.

A portion of the estimated purge rate calculating section A9 and the like (Steps 605, 612, 620, and 625 shown in FIG. 6, and the routine shown in FIG. 9) constitute the purge flow estimating means for estimating, as an estimated purge flow, a flow of the evaporated fuel gas introduced into the combustion chamber based on a value relating to the opening of the purge control valve, in consideration of "a transportation delay time duration" which is a time that the evaporated fuel gas takes to transport from the purge control valve to the combustion chamber and "a behavior of the evaporated fuel gas" which passes through the purge control valve with respect to a value relating to the opening of the purge control valve.

A portion of the instructed injection amount determining section A10 (Step 1010 shown in FIG. 10) constitutes the purge correction amount calculating means for calculating a purge correction amount to correct the base injection amount based on the evaporated fuel gas concentration learning value and the estimated purge flow so as to decrease the base injection amount by "an amount corresponding to the evaporated fuel contained in the evaporated fuel gas introduced into the combustion chamber".

The evaporated fuel gas purge stop timing adjusting section A11 corresponds to the feedback correction amount correcting means (Step 1120 shown in FIG. 11) and the evaporated fuel gas concentration learning value correcting means (Step 1115 and Step 1130 shown in FIG. 11), wherein the feedback correction amount correcting means corrects (sets or resets) the feedback correction amount to a base value which neither increase nor decrease the base injection amount, at a purge control closing instruction timing when an instruction signal causing the purge control valve to change its state from opening state to completely closing state is sent to the purge control valve, and the evaporated fuel gas concentration learning value correcting means corrects the evaporated fuel gas concentration learning value so as to add "an amount corresponding to an correction amount to correct the base injection amount provided by the feedback correction amount at the timing immediately before the feedback correction amount is corrected" to "the base value" to the purge correction amount, at the purge control valve closing instruction timing.

The instructed injection amount determining section A10 (Step 1020 shown in FIG. 10) corresponds to the fuel injection amount determining means for determining the fuel injection amount injected from the fuel injection means by correcting the base injection amount using the feedback correction amount, the base air-fuel ration learning value and the purge correction amount.

The base air-fuel ratio learning section A6 (the routine shown in FIG. 7) corresponds to the base air-fuel ratio learning means for performing base air-fuel ratio learning by renewing a base air-fuel ratio learning value based on a feedback value for learning which varies depending on the feedback correction amount so as to make the feedback correction amount closer to the base value during a purge control valve closing instruction period for which an instruction signal is sent to the purge control valve, the instruction signal being a signal to keep the purge control valve in a state in which the purge control valve is completely closed. Further, the Steps 715, 720, 740 and 735 shown in FIG. 7 constitutes the base air-fuel ratio learning completion determining means for determining whether or not the base air-fuel ratio learning is completed based on the feedback value for learning during the purge control valve closing instruction period.

Further, Steps 1105 and 1110 shown in FIG. 11 and a flow from Step 1110 directly to Step 1195 constitute the correction prohibiting means for prohibiting the feedback correction amount correcting means from correcting the feedback correction amount and prohibiting the evaporated fuel gas concentration learning value correcting means from correcting the evaporated fuel gas concentration learning value, if it is determined that the base air-fuel ratio learning has not been completed when the purge control valve closing instruction timing arrives.

b. Second Embodiment

Next will be described a second embodiment of a control apparatus for the internal combustion engine in accordance with the present invention. The control apparatus according to the second embodiment is different from the control apparatus according to the first embodiment only in that its CPU 71 executes a purge stop timing adjusting routine shown in FIG. 12, instead of the purge stop timing adjusting routine shown in FIG. 11 which the CPU 71 of the first embodiment executes. Hereinafter, the description is made by focusing on this difference. Note that Steps shown in FIG. 12 identical to Steps shown in FIG. 11 have the same numerals as ones shown in FIG. 11.

The second embodiment, if the base air-fuel ratio learning is not completed when the purge control valve closing instruction timing arrives, prohibits correcting the feedback correction coefficient FAF to the base value "1" at the purge control valve closing instruction timing and correcting the evaporated fuel gas concentration learning value FGPG at the purge control valve closing instruction timing (i.e., taking the correction amount to correct the fuel injection amount by the feedback correction coefficient FAF into the purge gas correction coefficient FPG) only if the engine is operated at a high revolution speed. In other words, when the base air-fuel ratio learning has not been completed when the purge control valve closing instruction timing arrives, if the engine is operated at the high revolution speed, the feedback correction coefficient FAF is corrected to the base value "1" and the evaporated fuel gas concentration learning value FGPG is corrected.

Figure 12:
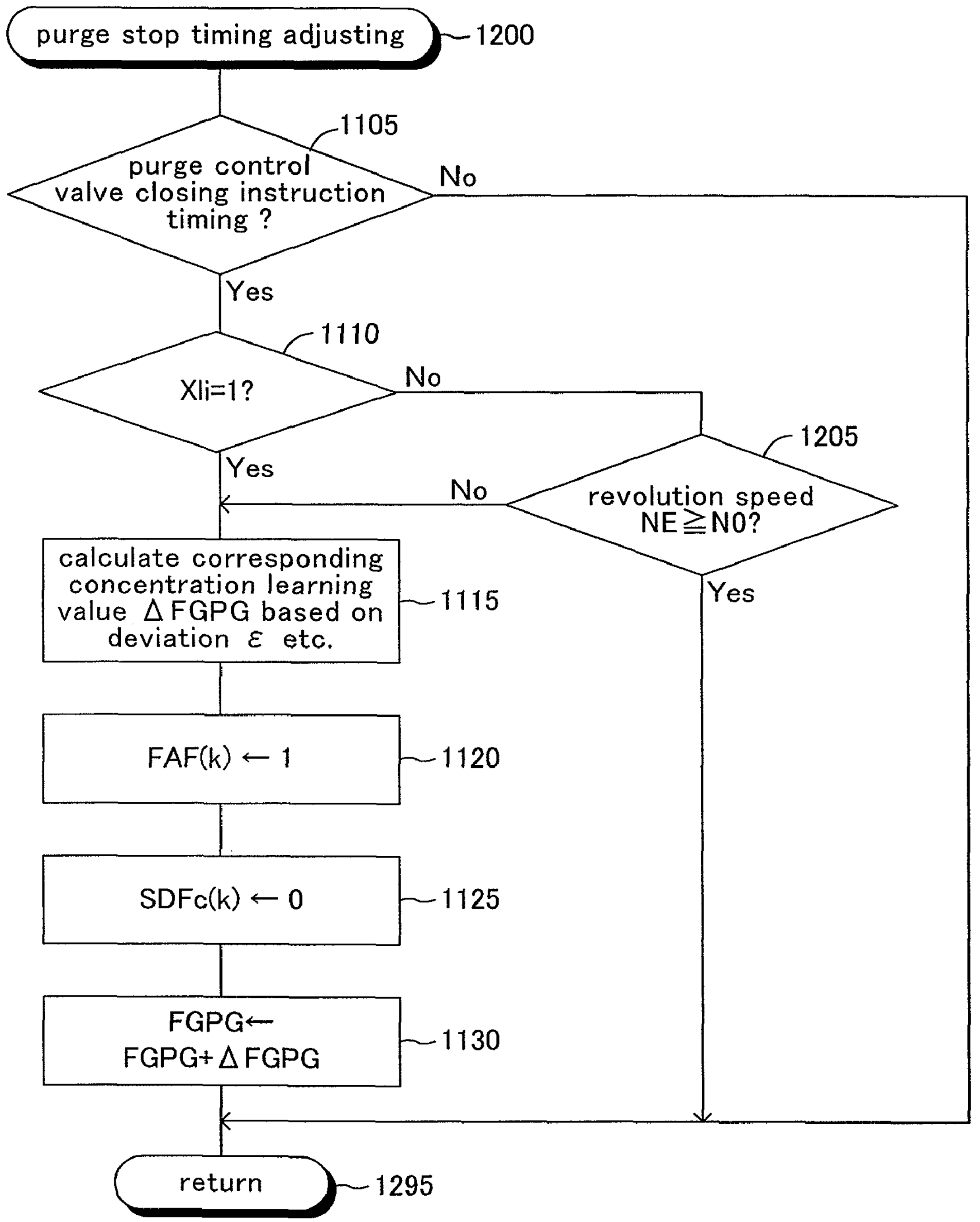
FIG. 12 is a flow chart showing a routine executed by a CPU according to a second embodiment instead of the routine shown in FIG. 11.

More specifically, Step 1205 is inserted into the routine shown in FIG. 11, in the purge stop timing adjusting routine shown in FIG. 12. That is, if the value of the air-fuel ratio learning completion flag Xli is "0" (i.e., the base air-fuel ratio learning has not been completed) at the determination of Step 1110, the CPU 71 makes a determination of "No" at Step 1110 to proceed to Step 1205, at which the CPU 71 determines whether or not the revolution speed NE of the engine 10 is equal to or higher than a predetermined value (high revolution speed determining value) N0.

At this time, if the revolution speed NE is smaller than the predetermined value N0 (i.e., the engine is operated at a low revolution speed), the CPU 71 makes a determination of "No" at Step 1205 to execute Steps from Step 1115 to Step 1130. Consequently, the corresponding concentration learning value ΔFGPG is calculated at Step 1115, the feedback correction coefficient FAF is reset to the base value "1" at Step 1120. Further, the value of integral SDFc(k) of the deviation of the injection amount is reset to "0" at Step 1125, and a value obtained by adding the corresponding concentration learning value ΔFGPG to the evaporated fuel gas concentration learning value FGPG at the purge control valve closing instruction timing is set as the evaporated fuel gas concentration learning value FGPG at Step 1130.

On the other hand, if the revolution speed NE is equal to or larger than the predetermined value N0 (i.e., the engine is operated at a high revolution speed), the CPU 71 makes a determination of "Yes" at Step 1205 to proceed to Step 1295 to end the current execution of the present routine tentatively without executing Steps from Step 1115 to Step 1130.

Meanwhile, the intake air amount is relatively small when the engine 10 is operated at the low revolution speed. Therefore, even if the deviation amount of the base of the air-fuel ratio is relatively large at the purge control valve closing instruction timing, the air-fuel ratio can sufficiently be corrected by varying the feedback correction amount (the feedback correction coefficient FAF) after the purge control valve closing instruction timing. Thus, it is unlikely that the actual air-fuel ratio largely deviates from the target air-fuel ratio. To the contrary, the intake air amount is relatively large when the engine 10 is operated at the high revolution speed. Therefore, it is likely that the actual air-fuel ratio largely deviates from the target air-fuel ratio when the deviation amount of the base of the air-fuel ratio is relatively large at the purge control valve closing instruction timing, even if the feedback correction amount (the feedback correction coefficient FAF) is varied after the purge control valve closing instruction timing.

In view of above, if the base air-fuel ratio learning has not been completed when the purge control valve closing instruction timing arrives, the present control apparatus prohibits the "taking-into the purge correction coefficient FPG" of the correction amount for the fuel injection amount by the feedback correction coefficient FAF (i.e., the correction of the evaporated fuel gas concentration learning value FGPG) and the correction of the feedback correction coefficient FAF to the base value "1" at the high revolution speed, and allows them at the revolution speed other than the high revolution speed.

As a result, it can be avoided that the air-fuel ratio fluctuates excessively at the high revolution speed. In addition, "taking-into the purge correction coefficient FPG" of the correction amount for the fuel injection amount by the feedback correction coefficient FAF (i.e., the correction of the evaporated fuel gas concentration learning value FGPG) and the correction of the feedback correction coefficient FAF to the base value "1" are carried out when the engine is operated at the revolution speed other than the high revolution speed, regardless of whether or not the base air-fuel ratio learning is completed. Thus, the fluctuation of the air-fuel ratio can be effectively suppressed, when the deviation of the base air-fuel ratio is relatively small. Further, even if the deviation of the base air-fuel ratio is relatively large, it can be avoided that the air-fuel ratio fluctuates largely, by varying the feedback correction coefficient FAF thereafter, as described above.

c. Third Embodiment

Figure 13:
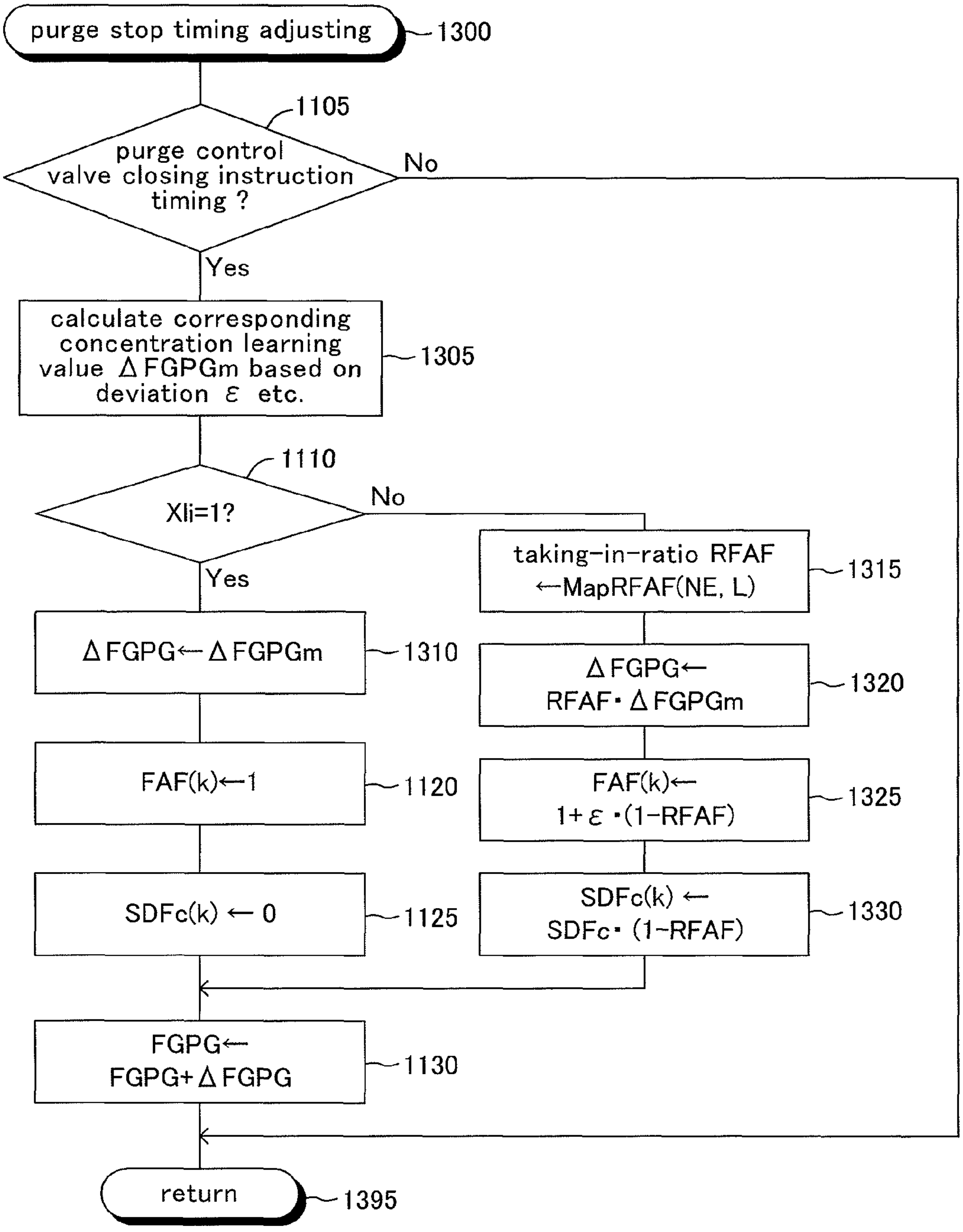
FIG. 13 is a flow chart showing a routine executed by a CPU according to a third embodiment instead of the routine shown in FIG. 11.

Next will be described a third embodiment of a control apparatus for the internal combustion engine in accordance with the present invention. The control apparatus according to the third embodiment is different from the control apparatus according to the first embodiment only in that its CPU 71 executes a purge stop timing adjusting routine shown in FIG. 13, instead of the purge stop timing adjusting routine shown in FIG. 11 which the CPU 71 of the first embodiment executes. Hereinafter, the description is made by focusing on this difference. Note that Steps shown in FIG. 13 identical to Steps shown in FIG. 11 have the same numerals as ones shown in FIG. 11.

The control apparatus according to the third embodiment determines a partition ratio (i.e., taking-in-ratio) RFAF based on the operation state parameter of the engine 10, if it is determined that the base air-fuel ratio learning has not been completed when the purge control valve closing instruction timing arrives. Further, this apparatus corrects the evaporated fuel gas concentration learning value FGPG in such a manner that "a partition amount" is added to the purge correction amount (the purge correction coefficient FPG), "the partition amount" being "an amount corresponding to the determined partition ratio RFAF of the amount corresponding to the correction amount to correct the base injection amount by the feedback correction amount that was calculated at the purge control valve closing instruction timing (the deviation $\epsilon$ of the feedback correction coefficient FAF from the base value "1"), and simultaneously corrects the feedback correction amount (the feedback correction coefficient FAF) in such a manner that the partition amount is subtracted from the feedback correction amount.

More specifically, the CPU 71 starts a processing from Step 1300 at an appropriate timing described above, and then, proceeds to Step 1105 so as to determine whether or not the present time is at the purge control valve closing instruction timing. If the present time is not at the purge control valve closing instruction timing, the CPU 71 makes a determination of "No" at Step 1105 to directly proceed to Step 1395, at which the CPU 71 ends the current execution of the present routine tentatively.

To the contrary, if the present time is at the purge control valve closing instruction timing, the CPU 71 makes a determination of "Yes" at Step 1105 to proceed to Step 1305, at which the CPU 71 calculates the corresponding concentration learning value ΔFGPG, as a maximum corresponding concentration learning value ΔFGPGm, by applying the deviation ε of the current feedback correction coefficient FAF from the base value "1" (ε=FAF−1), the current purge correction coefficient FPG (=FPG0), and the current estimated purge rate PGRE (=PGRE0) to equation (23) described above.

Here, it is assumed that the base air-fuel ratio learning has not been completed (i.e., the air-fuel ratio learning completion flag Xli is not equal to "1"). In this case, the CPU 71 makes a determination of "No" at Step 1110 at which the CPU 71 determines whether or not the air-fuel ratio learning completion flag Xli is equal to "1", so that the CPU 71 proceeds to Step 1315 to determine the partition rate RFAF. The partition rate is obtained base on the revolution speed NE, the load L, and a partition rate setting map MapRFAF(NE,L), in accordance with equation (26) described below.

Figure 14:
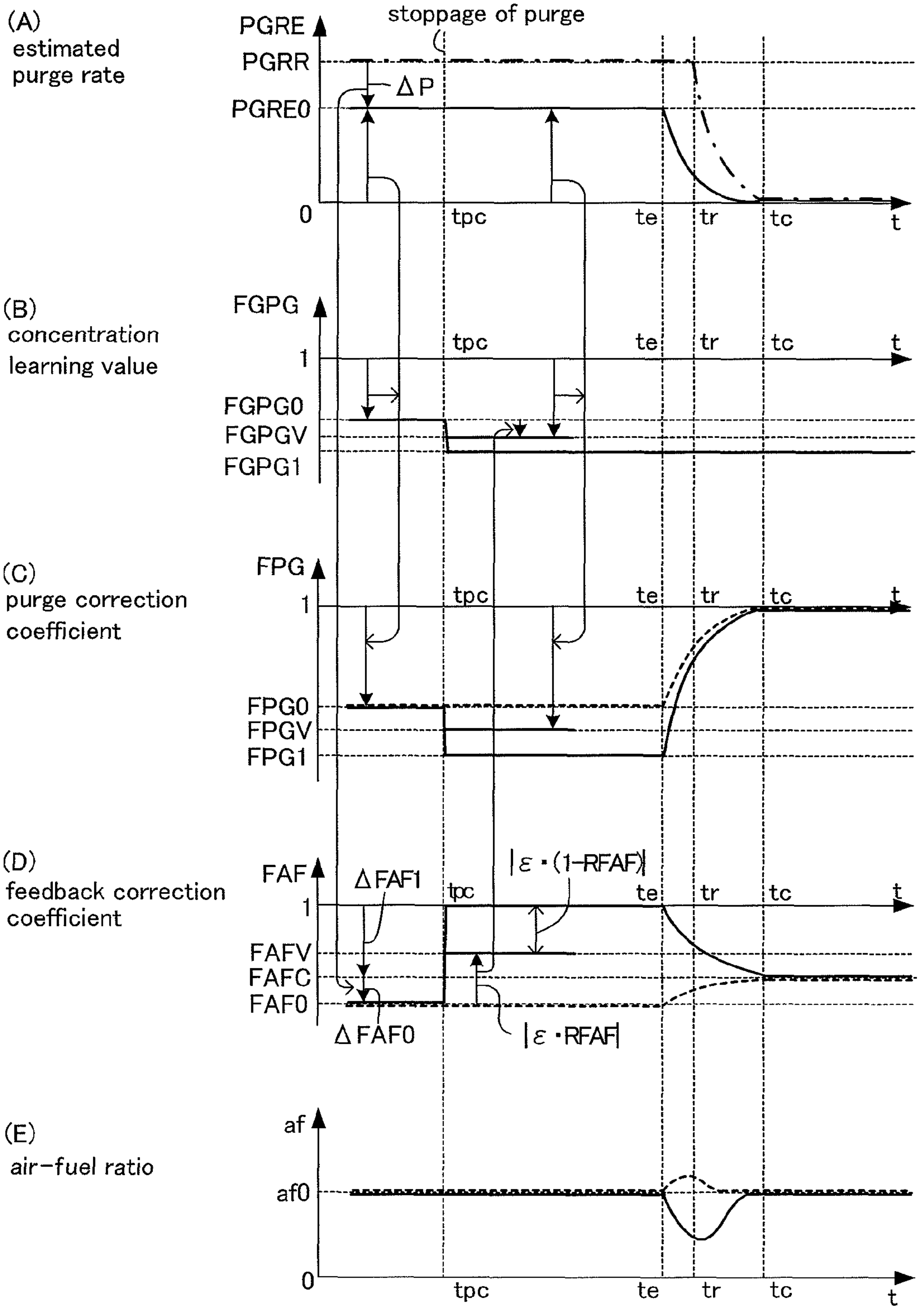
FIG. 14 is a timing chart to describe operations according to the third embodiment at the purge control valve closing instruction timing.

The partition ratio RFAF is a ration to indicate what percentage of the deviation ε of the feedback correction coefficient FAF from the base value "1" should be taken into the purge correction coefficient FPG (thus, the evaporated fuel gas concentration learning value FGPG). As the partition ratio RFAF increases from 0% toward 100%, the feedback correction coefficient FAF immediately after the purge control valve closing instruction timing tpc changes from the value FAF0 to a value closer to the base value "1" than to the value FAF0, as shown in (D) of FIG. 14, the purge correction coefficient FPG immediately after the purge control valve closing instruction timing becomes a value which is more far from the base value "1" than the value FPG0, as shown in (C) of FIG. 14.

$$RFAF = \mathrm{Map}RFAF(NE,L) \tag{26}$$

Figure 15:
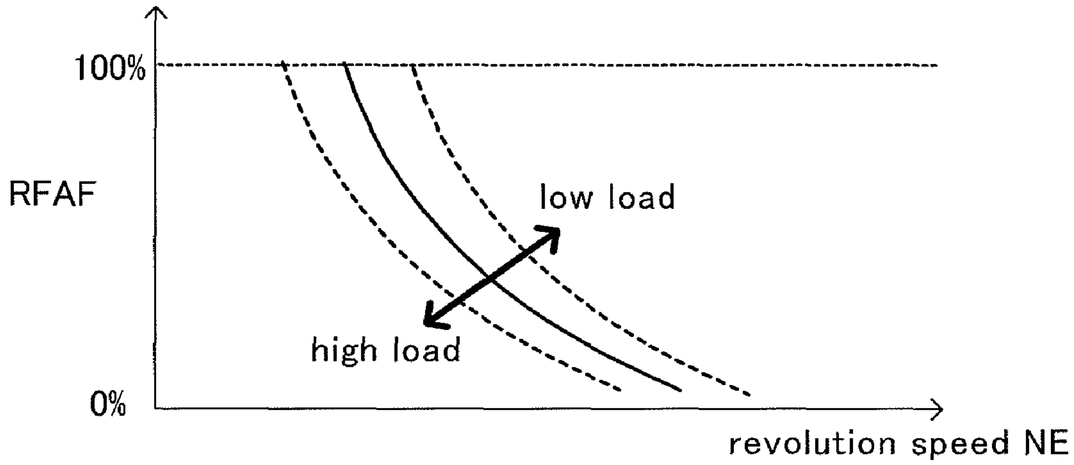
FIG. 15 is a map (table) which defines a relationship among a revolution speed of the engine, a load, and a partition ratio.

FIG. 15 shows the partition rate setting map MapRFAF to determine the partition rate RFAF. According the rate setting map MapRFAF, the partition rate RFAF is set to become larger, as the revolution speed NE becomes smaller. This is because it is unlikely that the actual air-fuel ratio fluctuate largely, by varying the feedback control coefficient FAF thereafter, since the flow rate of intake air becomes smaller as the revolution speed of the engine becomes smaller even if a portion of the feedback correction coefficient FAF to which the deviation of the base air-fuel ratio is reflected (i.e., ΔFAF1 shown in (D) of FIG. 14) is larger than a portion of the feedback correction coefficient FAF to which the deviation of the evaporated fuel amount is reflected (i.e., ΔFAF0 shown in (D) of FIG. 14) immediately before the purge control valve closing instruction timing.

The portion ΔFAF1 of the feedback correction coefficient FAF to which the deviation of the base air-fuel ration is reflected is a difference between the value FAFC and "1", the value FAFC being a value on which the feedback correction coefficient FAF converges when a sufficient time elapses after the evaporated fuel gas purge is stopped without performing the base air-fuel ratio learning, and thus a deviation of the air-fuel ratio feedback correction coefficient FAF from "1" due to an amount which is generated because the deviation of the base air-fuel ratio has not been learned. The portion ΔFAF0 of the feedback correction coefficient FAF to which the deviation of the evaporated fuel amount is reflected is a deviation of the air-fuel ratio due to the evaporated fuel, for which the purge correction coefficient FPG does not compensate.

The partition rate RFAF is set in such a manner that it becomes smaller as the load L becomes larger, according to the rate setting map MapRFAF. This is because it becomes difficult to suppress the large fluctuation of the air-fuel ratio even by varying the feedback correction coefficient FAF after the purge control valve closing instruction timing if the deviation of the base air-fuel ratio is relatively large at the purge control valve closing instruction timing, since the flow rate Ga of intake air and the fuel injection amount per a unit time become larger as the load L of the engine becomes larger.

Subsequently, the CPU 71 proceeds to Step 1320 to calculate the corresponding concentration learning value ΔFGPG (taking-in amount) through multiplying the maximum corresponding concentration learning value ΔFGPGm calculated at Step 1305 by the partition ratio RFAF obtained at Step 1315, as shown in equation (27) below.

$$\Delta FGPG \leftarrow RFAF \cdot \Delta FGPGm \tag{27}$$

Subsequently, the CPU 71 proceeds to Step 1325 to renew the feedback correction coefficient FAF (FAF(k)) in accordance with equation (28) below. That is, the CPU 71 corrects the feedback correction coefficient FAF in such a manner that the partition ratio RFAF of the deviation ε which is the amount of the feedback correction coefficient FAF from the base value "1" (RFAF·ε) is subtracted from the feedback correction coefficient FAF (See the timing tpc in (D) shown in FIG. 14).

$$FAF \leftarrow 1 + \epsilon \cdot (1 - RFAF) \tag{28}$$

Subsequently, the CPU 71 proceeds to Step 1330 to correct the value of integral SDFc(k) of the deviation of the injection amount in such a manner that the value SDFc(k) becomes equal to a product of the value of integral SDFc(k) of the deviation of the injection amount at the purge control valve closing instruction timing and (1−RFAF), as shown in a block of Step 1330. Thereafter, the CPU 71 proceeds to Step 1130 at which the CPU 71 corrects the evaporated fuel gas concentration learning value FGPG by adding the corresponding concentration learning value ΔFGPG calculated at Step 1320 to the evaporated fuel gas concentration learning value FGPG at the purge control valve closing instruction timing (See the timing tpc in (B) of FIG. 14) Subsequently, the CPU 71 proceeds to Step 1395 to end the current execution of the present routine tentatively.

As described above, that partition ratio RFAF of the maximum corresponding concentration learning value ΔFGPGm which corresponds to the correction amount to correct the fuel injection amount by the feedback correction coefficient FAF at the purge control valve closing instruction timing is taken into the evaporated fuel gas concentration learning value FGPG by Step 1315 and Step 1320.

On the other hand, if the value of the air-fuel ratio learning completion flag Xli is "1" (i.e., the base air-fuel ratio learning has been completed) at the determination of Step 1110, the CPU 71 makes a determination of "Yes" at Step 1110 to proceed to Step 1310 at which the CPU 71 sets the corresponding concentration learning value ΔFGPG at the maximum corresponding concentration learning value ΔFGPGm. Subsequently, the CPU 71 executes Steps from Step 1120 to Step 1130 described above.

With these described above, at the purge control valve closing instruction timing (when the purge control valve 49 which has been opened to perform the evaporated fuel gas purge is closed), the feedback correction coefficient FAF is corrected to be the base value "1" (i.e. the FAF is reset) and the evaporated fuel gas concentration learning value FGPG is corrected in such a manner that "the amount corresponding to the correction amount to correct the base injection amount by the feedback correction coefficient FAF at the timing immediately before the feedback correction coefficient FAF is reset to the base value 1" is added to the purge correction coefficient FPG, similarly to the first embodiment. In other words, Step 1310 and Steps from Step 1120 to Step 1130 bring the same result as when the partition ratio RFAF is set at the maximum value "1=100%".

As described above, if it is determined that the base air-fuel ratio learning has not been completed (the value of the air-fuel ratio learning completion flag Xli is "0") when the purge control valve closing instruction timing arrives, the present control apparatus determines the partition ratio RFAF based on the operation state parameters (the revolution speed NE and the load L), corrects the evaporated fuel gas concentration learning value in such a manner that the partition amount (RFAF·ε) is added to the purge correction amount FPG, "the partition amount (RFAF·ε)" being "the amount corresponding to the determined partition ratio RFAF of the amount corresponding to the correction amount to correct the base injection amount Fbs by the feedback correction amount (feedback correction coefficient FAF) that was calculated at the purge control valve closing instruction timing, and corrects the feedback correction amount in such a manner that the partition amount is subtracted from the feedback correction amount (Step 1110, Steps from Step 1315 to Step 1330, and Step 1130).

As a result, even if the base air-fuel ratio learning has not been completed and the deviation of the base air-fuel ratio is large, it is possible to suppress the large fluctuations of the air-fuel ratio af after the purge control valve closing instruction timing. In addition, if the base air-fuel ratio learning has not been completed but the deviation of the base air-fuel ratio is small, it is possible to suppress the fluctuation of the air-fuel ratio af more effectively.

d. Fourth Embodiment

Next will be described a fourth embodiment of a control apparatus for the internal combustion engine in accordance with the present invention. The control apparatus according to the fourth embodiment is different from the control apparatus according to the first embodiment only in that its CPU 71 executes a feedback correction coefficient calculation routine shown in FIG. 16 instead of the feedback correction coefficient calculation routine shown in FIG. 5 which the CPU 71 of the first embodiment executes, and the CPU 71 executes a purge stop timing adjusting routine shown in FIG. 17 instead of the purge stop timing adjusting routine shown in FIG. 11. Hereinafter, the description is made by focusing on these differences. Note that Steps shown in FIG. 16 identical to Steps shown in FIG. 5 have the same numerals as ones shown in FIG. 5. Further, Steps shown in FIG. 17 identical to Steps shown in FIG. 11 have the same numerals as ones shown in FIG. 11.

The control apparatus according to the fourth embodiment obtains a filtered value DFM (a filtered feedback correction amount DFM) by filtering the feedback correction amount DF, the filtering functioning to pass only low-frequency components of the feedback correction amount DF, and obtains a corresponding concentration learning value ΔFGPG based on the filtered value DFM. It should be noted that the filtering is similar to the dulling filter (first order lag treatment) for the estimated purge flow KPEM in the estimated purge rate calculating routine shown in FIG. 9.

Figure 16:
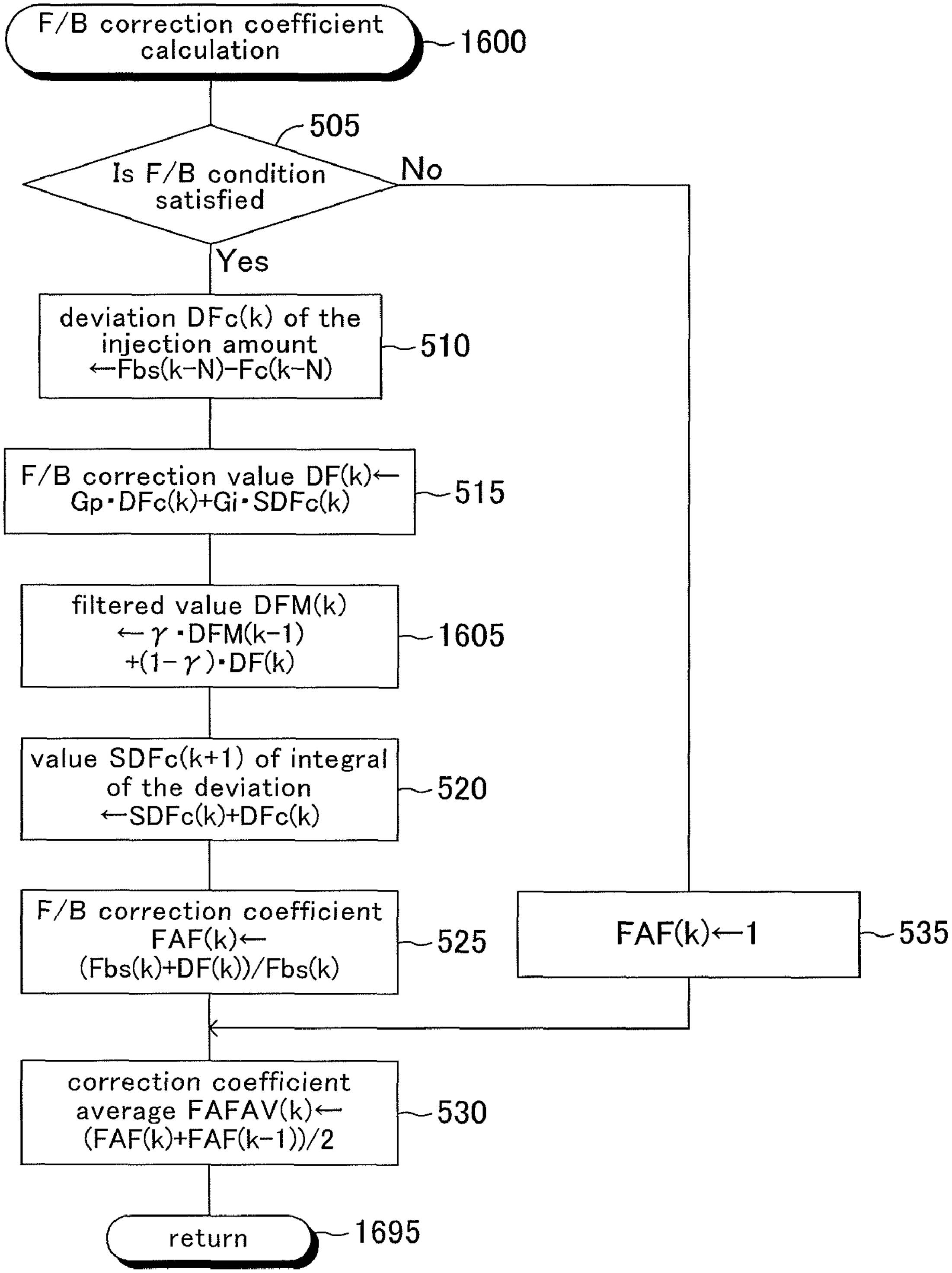
FIG. 16 is a flow chart showing a routine executed by a CPU according to a fourth embodiment instead of the routine shown in FIG. 5.

More specifically, the CPU 71 starts a processing from Step 1600 shown in FIG. 16 at a timing similar to the timing at which the routine shown in FIG. 5 is started, and then, proceeds to Step 505 at which the CPU 71 determines whether or not the feedback condition is satisfied.

Here, it is assumed that the feedback condition is satisfied. In this case, the CPU 71 makes a determination of "Yes" at Step 505 to proceed to Step 510 at which the CPU 71 calculates the deviation DFc(k) of the injection amount, and proceeds to Step 515 to calculates the feedback correction amount DF(k). Subsequently, the CPU 71 calculates the filtered value DFM of the feedback correction amount by filtering the feedback correction amount DF(k) in accordance with equation (29) below, at Step 1605. This filter is equivalent with a first order low-pass filter (dulling filter, first order lag treatment). In equation (29) below, the value γ is a constant larger than 0 and smaller than 1. The value γ κ is a predetermine value in advance based on experiments or simulation results in such a manner that noise components within high frequency band contained in the feedback correction amount DF(k) (i.e., components having a frequency higher than a frequency of a fluctuation of the air-fuel ratio caused by the evaporated gas purge) are eliminated from the feedback correction amount DF(k). A value T obtained by applying the value γ and a calculation period Δt for the filtered value DFM(k) (i.e., calling-up time period Δt for the feedback correction coefficient calculation routine) to equation (30) described below is a time constant which represents a response performance of the filter.

$$DFM(k) \leftarrow \gamma \cdot DFM(k-1) + (1-\gamma) \cdot DF(k) \tag{29}$$

$$T = \frac{\gamma}{1-\gamma} \cdot \Delta t \tag{30}$$

Subsequently, the CPU 71 proceeds to Step 520 to calculates the value of integral SDFc(k+1) of the deviation of the injection amount, proceeds to Step 525 to convert the feedback correction amount DF(k) into the feedback correction coefficient FAF(k), and proceeds to Step 530 to calculates the correction coefficient average FAFAV(k).

Figure 17:
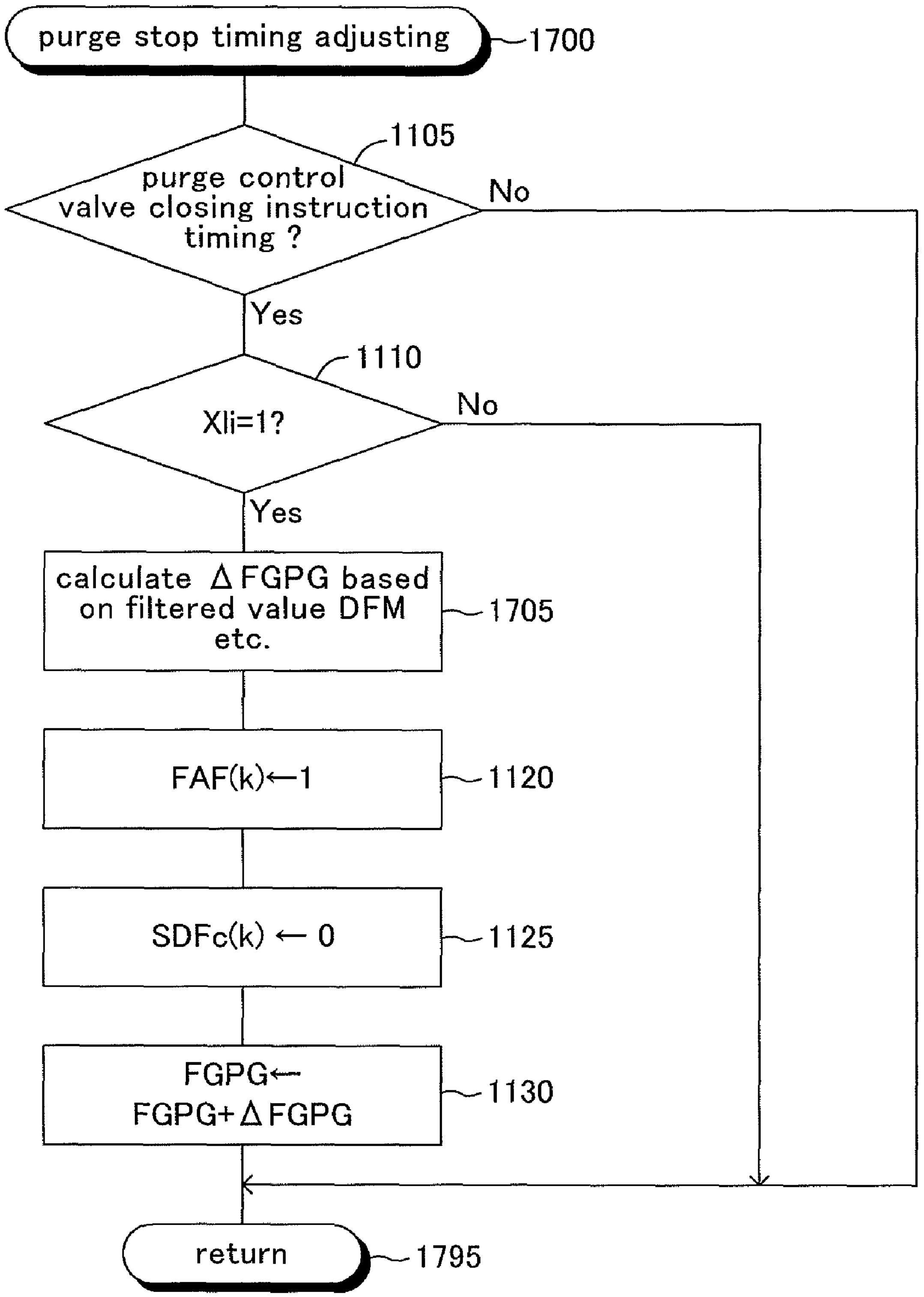
FIG. 17 is a flow chart showing a routine executed by the CPU according to the fourth embodiment instead of the routine shown in FIG. 11.

Further, the CPU 71 starts a processing from Step 1700 shown in FIG. 17 at an appropriate timing described above, and then, proceeds to Step 1105 so as to determine whether or not the present time is at the purge control valve closing instruction timing.

Here, it is assumed that the present time is at the purge control valve closing instruction timing and the base air-fuel ratio learning has been completed (i.e., the air-fuel ratio learning completion flag Xli is equal to "1"). In this case, the CPU 71 makes determinations of "Yes" at both Step 1105 and Step 1110 at which the CPU 71 determines whether or not the air-fuel ratio learning completion flag Xli is equal to "1", to proceed to Step 1705. At Step 1705, the CPU 71 calculates the corresponding concentration learning value ΔFGPG based on the filtered value DFM of the feedback correction amount DF, the purge correction coefficient FPG0, and the estimated purge rate PGRE0. At this time, the CPU 71 adopts a value (=DFM/Fbs(k)) obtained by dividing the filtered value DFM by the base injection amount Fbs(k) as the deviation ε (See equation (7) above), and applies the deviation ε, the purge correction coefficient FPG at that time (=FPG0), and the estimated purge rate PGRE at that time (=PGRE0) to equation (23) above to calculate the corresponding concentration learning value ΔFGPG (=ε·FPG0/PGRE0).

Thereafter, the CPU 71 corrects the feedback correction coefficient FAF(k) to be the base value "1" (i.e., resets the feedback correction coefficient FAF(k)) at Step 1120, and set the value of integral SDFc(k) of the deviation of the injection amount to be "0" (i.e., reset the SDFc(k)) at the subsequent Step 1125. Further, the CPU 71 proceeds to Step 1130 corrects the evaporated fuel gas concentration learning value FGPG by adding the corresponding concentration learning value ΔFGPG to the evaporated fuel gas concentration learning value FGPG (=FGPG0) at the purge control valve closing instruction timing. The CPU 71 operates similarly to the CPU 71 according to the first embodiment for the other cases.

As described above, the present control apparatus includes the filtering means (Step 1605), which obtains the filtered feedback correction amount (the filtered value DFM) by filtering the feedback correction amount so as to pass the low frequency components in the feedback correction amount only. In addition, the control apparatus includes the evaporated fuel gas concentration learning value correcting means (Step 1705, and Step 1130) which is configured so as to use an amount ε (=DFM/Fbs(k)) corresponding to a correction amount to correct the base injection amount, the correction amount being indicated by the filtered feedback correction amount at the purge control valve closing instruction timing, as the amount corresponding to the correction amount to correct the base injection amount by the feedback correction amount at the timing immediately before the feedback correction amount is corrected to the base value "1".

The air-fuel ratio of the engine 10 fluctuates transiently due to various reasons when the engine is under transient operating condition or the like. Therefore, the feedback correction amount DF(k) (thus, the feedback correction coefficient FAF) contains high frequency components under the influence of the transient fluctuations of the air-fuel ratio. On the other hand, the purge amount of the evaporated fuel gas does not vary rapidly, and therefore, it is unlikely that the evaporated fuel gas purge superimposes high frequency components on the feedback correction amount DF(k). Accordingly, the filtered feedback correction amount (filtered value DFM) at the purge control valve closing instruction timing is an amount equal to the feedback correction amount from which the disturbance caused by the transient operation of the engine is eliminated, and thus represents the deficiency of the purge correction amount with accuracy.

According to the present control apparatus, the evaporated fuel gas concentration learning value FGPG at the purge control valve closing instruction timing is corrected based on the filtered feedback correction amount (the filtered value DFM). Thus, the purge correction amount FPG after the purge control valve closing instruction timing becomes closer to an appropriate value. Consequently, it is possible to suppress the fluctuation of the air-fuel ratio after the purge control valve closing instruction timing more effectively.

It should be noted that the value γ is constant, the γ being relating to the time constant T of the filter in the fourth embodiment. In contrast, the value γ may be variable depending on the operating parameter(s) such as the revolution speed NE and the load L.

Figure 18:
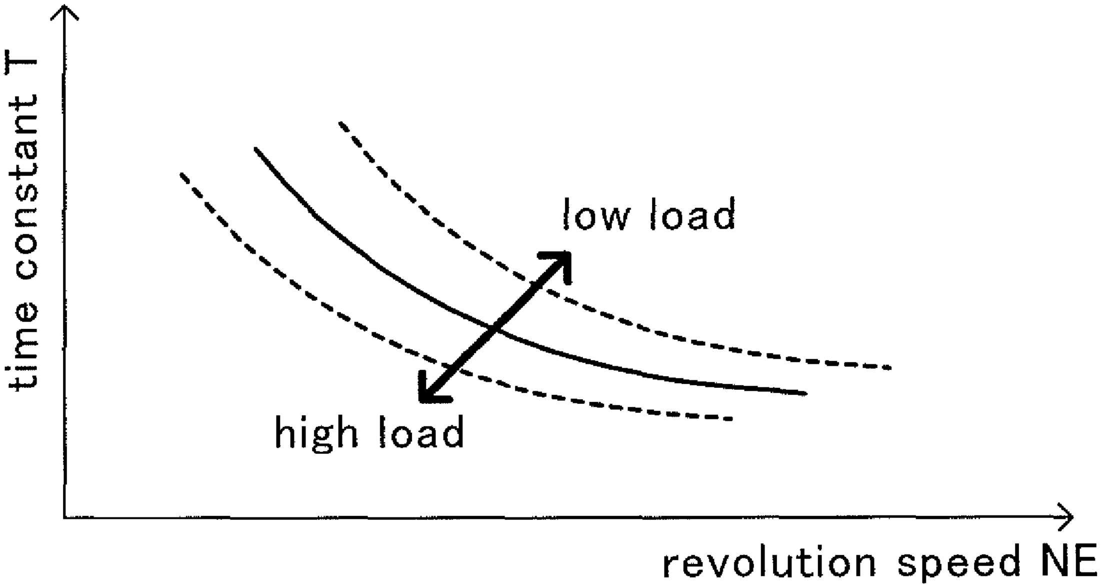
FIG. 18 is a time constant setting map which defines a relationship among a revolution speed of the engine, a load, and a time constant of a filter in the fourth embodiment.

For instance, frequency of the high frequency components contained in the feedback correction amount DFc(k) becomes lower, as the revolution speed of the engine 10 becomes lower or as the load of the engine 10 becomes lower. Thus, as shown in FIG. 18, it is preferable to vary the γ in such a manner that the time constant T of the filter (the filtering) becomes larger, as the revolution speed NE of the engine 10 becomes lower or as the load L of the engine 10 becomes lower.

On the other hand, if the time constant T of the filter is excessively large, a change of the deficiency of the purge correction amount (i.e., deviation with respect to an amount of the evaporated fuel) emerges in the filtered feedback correction amount DF(k) with long delay. Therefore, if the time constant T of the filter is set to be excessively large, the filtered feedback correction amount (the filtered value DFM) at the purge control valve closing instruction timing does not represent the deficiency of the purge correction amount with sufficient accuracy. Accordingly, it is preferable to adjust the time constant T of the filter in consideration of these facts. As a result of such adjustment of the time constant T, the purge correction amount FPG after the purge control valve closing instruction timing becomes closer to a more appropriate value, and therefore, it is possible to suppress the fluctuation of the air-fuel ratio after the purge control valve closing instruction timing more effectively.

As described above, the control apparatuses according to the above embodiments can effectively suppress the fluctuation of the air-fuel ratio of the engine after the purge control valve closing instruction timing by correcting the feedback correction coefficient FAF and the evaporated fuel gas concentration learning value FGPG at the purge control valve closing instruction timing.

The present invention is not limited to the above-described embodiments (the first to fourth embodiments) and can be modified in various other forms without departing from the scope of the invention. For example, the feedback correction coefficient calculation section A5 determines the instructed injection amount Fi by multiplying the base injection amount Fbs by the feedback correction coefficient FAF, the base correction coefficient KG, and purge correction coefficient FPG. When these correction coefficients are used, a deviation of each of the coefficients from each of the base value "1" represents a correction amount.

In contrast, the instructed injection amount Fi may be determined by adding the feedback correction amount DF and the purge correction amount to a product of the base injection amount Fbs of the fuel and base correction amount. In this case, the evaporated fuel gas purge stop timing adjusting section A11 corrects the evaporated fuel gas concentration learning value FGPG in such a manner that, if the feedback correction amount DF is an amount which decreases the base injection amount Fbs by a % at the purge control valve closing instruction timing, the purge correction amount is decreased by an amount corresponding to the a % of the base injection amount Fbs.

In addition, a direct injection valve which injects the fuel directly into the combustion chamber may be used instead of the injector 39 used in the above embodiments. Further, the renewal value tFG to correct the evaporated fuel gas concentration learning value FGPG may be a fixed constant, and the renewal value X to correct the base air-fuel ratio learning coefficient KGi may be a variable constant.

The invention claimed is:

1. A control apparatus for an internal combustion engine, the engine having:

fuel injection means for supplying fuel to a combustion chamber by injecting fuel stored in a fuel tank;

a purge passage connecting said fuel tank with an intake passage, the purge passage being for introducing evaporated fuel generated in said fuel tank into said intake passage in a form of evaporated fuel gas containing the evaporated fuel;

a purge control valve which is disposed in said purge passage and whose opening is varied in response to an instruction signal; and an air-fuel ratio sensor which is disposed in an exhaust passage and which detects an air-fuel ratio of a mixture supplied into said combustion chamber;

the control apparatus comprising, purge control means for providing, to said purge control valve, an instruction signal to open said purge control valve at a predetermined opening when a predetermined purge condition is satisfied so as to introduce said evaporated fuel gas into said intake passage, and an instruction signal to completely close said purge control valve when said purge condition becomes unsatisfied so as to stop introducing said evaporated fuel gas into said intake passage;

base injection amount determining means for determining, based on an amount of an intake air of said engine, a base injection amount to make an air-fuel ratio of a mixture formed in said combustion chamber by the fuel injected from said fuel injection means equal to a predetermined target air-fuel ratio;

feedback correction amount calculating means for calculating a feedback correction amount to correct said base injection amount in such a manner that said detected air-fuel ratio becomes equal to said target air-fuel ratio when a predetermined feedback control condition is satisfied;

evaporated fuel gas concentration learning means for learning, as an evaporated fuel gas concentration learning value, a value relating to a concentration of said evaporated fuel contained in said evaporated fuel gas based on a value relating to said feedback correction amount, when an instruction signal for opening said purge control valve at said predetermined opening is being sent to said purge control valve;

purge flow estimating means for estimating, as an estimated purge flow, a flow of said evaporated fuel gas introduced into said combustion chamber based on a value relating to said opening of said purge control valve, in consideration of a transportation delay time duration which is a time that said evaporated fuel gas takes to transport from said purge control valve to said combustion chamber and a behavior of said evaporated fuel gas passing through said purge control valve with respect to a value relating to said opening of said purge control valve;

purge correction amount calculating means for calculating a purge correction amount to correct said base injection amount based on said evaporated fuel gas concentration learning value and said estimated purge flow so as to decrease said base injection amount by an amount corresponding to said evaporated fuel contained in said evaporated fuel gas introduced into said combustion chamber;

feedback correction amount correcting means for correcting said feedback correction amount to a base value which neither increase nor decrease said base injection amount, at a purge control closing instruction timing when an instruction signal causing said purge control valve to change its state from opening state to completely closing state is sent to said purge control valve;

evaporated fuel gas concentration learning value correcting means for correcting said evaporated fuel gas concentration learning value at said purge control valve closing instruction timing in such a manner that an amount corresponding to an correction amount to correct said base injection amount, said correction amount being provided by said feedback correction amount at a timing immediately before said feedback correction amount is corrected to said base value, is added to said purge correction amount; and fuel injection amount determining means for determining a fuel injection amount injected from said fuel injection means by correcting said base injection amount using said feedback correction amount and said purge correction amount.

2. The control apparatus for the internal combustion engine according to claim 1, comprising:

base air-fuel ratio learning means for performing base air-fuel ratio learning by renewing a base air-fuel ratio learning value based on a feedback value for learning which varies depending on said feedback correction amount so as to make said feedback correction amount closer to said base value during a purge control valve closing instruction period for which an instruction signal to keep said purge control valve in a state in which said purge control valve is completely closed is sent to said purge control valve;

base air-fuel ratio learning completion determining means for determining whether or not said base air-fuel ratio learning is completed based on said feedback value for learning during said purge control valve closing instruction period; and correction prohibiting means for prohibiting said feedback correction amount correcting means from correcting said feedback correction amount and for prohibiting said evaporated fuel gas concentration learning value correcting means from correcting said evaporated fuel gas concentration learning value, if it is determined that said base air-fuel ratio learning has not been completed when said purge control valve closing instruction timing arrives;

wherein said fuel injection amount determining means is configured so as to further use said base air-fuel ratio learning value to correct said base injection amount.

3. The control apparatus for the internal combustion engine according to claim 2, further comprising revolution speed detecting means for detecting a revolution speed of said engine, wherein said correction prohibiting means is configured so as to prohibit said feedback correction amount correcting means from correcting said feedback correction amount and to prohibit said evaporated fuel gas concentration learning value correcting means from correcting said evaporated fuel gas concentration learning value, only when said detected revolution speed is higher than a predetermined threshold.

4. The control apparatus for the internal combustion engine according to claim 1, comprising:

base air-fuel ratio learning means for performing base air-fuel ratio learning by renewing a base air-fuel ratio learning value based on a feedback value for learning which varies depending on said feedback correction amount so as to make said feedback correction amount closer to said base value during a purge control valve closing instruction period for which an instruction signal to keep said purge control valve in a state in which said purge control valve is completely closed is sent to said purge control valve; and base air-fuel ratio learning completion determining means for determining whether or not said base air-fuel ratio learning is completed based on said feedback value for learning during said purge control valve closing instruction period;

wherein said evaporated fuel gas concentration learning value correcting means performs said correcting of said feedback correction amount by said feedback correction amount correcting means and said correcting of said evaporated fuel gas concentration learning value by said evaporated fuel gas concentration learning value correcting means if it is determined that said base air-fuel ratio learning is completed when said purge control valve closing instruction timing arrives; determines a partition ratio based on an operation state parameter of said engine if it is determined that said base air-fuel ratio learning is not completed when said purge control valve closing instruction timing arrives, and corrects said evaporated fuel gas concentration learning value in such a manner that a partition amount is added to said purge correction amount, the partition amount being corresponding to said determined partition ratio of an amount corresponding to a correction amount to correct said base injection amount by said feedback correction amount that is calculated at said purge control valve closing instruction timing, and corrects said feedback correction amount in such a manner that said feedback correction amount becomes a value obtained by subtracting said partition amount from said feedback correction amount.

5. The control apparatus for the internal combustion engine according to claim 1, further comprising filtering means for obtaining filtered feedback correction amount by performing filtering processing on said feedback correction amount calculated by said feedback correction amount calculating means, the filtering processing being for passing only low frequency components in said feedback correction amount, and wherein said evaporated fuel gas concentration learning value correcting means is configured so as to use, as said amount corresponding to said correction amount to correct said base injection amount being provided by said feedback correction amount at the timing immediately before said feedback correction amount is corrected to said base value, an amount corresponding to a correction amount to correct said base injection amount, the correction amount being indicated by said filtered feedback correction amount at the purge control valve closing instruction timing.

6. The control apparatus for the internal combustion engine according to claim 5, wherein said filtering means is configured so as to adjust a time constant of the filtering processing based on an operation state parameter of said engine.

7. The control apparatus for the internal combustion engine according to claim 2, further comprising filtering means for obtaining filtered feedback correction amount by performing filtering processing on said feedback correction amount calculated by said feedback correction amount calculating means, the filtering processing being for passing only low frequency components in said feedback correction amount, and wherein said evaporated fuel gas concentration learning value correcting means is configured so as to use, as said amount corresponding to said correction amount to correct said base injection amount being provided by said feedback correction amount at the timing immediately before said feedback correction amount is corrected to said base value, an amount corresponding to a correction amount to correct said base injection amount, the correction amount being indicated by said filtered feedback correction amount at the purge control valve closing instruction timing.

8. The control apparatus for the internal combustion engine according to claim 3, further comprising filtering means for obtaining filtered feedback correction amount by performing filtering processing on said feedback correction amount calculated by said feedback correction amount calculating means, the filtering processing being for passing only low frequency components in said feedback correction amount, and wherein said evaporated fuel gas concentration learning value correcting means is configured so as to use, as said amount corresponding to said correction amount to correct said base injection amount being provided by said feedback correction amount at the timing immediately before said feedback correction amount is corrected to said base value, an amount corresponding to a correction amount to correct said base injection amount, the correction amount being indicated by said filtered feedback correction amount at the purge control valve closing instruction timing.

9. The control apparatus for the internal combustion engine according to claim 4, further comprising filtering means for obtaining filtered feedback correction amount by performing filtering processing on said feedback correction amount calculated by said feedback correction amount calculating means, the filtering processing being for passing only low frequency components in said feedback correction amount, and wherein said evaporated fuel gas concentration learning value correcting means is configured so as to use, as said amount corresponding to said correction amount to correct said base injection amount being provided by said feedback correction amount at the timing immediately before said feedback correction amount is corrected to said base value, an amount corresponding to a correction amount to correct said base injection amount, the correction amount being indicated by said filtered feedback correction amount at the purge control valve closing instruction timing.

10. The control apparatus for the internal combustion engine according to claim 7, wherein said filtering means is configured so as to adjust a time constant of the filtering processing based on an operation state parameter of said engine.

11. The control apparatus for the internal combustion engine according to claim 8, wherein said filtering means is configured so as to adjust a time constant of the filtering processing based on an operation state parameter of said engine.

12. The control apparatus for the internal combustion engine according to claim 9, wherein said filtering means is configured so as to adjust a time constant of the filtering processing based on an operation state parameter of said engine.

* * * * *